United States Patent
Shim et al.

(10) Patent No.: US 12,459,821 B2
(45) Date of Patent: Nov. 4, 2025

(54) METHOD FOR PRODUCING WHITLOCKITE AND METHOD FOR CONTROLLING PARTICLE SIZE OF WHITLOCKITE CRYSTAL

(71) Applicant: H&BIO CO., LTD., Gyeonggi-Do (KR)

(72) Inventors: Jung Hee Shim, Seoul (KR); Yu Ha Kim, Gyeonggi-do (KR)

(73) Assignee: H&BIO CO., LTD., Gyeonggi-do (KR)

( * ) Notice: Subject to any disclaimer, the term of this patent is extended or adjusted under 35 U.S.C. 154(b) by 837 days.

(21) Appl. No.: 17/770,161

(22) PCT Filed: Oct. 22, 2020

(86) PCT No.: PCT/KR2020/014497
§ 371 (c)(1),
(2) Date: Apr. 19, 2022

(87) PCT Pub. No.: WO2021/080348
PCT Pub. Date: Apr. 29, 2021

(65) Prior Publication Data
US 2022/0380216 A1    Dec. 1, 2022

(30) Foreign Application Priority Data

Oct. 22, 2019 (KR) .................. 10-2019-0131730
Oct. 30, 2019 (KR) .................. 10-2019-0136336
Oct. 30, 2019 (KR) .................. 10-2019-0136337

(51) Int. Cl.
*C01B 25/32* (2006.01)

(52) U.S. Cl.
CPC .......... *C01B 25/32* (2013.01); *C01P 2002/70* (2013.01); *C01P 2004/03* (2013.01)

(58) Field of Classification Search
None
See application file for complete search history.

(56) References Cited

FOREIGN PATENT DOCUMENTS

| CN | 101734639 A | * | 6/2010 | |
| CN | 108283718 A | * | 7/2018 | ........... A61K 31/663 |

(Continued)

OTHER PUBLICATIONS

English translation of CN-108283718-A Description (Year: 2018).*

(Continued)

*Primary Examiner* — Anthony J Zimmer
*Assistant Examiner* — Zachary John Baum
(74) *Attorney, Agent, or Firm* — Harness, Dickey & Pierce, P.L.C.

(57) ABSTRACT

A whitlockite preparation method includes: determining a size of the whitlockite crystal to be prepared; determining a first amount of a first cation other than calcium ion on the basis of the determined size of the crystal, wherein when the determined size of the whitlockite crystal is a first size, the first amount is determined to be a first value, wherein when the determined size is a second size larger than the first size, the first amount is determined to be a second value; mixing calcium ion and phosphate ion in order to prepare a first phosphate crystal, wherein the determined first amount of the cation other than calcium ion is also mixed therewith; mixing a second amount of cation other than calcium ion with phosphate ion to prepare a second phosphate crystal; and aging a solution containing the first phosphate crystal and the second phosphate crystal.

16 Claims, 42 Drawing Sheets

(56) References Cited

FOREIGN PATENT DOCUMENTS

| | | |
|---|---|---|
| EP | 2695856 A1 | 2/2014 |
| JP | 2009-175806 A | 8/2009 |
| JP | 2015-048266 A | 3/2015 |
| KR | 10-2014-0020605 A | 2/2014 |
| KR | 10-1423982 B1 | 8/2014 |
| KR | 10-2084896 B1 | 3/2020 |
| KR | 10-2116206 B1 | 5/2020 |
| KR | 10-2154444 B1 | 9/2020 |

OTHER PUBLICATIONS

English translation of CN-101734639-A Description (Year: 2010).*
Li X et al_Solubility of Mg-containing B-tricalcium phosphate at 25, vol. 5, No. 1, Jan 1, 2009 pp. 508-517.
European Search Report of EP Patent Application No. 20879764.7 issued on Oct. 24, 2023.
Notice of Allowance from corresponding Korean Patent Application No. 10-2020-0020709, dated Feb. 23, 2021.
International Search Report from corresponding PCT Application No. PCT/KR2020/014497, dated Jan. 27, 2021.
Berg, C., "Influence of Magnesium in the Formation of Phosphate Spheres", Uppsala University, 2017, pp. 1-31.
Chaudhry, A. A., et al.; "Synthesis and characterisation of magnesium substituted calcium phosphate bioceramic nanoparticles made via continuous hydrothermal flow synthesis", Journal of Materials Chemistry, 2008, vol. 18, pp. 5900-5908.
Jang, H. L., et al.; "Phase transformation from hydroxyapatite to the secondary bone mineral, whitlockite", Journal of Materials Chemistry B, 2015, vol. 3, pp. 1342-1349.
Written Opinion of the International Searching Authority from corresponding PCT Application No. PCT/KR2020/014497, dated Jan. 27, 2021.

* cited by examiner

FIG. 4
S1100
A process of mixing a solution including first cation and a solution including phosphate ion
(S1120)
A process of reacting the first cation with the phosphate ion to form the first phosphate material
(S1140)
S1300

```
A process of mixing a solution including second cation
and a solution including phosphate ion
(S1220)
```

```
A process of reacting the second cation with the
phosphate ion to form the second phosphate material
(S1240)
```

```
A process of mixing a solution including first cation
and a solution including phosphate ion (S2120)
```
↓
```
A process of reacting first cation with phosphate
ion to form the first phosphate material (S2140)
```
↓
( S2200 )

A process of mixing a solution including second cation and a solution including phosphate ion (S2220)

A process of reacting second cation with phosphate ion to form the second phosphate material (S2240)

A process of mixing a solution including phosphate ion and the solution including the first phosphate material and the second phosphate material (S2320)

↓

A process of aging the solution to form whitlockite (S2340)

FIG. 18
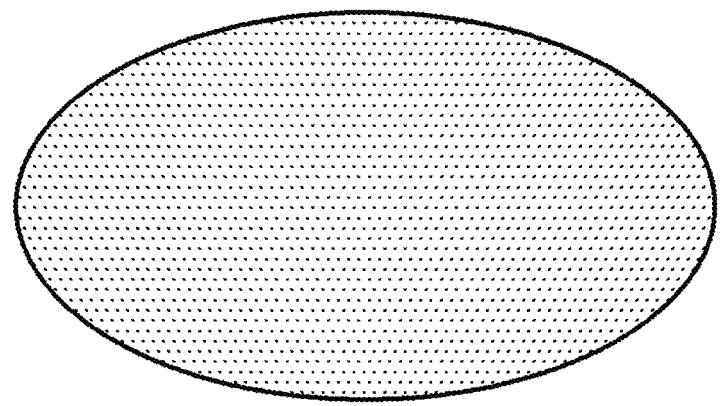
100.00%
 Whitlockite 100.00%

FIG. 26
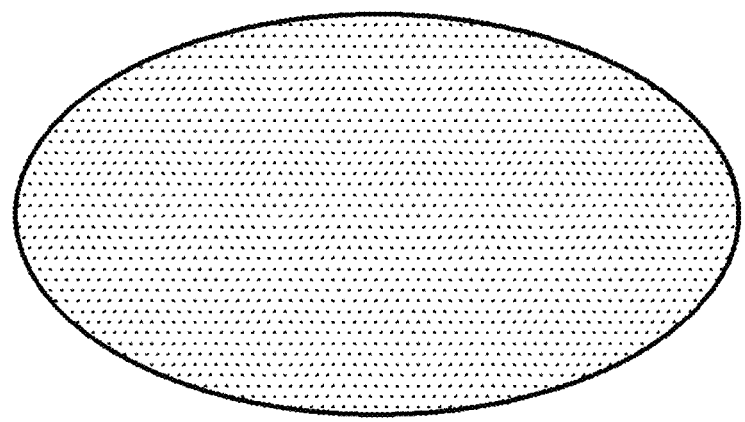
100.00%
 Whitlockite

FIG. 29
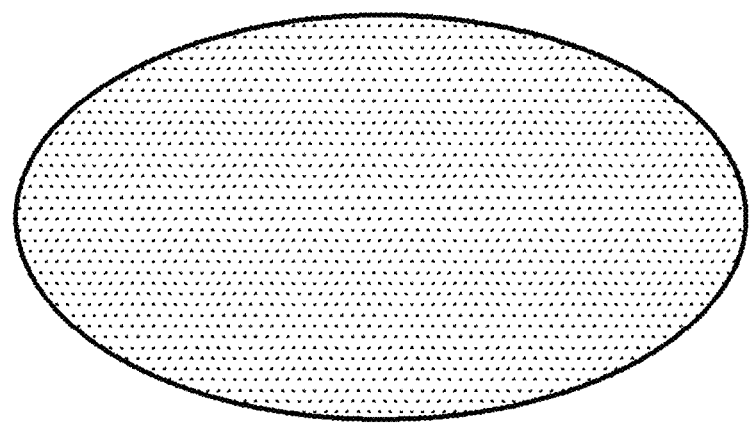
100.00%
 Whitlockite

FIG. 30
(a) 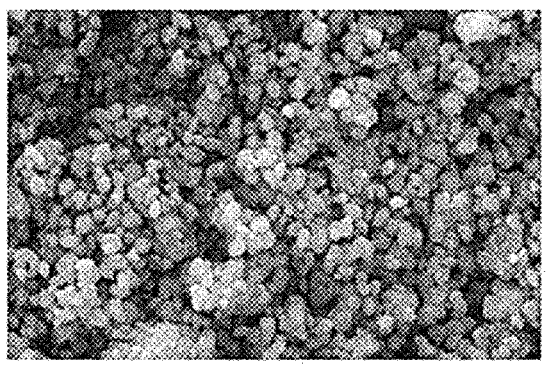
(b) 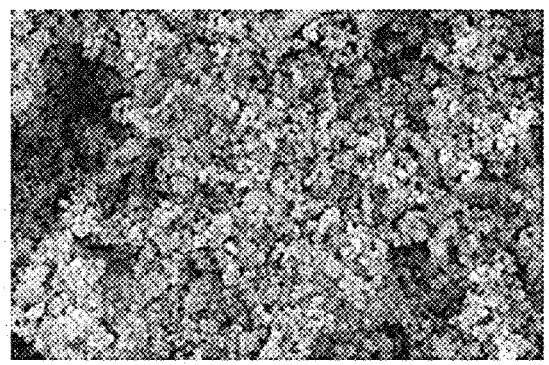
(c) 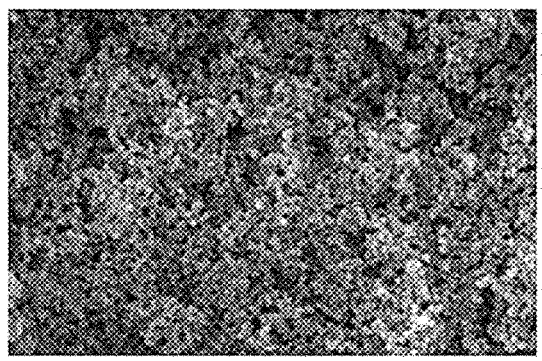
(d) 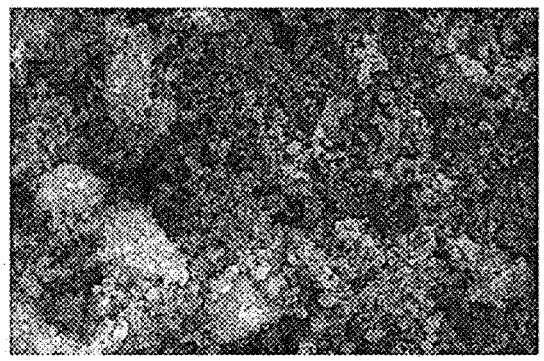

METHOD FOR PRODUCING WHITLOCKITE AND METHOD FOR CONTROLLING PARTICLE SIZE OF WHITLOCKITE CRYSTAL

CROSS-REFERENCE TO RELATED APPLICATIONS

This application is a national phase application of PCT Application No. PCT/KR2020/014497, filed on 22 Oct. 2020, which claims priority to Korean Patent Application Nos. 10-2019-0131730, filed on 22 Oct. 2019, 10-2019-0136336, filed on 30 Oct. 2019 and 10-2019-0136337, filed on 30 Oct. 2019. The entire disclosures of the applications identified in this paragraph are incorporated herein by reference.

TECHNICAL FIELD

According to the present application, a method for preparing a calcium phosphate compound is disclosed. More specifically, a method for preparing whitlockite is disclosed. In addition, a preparation method for controlling the particle size of whitlockite crystals is disclosed.

BACKGROUND ART

At the present time, calcium phosphate compounds are widely used as biocompatible inorganic materials. The calcium phosphate compound is used as a raw material for products such as artificial bone, dental restorations, bone cement, oral compositions, and fillers to be inserted into the body for regeneration or treatment of human tissue.

Representative calcium phosphate compounds include hydroxyapatite (HAp, $Ca_{10}(PO_4)_6(OH)_2$) and β-tricalcium phosphate (TCP, $Ca_3(PO_4)_2$).

Artificially synthesized HAp has excellent biocompatibility and has very similar chemical properties to bone. However, artificial HAp has a disadvantage of not being able to replace natural bone because it is not decomposed in vivo due to excessively high crystallinity.

Since β-TCP is decomposed in vivo and induces natural bone growth, many studies have been conducted on single-phase β-TCP or biphasic calcium phosphate (BCP) in which β-TCP and HAp are mixed. However, since conventional technologies have a disadvantage of being not able to synthesize nano-sized β-TCP in large quantities, there is a limit to applications of β-TCP.

To solve this problem, recently, study has been conducted on whitlockite (WH, $Ca_{18}X_2(HPO_4)_2(PO_4)_{12}$), which is a calcium phosphate compound similar to but different from HAp and β-TCP in terms of the chemical structure, composition, and crystal structure.

Whitlockite (WH), one of the most abundant biomaterials in hard tissues, is present in high proportions in the body at a young age and in the early stages of biomineralization. This implies that whitlockite plays an important role in the development of hard tissues. In particular, it is known that magnesium contained in whitlockite plays a role in promoting bone formation in surrounding bone tissues in the human body. Due to the fact that whitlockite plays an important role in the development of hard tissue, interest in whitlockite is increasing as a biocompatible inorganic material to replace the existing hydroxyapatite and beta-tricalcium phosphate (also called β-tricalciumphosphate or β-TCP). Hydroxyapatite and β-TCP have been actively studied, but not much research has been done on whitlockite. Therefore, research to elucidate the role and synthesis mechanism of whitlockite is increasingly required.

However, for the reason that it is relatively difficult to produce whitlockite compared to the production of HAp and β-TCP, not much academic study has been conducted, and industrial applications of whitlockite are rare.

In order to solve the problem of difficulty in synthesizing whitlockite, Korean Patent No. 10-1423982 (Jul. 22, 2014) discloses a method for manufacturing whitlockite.

However, this existing whitlockite manufacturing method is problematic in that the method incurs high production cost due to a long production time. And the method is complicated because an intended intermediate product must be formed in the intermediate process and very precise pH control is required to produce highly pure whitlockite.

In addition, the prior art discloses only a method for producing whitlockite but does not disclose a method for controlling the particle size of whitlockite.

In order to use whitlockite as biocompatible inorganic materials such as artificial bone, dental restorations, bone cement, etc., a process of shaping the raw material whitlockite is required. It is a well-known fact in ceramic theory that, in the case of shaping, the particle size of the raw material of whitlockite has a great influence on the properties of the final ceramic product. Therefore, there is a need for research on a method that can control the particle size of whitlockite crystals.

SUMMARY

Technical Problem

To solve the above problems, the present application provides a method for preparing whitlockite, comprising method for independently performing reaction between calcium ions with phosphate ions, and reaction between cations other than calcium ions constituting the whitlockite and phosphate ions.

The present application provides a whitlockite preparation method that can easily control process conditions while reducing preparation time compared to conventional whitlockite preparation methods.

According to an aspect of the present application, a whitlockite preparation method by spatial separation manner is disclosed.

According to another aspect of the present application, a whitlockite preparation method by temporal separation is disclosed.

To achieve the above objectives, the present application provides a whitlockite preparation method capable of controlling the particle size of whitlockite.

Technical Solution

According to one embodiment disclosed in the present application, a method for preparing a whitlockite includes: a first process of preparing a first mixed solution by mixing and reacting a first solution containing calcium ions (corresponding to first cation) and a second solution containing phosphate ions for a first time period in a first container to form a first phosphate material; a second process of preparing a second mixed solution by mixing and reacting a third solution containing cation (corresponding to a second cation) other than the calcium ions and a fourth solution containing phosphate ions for a second time period in a second container to form a second phosphate material; a third process of gathering the first mixed solution contained in the first container with the second mixed solution contained in the second container into a third mixed solution; and a fourth process of mixing and aging a fifth solution containing phosphate ions with the third mixed solution for a third time period, wherein, an amount of phosphate ions contained in the second solution is a first amount, an amount of phosphate ions contained in the fourth solution is a second amount, the first amount and the second amount are different from each other, and an initial pH of reaction in the first container and an initial pH of reaction in the second container are different from each other.

According to one embodiment of the method for preparing whitlockite disclosed in the present application, at least a part of the first time period and at least a part of the second time period may overlap.

According to one embodiment of the method for preparing whitlockite disclosed in the present application, a ratio of the amount of phosphate ions contained in the fifth solution to the sum of the amounts of phosphate ions contained in the second and the fourth solutions may be in the range of 0.3 or more and 0.55 or less.

According to one embodiment of the method for preparing whitlockite disclosed in the present application, phosphate ion may be supplied by a phosphate ion feed material including at least one selected from phosphoric acid, diammonium hydrogen phosphate, ammonium phosphate, and phosphate.

According to one embodiment of the method for preparing whitlockite disclosed in the present application, calcium ions may be supplied by a calcium ion feed material including at least one selected from calcium hydroxide, calcium carbonate, calcium nitrate, and calcium acetate.

According to one embodiment of the method for preparing whitlockite disclosed in the present application, cation other than calcium ion may be magnesium ion, and the magnesium ion may be supplied by a magnesium ion feed material including at least one selected from magnesium hydroxide, magnesium carbonate, magnesium nitrate, and magnesium acetate.

According to one embodiment of the method for preparing whitlockite disclosed in the present application, in the first process, the first solution and the second solution may be mixed for a fourth time period and reacted for a fifth time period, in which at least a part of the fourth time period and at least a part of the fifth time period may overlap. In the second process, the third solution and the fourth solution may be mixed for a sixth time period and reacted for a seventh time period, in which at least a part of the sixth time period and at least a part of the seventh time period may overlap. In the fourth process, the third mixed solution may be mixed with the fifth solution for an eighth time period, and the mixture may be aged for a ninth time period, in which at least a part of the eighth time period and at least a part of the ninth time period may overlap.

According to one embodiment of the method for preparing whitlockite disclosed in the present application, the method for preparing whitlockite may further include a fifth process of mixing an oxidizing agent for a tenth time period, in which a start point of the tenth time period may precede a start point of the first time period or a start point of the second time period, or a part of the tenth time period may overlap with at least a part of the first time period to the ninth time period.

According to one embodiment of the method for preparing whitlockite disclosed in the present application, the oxidizing agent may be hydrogen peroxide.

According to one embodiment of the method for preparing whitlockite disclosed in the present application, cation other than calcium may be magnesium ion, and the ratio of the amount of phosphate ions contained in the second solution to the amount of calcium ions contained in the first solution in the first process may be in the range of 0.6 or more and 1.4 or less, and the ratio of the amount of phosphate ions contained in the fourth solution to the amount of magnesium ions contained in the third solution in the second process may be in the range of 0.6 or more and 5 or less.

According to one embodiment of the method for preparing whitlockite disclosed in the present application, in which a start point at which the third process starts may be behind an end point of the fourth time period and an end point of the sixth time period, and the start point at which the third process starts may be behind an end point of the fifth time period.

According to one embodiment of the method for preparing whitlockite disclosed in the present application, an end point of the fifth time period may be behind an end point of the fourth time period, an end point of the seventh time period may be behind an end point of the sixth time period, and an end point of the ninth time period may be behind an end point of the eighth time period.

According to one embodiment of the method for preparing whitlockite disclosed in the present application, the first mixed solution may include a first phosphate material, the second mixed solution may include a second phosphate material, the third mixed solution may be prepared after the first mixed solution or the second mixed solution is prepared, and a mixed solution including the first phosphate material and the second phosphate material may be prepared by the third process.

According to one embodiment of the method for preparing whitlockite disclosed in the present application, the first phosphate material may be a material including hydroxyapatite, dicalcium phosphate dehydrate (DCPD), brushite, monetite, or combinations thereof.

According to one embodiment of the method for preparing whitlockite disclosed in the present application, the second phosphate material may be a material including monomagnesium phosphate, dimagnesium phosphate, newberyite, trimagnesium phosphate, or combinations thereof.

According to one embodiment of the method for preparing whitlockite disclosed in the present application, at least one or more processes selected from the first process, the second process, the third process, and the fourth process may be performed at a temperature in the range of 50° C. or above and 95° C. or below.

According to an embodiment disclosed in the present application, a method for preparing whitlockite crystal according may be a whitlockite crystal preparation method. The method for preparing whitlockite crystal may include: determining a size of a whitlockite crystal to be prepared; determining a first amount of cation other than calcium ion, based on the determined size of the crystal, wherein when the determined size of the whitlockite crystal is a first size, the first amount is determined to be a first value, wherein when the determined size is a second size larger than the first size, the first amount is determined to be a second value; mixing calcium ion and phosphate ion in order to prepare a first phosphate crystal, wherein the determined first amount of cation other than calcium ion is also mixed therewith; mixing cation other than calcium ion and phosphate ion in order to preparing a second phosphate crystal; and aging a solution including the first phosphate crystal and the second phosphate crystal, wherein the first value is larger than the second value.

According to an embodiment disclosed in the present application, the method for preparing whitlockite crystal may further include mixing an oxidizing agent, in which the oxidizing agent may be hydrogen peroxide.

According to an embodiment disclosed in the present application, a method for preparing whitlockite crystal according may be a whitlockite crystal preparation method. The method for preparing whitlockite crystal may include: determining a size of a whitlockite crystal to be prepared; determining at least one temperature selected from a first temperature, a second temperature, and a third temperature based on the determined size of the crystal, wherein when the determined size of the whitlockite crystal is a first size, at least of the first temperature, the second temperature second, and the third temperature are determined to be a third value, wherein when the determined size of the whitlockite crystal is a second size larger than the first size, at least one of the first temperature, second temperature, and the third temperature are determined to be a fourth value; mixing calcium ion and phosphate ion at the first temperature to prepare a first phosphate crystal, wherein a first amount of cation other than calcium ion is also mixed therewith; mixing a second amount of cation other than calcium ion with phosphate ion at the second temperature to prepare a second phosphate crystal; and aging a solution including the first phosphate crystal and the second phosphate crystal at the third temperature, in which the fourth value is larger than the third value.

According to one embodiment of the method for preparing whitlockite crystal disclosed in the present application, the third value and/or the fourth value may be a value in the range of 50° C. or above and 100° C. or below.

According to an embodiment disclosed in the present application, a method for preparing whitlockite crystal may include: a first process of preparing a first mixed solution by mixing calcium ions and phosphate ions at a first temperature to prepare a first phosphate crystal, in which a first cation other than calcium ions is also mixed therewith; a second process of mixing phosphate ion and a second cation other than calcium ion at a second temperature to prepare a second phosphate material; and a third process of aging a second mixed solution including the first phosphate crystal and the second phosphate crystal, wherein the first cation other than calcium ions in the first process prevents the growth of the first phosphate crystal, wherein a ratio of an amount of the first cation to an amount of the second cation is increased, the particle size of the whitlockite crystal is gradually decreased, whereby the particle size of the whitlockite crystal can be controlled. may be controlled such that the particle size of the whitlockite crystals decreases.

According to one embodiment of the method for preparing whitlockite crystal disclosed in the present application, when at least one temperature selected from the first temperature, the second temperature, and the third temperature are increased from the third value to the fourth value which is higher value than the third value, the particle size of the whitlockite crystal may be gradually increased, whereby the particle size of the whitlockite crystal can be controlled. In this case, the third value and/or the fourth value are greater than 50° C. and less than or equal to 100° C.

According to one embodiment of the method for preparing whitlockite crystal disclosed in the present application, the method for preparing whitlockite crystal may further include a fourth process of adding an oxidizing agent, in which the fourth process is performed before the first process or performed to overlap with at least a part of the first process to the third processes on the time axis.

Advantageous Effects

According to the embodiments disclosed in the present application, whitlockite preparation methods capable of significantly shortening the preparation time can be provided.

According to the embodiments disclosed in the present application, whitlockite preparation methods capable of significantly reducing process operation cost can be provided.

According to the embodiments disclosed in the present application, a method of simply and intuitively preparing whitlockite can be provided.

According to the embodiments disclosed in the present application, a method of preparing highly pure whitlockite can be provided.

According to the embodiments disclosed in the present application, a preparation method capable of controlling the particle size of whitlockite can be provided.

BRIEF DESCRIPTION OF THE DRAWINGS

FIG. 4 is a flowchart showing the subdivided steps of process S10 of forming a mixed solution including a first phosphate material of FIG. 3.

FIG. 5 is a flowchart showing the subdivided steps of process S20 of forming a mixed solution including a second phosphate material of FIG. 3.

FIG. 12 is a flowchart showing the subdivided steps of process S100 of forming a mixed solution including a first phosphate material of FIG. 11.

FIG. 13 is a flowchart showing the subdivided steps of process S200 of forming a mixed solution including a second phosphate material of FIG. 11.

FIG. 14 is a flowchart showing the subdivided steps of process S300 of aging a mixed solution including the first phosphate material and the second phosphate material of FIG. 11.

FIG. 18 is a graph showing XRD data of a resulting product prepared by the whitlockite preparation method by temporal separation according to one embodiment disclosed in the present application.

FIG. 26 is a graph showing a result of XRD data of a resulting product prepared by Experiment 4 of the whitlockite preparation method by temporal separation disclosed in the present application.

FIG. 29 is a circle graph showing XRD data of a resulting product prepared by a whitlockite preparation method by spatial separation capable of controlling the particle size of whitlockite crystals, according to one embodiment disclosed in the present application.

FIG. 30 is SEM data of a resulting product prepared by a whitlockite preparation method by spatial separation capable of controlling the particle size of whitlockite crystals, according one embodiment disclosed in the present application.

DETAILED DESCRIPTION

Figure 1:
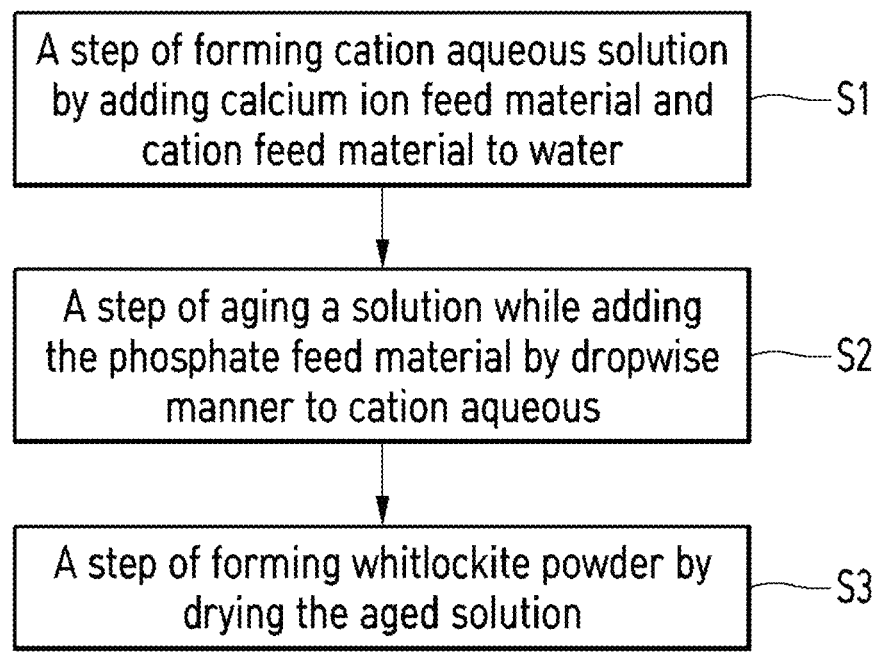
FIG. 1 is a flowchart schematically illustrating a whitlockite preparation method according to a conventional art.

1. Method of Preparing Raw Material for Whitlockite
(1) Whitlockite Preparation Method According to Conventional Art Referring to FIGS. 1 and 2, a conventional whitlockite preparation method (Korean Patent No. 10-1423982 (Jul. 22, 2014)) includes: step S1 of adding a calcium ion feed material and a cation feed material to water to obtain an aqueous cation solution; step S2 of adding, by dropwise addition, a phosphate ion feed material to the aqueous cation solution and aging the resulting the solution; and step S3 of drying the resulting solution to prepare whitlockite powder.

The conventional whitlockite preparation method has a critical drawback of long preparation time.

A first reason is that, in step S1 of adding the calcium ion feed material and the cation feed material to water to form the aqueous cation solution, the calcium ion feed material and the cation feed material for a cation other than calcium are added to water at the same time. A first reaction condition required for calcium ions to react with phosphate ions and a second reaction condition required for cations other than calcium ions to react with phosphate ions are different. However, since a calcium ion feed material and a non-calcium cation feed material are added 'at the same time', the requirement that the first reaction condition and the second reaction condition are different cannot be satisfied, resulting in an increase in the preparation time.

Figure 2:
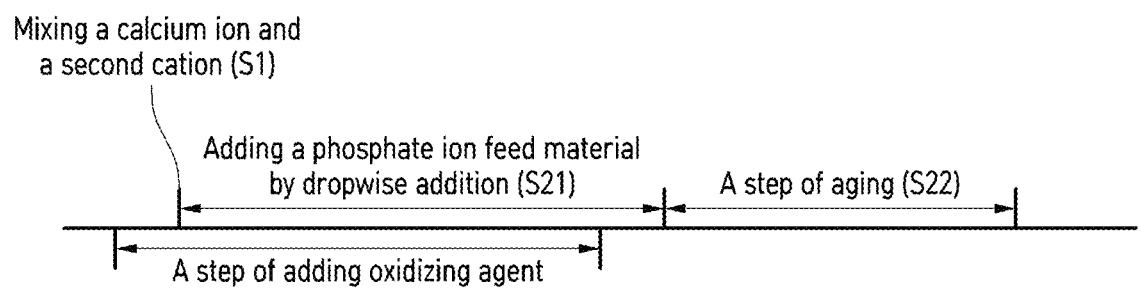
FIG. 2 is a timeline schematically showing steps of a whitlockite preparation method according to a conventional art, on a time axis.

A second reason is that the phosphate ion feed material is added slowly in a dropwise manner. Referring to FIG. 2, the phosphate ion feed material is added (S21) in a dropwise manner before the aging (S22). Therefore, it takes a long time to add all the phosphate ions required to form whitlockite, resulting in a long preparation time.

There is also a problem in that the conventional whitlockite preparation method is complicated.

Since the conventional whitlockite preparation method forms whitlockite, using pH dependency of the thermodynamic stability of the first phosphate and the second phosphate, the pH of the solution needs to be precisely controlled in the production of whitlockite. There is a problem in that the preparation method is complicated because the phosphate ion feed material is added dropwise to precisely control the pH and because the rate and amount of the phosphate ion feed material added dropwise must be accurately determined.

In order to solve these problems, there is an increasing need for a whitlockite preparation method that is simpler and finishes in a shorter time than conventional methods.

(2) Method for Preparing Whitlockite by Spatial Separation

Hereinafter, a whitlockite preparation method according to one embodiment of the present application will be described with reference to FIGS. 3 to 8.

Figure 3:
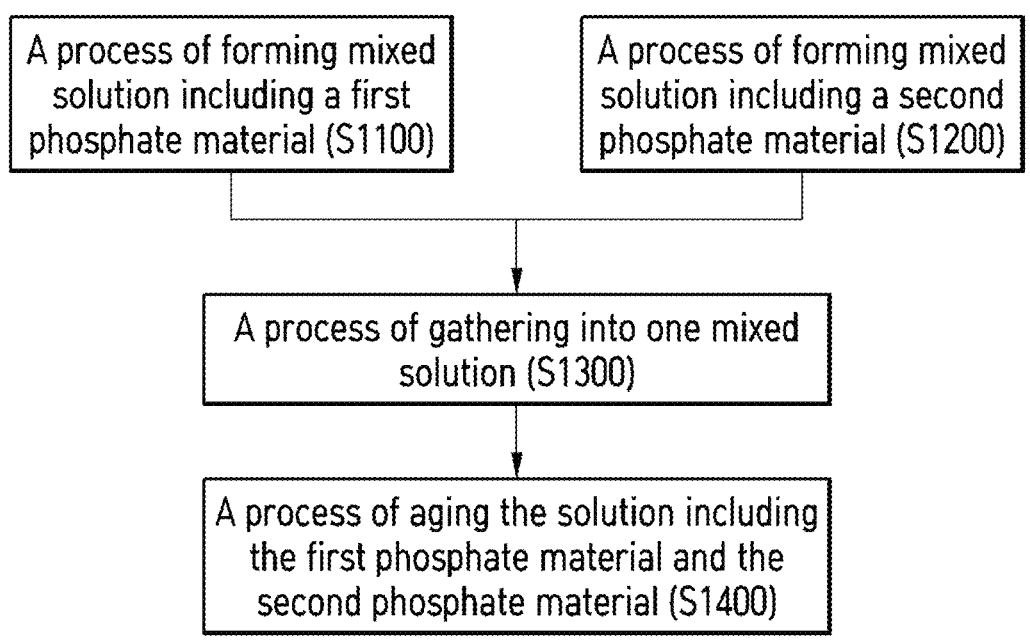
FIG. 3 is a flowchart schematically illustrating a whitlockite preparation method by spatial separation according to one embodiment disclosed in the present application.

Referring to FIG. 3, a whitlockite preparation method according to one embodiment of the present application includes process S1100 of preparing a mixed solution including a first phosphate material, process S1200 of preparing a mixed solution including a second phosphate material, process S1300 of joining the mixed solutions to prepare a mixed solution including both the first phosphate material and the second phosphate material, and process S1400 of aging the mixed solution including both the first phosphate material and the second phosphate material. In the whitlockite preparation method according to the present application, process S1100 of preparing the mixed solution including the first phosphate material and process S1200 of preparing the mixed solution including the second phosphate material are performed in different containers, respectively.

In other words, the process of preparing the mixed solution including the first phosphate material is performed in a first container, and the process of preparing the mixed solution including the second phosphate material is performed in a second container separate from the first container.

In the whitlockite preparation method disclosed by the present application, preferably, mixing and reaction may be carried out in the same container, but mixing and reaction do not necessarily have to be carried out in the same container.

In other words, according to the present application, if the mixed solution including the first phosphate material is prepared in a first container, and the mixed solution including the second phosphate material is prepared in a second container separate from the first container, the objective of the present application can be achieved.

Thanks to this spatial separation manner, preferably, process S1100 of preparing the mixed solution including the first phosphate material and process S1200 of preparing the mixed solution including the second phosphate material may proceed partially overlap on a temporal axis. That is, the time for preparing the mixed solution including the first phosphate material (S1100) and the time for preparing the mixed solution including the second phosphate material (S1200) may be partially overlapped. For example, process S1100 of preparing the mixed solution including the first phosphate material and process S1200 of preparing the mixed solution including the second phosphate material may be concurrently performed. The two processes can be carried out at the same time due to the spatial separation. This can significantly shorten the total preparation time for whitlockite.

Since process S1100 of preparing the mixed solution including the first phosphate material and process S1200 of preparing the mixed solution including the second phosphate material are carried out in separate containers, process S1300 of gathering the first phosphate material and the second phosphate material contained in respectively different containers is required to prepare a mixed solution including both the first phosphate material and the second phosphate material. Through process S1300 of combining the first phosphate material and the second phosphate material into one mixed solution, a mixed solution including both the first phosphate material and the second phosphate material is prepared.

After the mixed solution containing both the first phosphate material and the second phosphate material is prepared, the aging process (S1400) is performed.

In process S1400 of aging the solution including the first phosphate material and the second phosphate material, a solution containing phosphate ions may be added to the solution including the first phosphate material and the second phosphate material.

As described above, in the conventional whitlockite preparation method, phosphate ions are added dropwise throughout the entire process. In this way, the pH is finely adjusted such that the pH condition changes from a basic condition to an acidic condition. However, since the phosphate ions are added in a dropwise manner, there is a fatal disadvantage that it takes a long time to prepare whitlockite. For example, a first pH condition required to prepare a stabilized calcium phosphate by reacting calcium ions and phosphate ions with each other and a second pH condition required to prepare a stabilized magnesium phosphate by reacting magnesium ions and phosphate ions with each other may be different. When the dropwise addition method is used, it takes a long time to change the first pH condition to the second pH condition. The time required to change the pH conditions is one cause of the lengthy whitlockite preparation process.

In addition, there was a problem that the whitlockite preparation method was complicated because the pH had to be precisely controlled from the beginning of the reaction and through the entire aging process and because the rate and amount of the phosphate ion feed material for dropwise addition had to be accurately determined.

On the other hand, the whitlockite preparation method disclosed by the present application has the following advantages over the conventional whitlockite preparation method.

The whitlockite preparation method according to the preferred embodiment of the present invention can differently construct a first reaction condition required for calcium ions to react with phosphate ions through and a second reaction condition required for cations other than calcium ions to react with phosphate ions through spatial separation. In addition, the phosphate ion feed material is added in a lump sum manner (for example, pouring) rather than a dropwise addition manner. Therefore, the preparation time can be shortened. The reaction conditions may be determined depending on pH or the amount of phosphoric acid.

In addition, there is no need to adjust the pH in a complicated manner. Since a specific amount of phosphate ions is added, whitlockite can be prepared simply and intuitively.

Hereinafter, each of the processes will be described in more detail with reference to FIGS. 3 to 8.

In process S1100 of preparing the mixed solution including the first phosphate material, a solution including calcium ions and a solution including phosphate ions are mixed and reacted for a first time period so that a solid first phosphate material is formed in a first container.

The first phosphate material is a phosphate material comprising calcium ions. That is, it is a calcium phosphate material. Examples of the calcium phosphate material may include hydroxyapatite, dicalcium phosphate dehydrate (DCPD), brushite, monetite, or a material comprising any combination thereof. However, the calcium phosphate material is not limited to the examples. Any material in which calcium ions and phosphate ions are combined, the material may be regarded as a calcium phosphate material. Preferably, the first phosphate material may be hydroxyapatite.

The first time period refers to a period from when the solution including calcium ions and the solution including phosphate ions start to be mixed, to when the reaction for forming the first phosphate material is completed. However, in the case where the reaction for forming the first phosphate material is not completed until the start of process S1300 of gathering into one mixed solution, the first time period may be a period from when the solution including calcium ions and the solution including phosphate ions start to be mixed, to when the process of gathering into one mixed solution (S1300) starts.

The solution including calcium ions can be prepared by dissolving in water a material that contains calcium atoms, and which is easily ionized when dissolved in water. That is, the solution may be obtained by dissolving a calcium ion feed material (or a calcium ion donor material) in water. The calcium ion feed material may be calcium hydroxide, calcium carbonate, calcium nitrate, calcium acetate, or the like.

In the description above, process S1100 of forming the mixed solution including the first phosphate material is performed by mixing a solution including phosphate ions and a solution including calcium ions with each other. However, if a solution in which phosphate ions and calcium ions can coexist can be prepared, the mixed solution may be obtained by directly adding the phosphate ion feed material to be described later(or phosphate ion donor material) to the calcium ion feed material or vice versa or may be obtained by mixing the phosphate ion feed material and the calcium ion feed material into water at once.

Although a method in which the solution including phosphate ions and the solution including calcium ions are mixed with each other has been described above, in the case of obtaining the solution in which phosphate ions and calcium ions coexist by directly mixing the phosphate ion feed material and the calcium ion feed material, the first time period may be a period from the time when calcium ions and phosphate ions start to coexist to the time when the reaction of the calcium ions and the phosphate ions that coexist in an aqueous solution due to the mixing of the phosphate ion feed material and the calcium ion feed material is completed.

Referring to FIGS. 3 and 4, in process S1100, a solution including calcium ions and a solution including phosphate ions are mixed and reacted for the first time period. According to a preferred embodiment of the present application, in process S1100, the solution including calcium ions and the solution including phosphate ions are mixed for a second time period (S1120), and the solution including calcium ions and the solution including phosphate ions are reacted (S1140) for a third time period to form the mixed solution including the first phosphate material.

Figure 7:
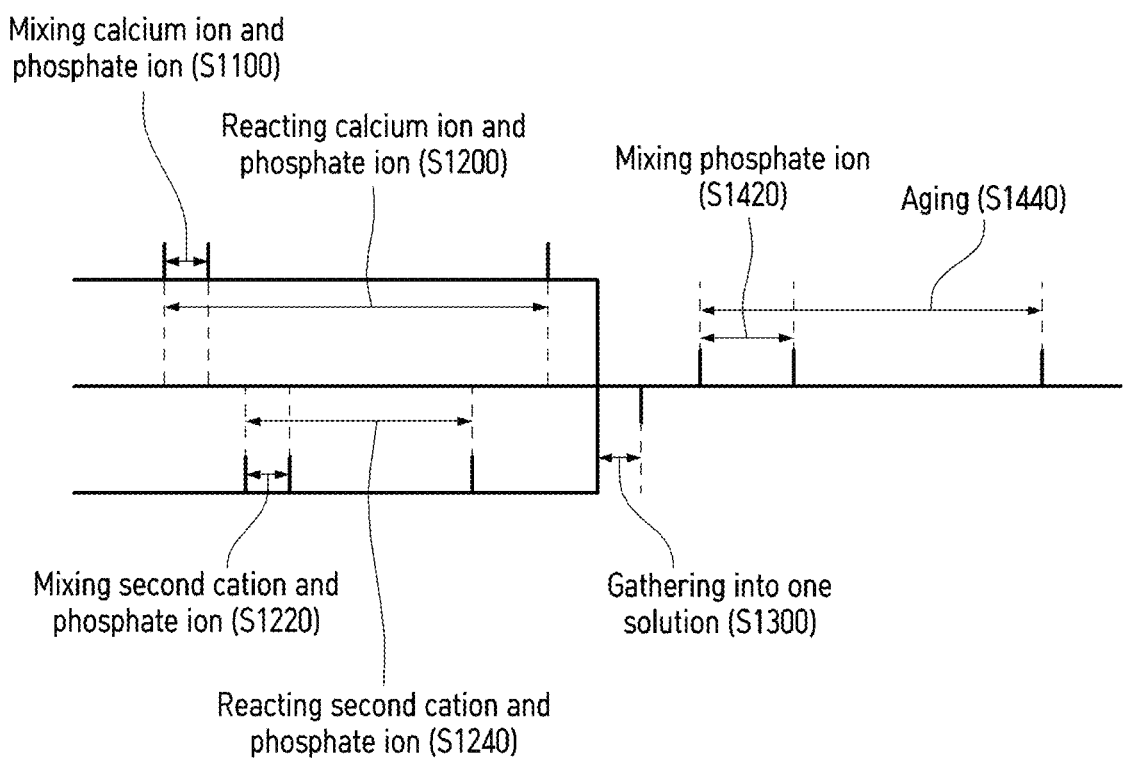
FIG. 7 is a timeline schematically illustrating a whitlockite preparation method by spatial separation according to one embodiment of the present application on a time axis.
Figure 8:
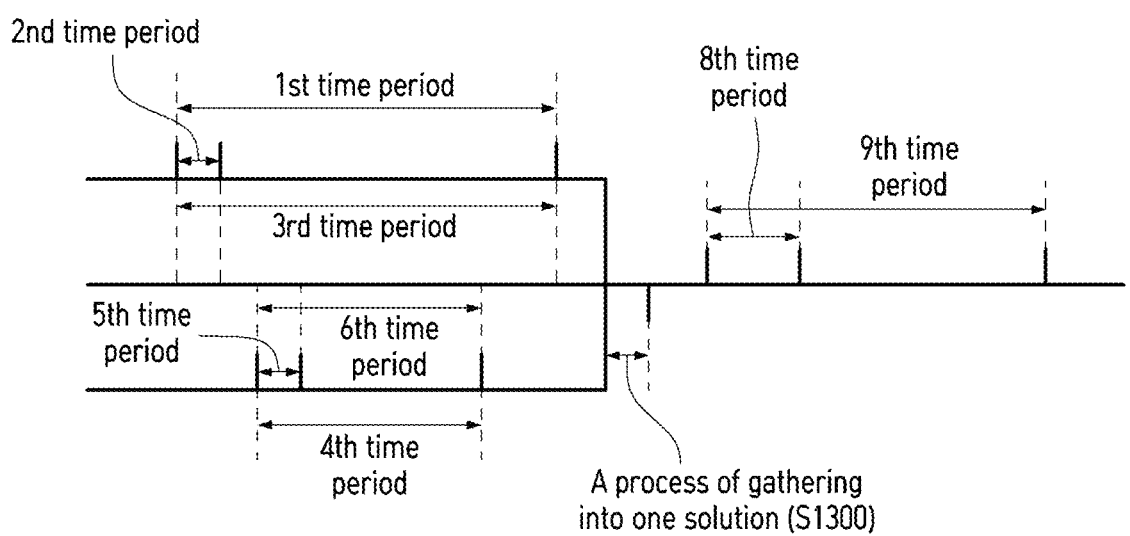
FIG. 8 is a timeline schematically illustrating time points and periods for respective processes of FIG. 7.

Referring to FIGS. 7 and 8, the second time period is, more specifically, from the time when the solution including calcium ions and the solution including phosphate ions start to mix, to the time when the mixing is completed.

The third time period refers to a period from the time when the calcium ion and the phosphate ion start to react to generate the first phosphate material to an earlier point between the time when the reaction is completed and the time when process S1300 of obtaining one mixed solution starts.

The first time period is equal to the second time period plus the third time period minus an overlap time.

At least a portion of the second time period and at least a portion of the third time period may overlap on the time axis. That is, at least a part of the mixing process (S1120) and at least a part of the reaction (S1140) may be concurrently performed.

For example, there may be a case where as soon as the solution including calcium ions and the solution including phosphate ions are mixed, a reaction to form the first phosphate material may start. In this case, the value of the first time period may be the same as the value of the third time period.

According to one embodiment according to the present application, calcium ions and phosphate ions are contained in the solution at the time when the "mixing" process S1120 of the solution containing calcium ions and the solution containing phosphate ions is completed, i.e., at an end point of the second time period. However, since the mixing process S1120 and the reaction process S1140 to be described later may be carried out partially concurrently, a calcium phosphate material, which is the first phosphate material, may also be contained in the mixed solution at the end point of the second time period.

In the "reaction" process S1140 of the solution containing calcium ions and the solution containing phosphate ions, a calcium phosphate material, which is a solid first phosphate material formed through the reaction of calcium ions and phosphate ions, may be contained in the mixed solution. Therefore, the solid calcium phosphate material may be contained in the mixed solution when the reaction process S1140 is completed. That is, the solid calcium phosphate material may be contained in the mixed solution at an end point of the third time period.

According to one embodiment of the present application, at least the process S1140 of reacting the solution including calcium ions with the solution including phosphate ions may be performed at a temperature in the range of 50° C. or above and 100° C. or below. The process S1120 of mixing the solution containing calcium ions and the solution containing phosphate ions may also be performed at a temperature in the range of 50° C. or above and 100° C. or below. However, if the requirement that the reaction process S1140 to prepare the first phosphate material is performed at a temperature in the range of 50° C. or above and 100° C. or below is satisfied, the objective of the present application can be achieved.

Referring back to FIG. 3, process S1200 of preparing a mixed solution including a second phosphate material is performed in a manner that a solution including second cations, which are cations other than calcium ions, and a solution including phosphate ions are mixed and reacted in a second container for a fourth time period to produce the second phosphate material which is solid.

The second cation is a non-calcium cation which is a cation other than a calcium ion. The second cation may be, for example, an ionic form of at least one selected from among Mg, Co, Sb, Fe, Mn, Y, Eu, Cd, Nd, Na, La, Sr, Pb, Ba, and K. Preferably the second cation may be magnesium ion The fourth time period refers to a period from the time when the solution including the second cations (i.e., non-calcium cations) and the solution including phosphate ions start to be mixed, to the time when the reaction for forming the second phosphate material is completed. However, in the case where the reaction for forming the second phosphate material is not completed until the start of process S1300 of combining into one mixed solution, the fourth time period may be a period from the time when the solution containing the cations other than calcium ions and the solution containing phosphate ions start to be mixed, to the start of process S1300 of combining into one mixed solution described later is obtained.

The second phosphate material is a phosphate material comprising second cations. That is, the second phosphate material may be a material in which the second cations and phosphate ions are combined. For example, when the second cation is a magnesium ion, the second phosphate material is a magnesium phosphate material. Examples of the magnesium phosphate material is a material including monomagnesium phosphate ($Mg(H_2PO_4)_2$), dimagnesium phosphate ($MgHPO_4$), newberyite, trimagnesium phosphate ($Mg_3(PO_4)_2$), or combinations thereof. However, the magnesium phosphate material is not limited to the examples. Any material in which magnesium ions and phosphate ions are combined, the material may be regarded as the magnesium phosphate material.

In addition, when the second cation is a cobalt ion, the second phosphate material may be cobalt(II) phosphate hydrate ($Co_3(PO_4)_2*H_2O$).

In addition, when the second cation is an iron ion, the second phosphate material may be iron(III) phosphate dihydrate ($FePO_4*2(H_2O)$), iron(III) phosphate tetrahydrate ($FePO_4*4(H_2O)$), or a combination thereof.

In addition, when the second cation is a sodium ion, the second phosphate material may be sodium phosphate ($Na_3PO_4$).

In addition, when the second cation is a potassium ion, the second phosphate material may be potassium phosphate tribasic ($K_3PO_4$).

In addition, when the second cation is a strontium ion, the second phosphate material may be strontium phosphate ($Sr_3(PO_4)_2$).

In addition, when the second cation is a barium ion, the second phosphate material may be barium phosphate ($Ba_3(PO_4)_2$).

However, the second phosphate material is not limited to the exemplified material. Any material in which the second cations and phosphate ions are combined and which can exist as combined in an aqueous solution, the material can be regarded as the second phosphate material.

The solution containing the second cations may be prepared by dissolving in water a material that includes the atomic form (X) of the second cation and which can be easily ionized when dissolved in water. That is, the solution including the second cations may be prepared by dissolving a second cation feed material (or second cation donor material) in water. The second cation feed material may be X hydroxide, X carbonate, X nitrate, X acetate, or the like.

For example, when the second cation is a magnesium ion, the solution containing the second cations may be obtained by dissolving a magnesium feed material including magnesium atoms, for example, magnesium hydroxide, magnesium carbonate, magnesium nitrate, magnesium acetate, or the like in water.

In the description above, process S1200 of forming the mixed solution containing the second phosphate material may be performed by mixing a solution containing phosphate ions and a solution containing second cations with each other. Alternatively, if a solution in which phosphate ions and the second cations coexist can be prepared, the mixed solution may be obtained by directly adding the phosphate ion feed material (or phosphate ion donor material) to the second cation feed material or vice versa, or may be obtained by concurrently pouring the phosphate ion feed material and the second cation feed material into water.

For example, when the second cation is a magnesium ion, the solution including the second cations may be prepared by dissolving solid magnesium hydroxide in water, and the resulting solution may be mixed with a solution including phosphate ions. In addition, a solid magnesium hydroxide material may be directly mixed with a solution including phosphate ions, or the phosphate ion feed material and magnesium hydroxide may be mixed in water at once.

Although a method in which the solution containing phosphate ions and the solution containing second cations are mixed with each other has been described above, in the case of obtaining the solution in which phosphate ions and the second cations coexist by mixing the phosphate ion feed material and the second cation feed material at once, the fourth time period may be a period from the time when the second cations and phosphate ions start to coexist to the time when the reaction of the second cations and the phosphate ions which coexist in an aqueous solution due to the mixing of the second cation feed material and the phosphate ion feed material is completed.

Referring to FIGS. 3 and 5, in process S1200 of forming the mixed solution including the second phosphate material, the solution including second cations which are not calcium ions and the solution including phosphate ions are mixed and reacted for the fourth time period. According to a preferred embodiment of the present application, the process S1200 of forming the mixed solution including the second phosphate material may comprise: mixing the solution including the second cations and the solution including phosphate ions for a fifth time period (S1220), and forming the mixed solution including the second phosphate material by reacting the solution including the second cation with the solution including phosphate cation for a sixth time period (S1240).

Referring to FIGS. 7 and 8, the fifth time period refers to a period, more specifically, from the time when the solution containing the second cations and the solution containing phosphate ions start to mix, to the time when the mixing is completed.

The sixth time period refers to a period from the time when the second cations and the phosphate ions start to react to generate the second phosphate material, to an earlier point between the time when the reaction is completed and the time when process S1300 of combining into one mixed solution starts.

The fourth time period is equal to the fifth time period plus the sixth time period minus an overlap time period.

At least a portion of the fifth time period and at least a portion of the sixth time period may overlap on the time axis. That is, at least a part of the mixing process S1220 and at least a part of the reaction process S1240 may be concurrently performed.

For example, as soon as the solution containing magnesium ions and the solution containing phosphate ions are mixed, the reaction for forming the second phosphate material may proceed. In this case, the value of the fourth time period may be the same as the value of the sixth time period.

According to one embodiment according to the present application, the second cations and the phosphate ions may be contained in an aqueous solution at the time when the "mixing" process S1220 of the solution containing the second cations and the solution containing phosphate ions is completed, i.e., at an end point of the fifth time period. However, since the mixing process S1220 and the reaction process S1240 to be described later may be carried out partially concurrently, the second phosphate material which is, for example, magnesium phosphate, may also be contained in the mixed solution at the end point of the fifth time period.

However, since process S1200 of preparing the mixed solution containing the second phosphate material is performed in a different container from process S1100 of preparing the mixed solution containing the first phosphate material, the solution may not contain a solid calcium phosphate material at the end point of the fifth time period.

In the "reaction" process S1240 in which the solution containing the second cations react with the solution containing phosphate ions, a solution in which the second phosphate material generated by the reaction of the second cations and phosphate ions is contained can be obtained. Therefore, the solid second phosphate material may be contained in the mixed solution at the time when the reaction process S1240 is completed, that is, at an end point of the sixth time period.

According to one embodiment of the present application, at least the reaction process S1240 in which the solution containing cations other than calcium ions and the solution containing phosphate ions react may be performed in the temperature range of 50° C. or above and 100° C. or below. The mixing process S1220 in which the solution containing cations other than calcium ions and the solution containing phosphate ions are mixed may also be performed at a temperature in the range of 50° C. or above and 100° C. or below. However, if the requirement that the reaction process S1240 to prepare the second phosphate material is performed in the temperature range of 50° C. or above and 100° C. or below is satisfied, the objective of the present application can be achieved.

Referring to FIGS. 7 and 8, process S1100 of preparing the mixed solution containing the first phosphate material and process S1200 of preparing the mixed solution containing the second phosphate material can be performed in separate containers. Therefore, the process S1100 of preparing the mixed solution containing the first phosphate material and the process S1200 of preparing the mixed solution containing the second phosphate material can be simultaneously performed. That is, at least a portion of the first time period and at least a portion of the fourth time period may overlap on the time axis.

In addition, the start and end points of the second time period may not be related with the start and end points of the fourth time period and the start and end points of the fifth time period.

In addition, the start and end points of the third time period may not be related with the start and end points of the fourth time period and the start and end points of the fifth time period.

In other words, since the two processes are performed in a spatially separated manner, process S1100 of making the mixed solution containing the first phosphate material and process S1200 of making the mixed solution containing the second phosphate material can be performed independently.

In the case of the conventional whitlockite preparation method, a solution containing phosphate ions is added dropwise to a solution containing both the calcium ions and the second cations other than calcium ions in one container. Therefore, the first phosphate material is formed first and then the second phosphate material is formed in the same container. Next, the pH is gradually lowered until reaching an acidic condition. Thus, some atoms of the first phosphate material are replaced with some atoms of the second phosphate material or with ions contained in the aqueous solution, thereby changing the crystalline structure to form whitlockite. As such, in the conventional whitlockite preparation method, the second phosphate material is formed "after" the first phosphate material is formed, and the phosphate ions are added dropwise. For these reasons, the preparation time is lengthy.

In the case of the whitlockite preparation method according to the present application, the first phosphate material and the second phosphate material can be simultaneously formed in a spatial separated manner. In addition, reaction conditions required to form a targeted intermediate product are set in the container from the beginning. For example, the amount of the phosphoric acid and pH may be appropriately provided. In order to create a different reaction environment in each container, the amount of phosphate ion to be added and pH can be appropriately adjusted. In other words, a first reaction condition required to form the first phosphate material and a second reaction condition required to form the second phosphate material may differ from each other.

In the conventional whitlockite preparation method, the first reaction condition and the second reaction condition cannot be simultaneously provided. That is, the first reaction condition is set in the reaction container at the first time point, and then the reaction condition in the reaction container is changed to the second reaction condition at the second time point as the reaction proceeds. Therefore, the process time cannot not be reduced.

However, in the whitlockite preparation method according to the present application, the first reaction condition is initially set in the first container and the second reaction condition is initially set in the second container. Therefore, it is allowed that the first and second phosphate materials are concurrently formed in the first and second containers, respectively. In other words, since the reaction conditions of the respective containers can be differently built from the beginning through spatial separation so that the different reactions concurrently proceed in the first container and the second container, the preparation time for whitlockite can be significantly reduced.

In addition, the fact that phosphate ions can be added by pouring instead of dropwise addition also contributes to a significant reduction in the whitlockite preparation time. The pouring method will be described later in detail. Since the preparation time is reduced, there is also an effect of reducing the operating cost for the process.

Referring back to FIG. 3, in order to obtain a mixed solution containing both the first phosphate material and the second phosphate material, the method of the present application may comprise a process of S1300 gathering the first phosphate material contained in the first container and the second phosphate material contained in the second container into one mixed solution. When gathered to one mixed solution, the first phosphate material and second phosphate material may be gathered in the first container, the second container, or a third container.

According to a preferred embodiment of the present application, by process S1300 of combining a solution including the first phosphate material and a solution including the second phosphate material into one mixed solution, a mixed solution containing both the first phosphate material and the second phosphate material is prepared. For example, the result of the process S1300 may include both hydroxyapatite and dimagnesium phosphate.

Referring back to FIGS. 7 and 8, a start point at which process S1300 of gathering the mixed solution of the first container including the first phosphate material and the mixed solution of the second container including the second phosphate material into one mixed solution starts may be behind the end point of the second time period or the end point of the fifth time period.

That is, the process S1300 may start after the time point (the end point of the second time period) at which the mixing process S1120 of preparing the mixed solution including the first phosphate material is completed.

Likewise, the process S1300 may start after the time point (the end point of the fifth time period) at which the mixing process S1220 of preparing the mixed solution including the second phosphate material is completed.

The start point at which the process S1300 of gathering the mixed solution of the first container including the first phosphate material and the mixed solution of the second container including the second phosphate material into one mixed solution starts may be behind the end point of the third time period. In other words, in the whitlockite preparation method disclosed by the present application, it is not necessary for the process S1300 of gathering two solutions to be one mixed solution to be performed after the reaction the process S1140 of preparing the mixed solution including the first phosphate material is completed. However, preferably, the process S1300 may start after the reaction process S1140 of preparing the mixed solution including the first phosphate material is completed.

Referring back to FIG. 3, after the mixed solution containing both the first phosphate material and the second phosphate material is prepared, process S1400 of mixing a solution containing phosphate ions and aging the resulting solution for a seventh time period is performed. In this case, a condition allowing for a sufficient phase transformation to form whitlockite in the mixed solution containing the first phosphate material and the second phosphate material may be built.

Figure 6:
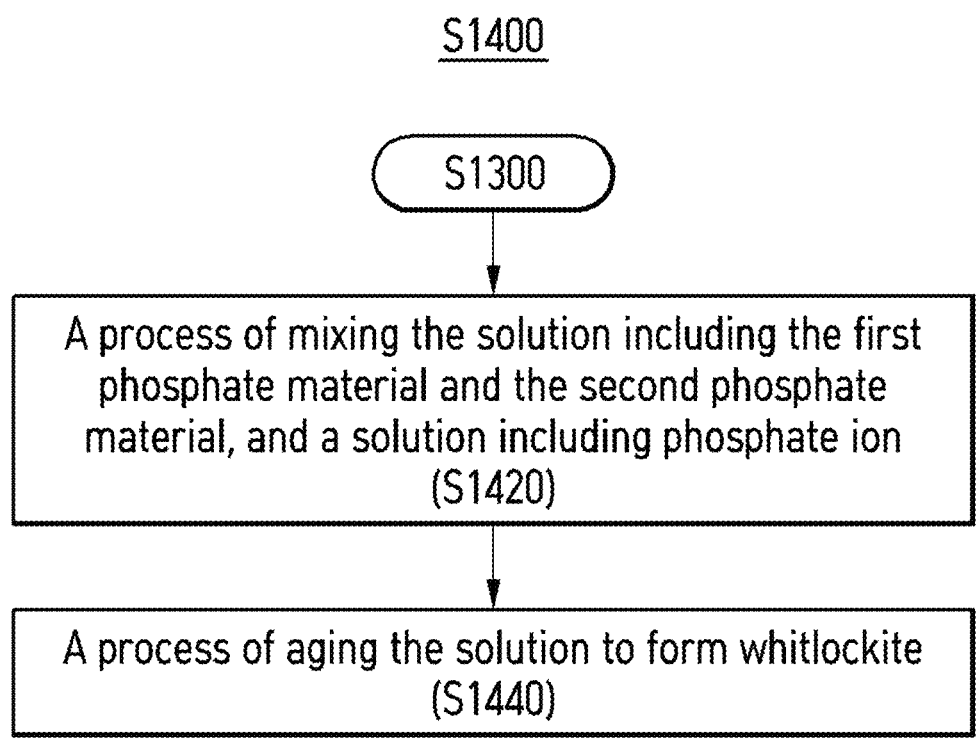
FIG. 6 is a flowchart showing the subdivided steps of process S40 of aging a mixed solution including the first phosphate material and the second phosphate material of FIG. 3.

A description will be given with reference to FIGS. 3 and 6. According to a preferred embodiment of the present application, process S1400 of aging the mixed solution including both the first phosphate material and the second phosphate material may include: process S1420 of mixing a solution including phosphate ions with the mixed solution including the first phosphate material and the second phosphate material for an eighth time period; and process S1440 of forming whitlockite, by aging the resulting solution for a ninth time period so that crystalline structure of the first phosphate material in which some of atoms are substituted by another atoms is changed.

Referring back to FIGS. 7 and 8, the eighth time period refers to a period from the time at which the mixing of the solution containing phosphate ions with the mixed solution containing the first phosphate material and the second phosphate material is started, to the time at which the mixing is completed.

The ninth time period refers to a period from the time at which the mixed solution containing the first phosphate material and the second phosphate material starts to age, to the time at which the aging is completed to form whitlockite.

The seventh time period is equal to the eighth time period plus the ninth time period minus an overlap time period.

At least a portion of the eighth time period and at least a portion of the ninth time period may overlap on the time axis. That is, the mixing process S1420 for mixing the solution containing phosphate ions and the mixed solution containing the first phosphate material and the second phosphate material and the aging process 1440 may be performed simultaneously.

For example, as soon as the solution containing phosphate ions is mixed with the mixed solution containing hydroxyapatite and dimagnesium phosphate, the mixed solution containing hydroxyapatite and magnesium phosphate may be aged. In this case, the value of the seventh time period may be the same as the value of the ninth time period.

According to one embodiment of the present application, at the time at which the mixing process S1420 for mixing the mixed solution containing the first phosphate material and the second phosphate material with the solution containing phosphate ions is completed, i.e., at an end point of the eighth time period, all of the first phosphate material, the second phosphate material, and the phosphate ions may be included in the mixed solution. However, since the mixing process S1420 and the aging process S1440 to be described later may be carried out partially concurrently, whitlockite may also be contained in the mixed solution at the end point of the eighth time period.

In the aging process S1440 of the mixed solution including the first phosphate material, the second phosphate material, and the phosphate ions, the aging is performed for the ninth time period. In this process, the crystalline structure of the first phosphate material changes and the whitlockite is formed. Accordingly, at an end point of the ninth time period, the mixed solution may contain solid phase whitlockite.

According to an embodiment according to the present application, the "aging" process S1440 of the mixed solution containing the first phosphate material, the second phosphate material, and phosphate ions may be performed at a temperature in the range of 50° C. or above and 100° C. or below. The "mixing" process S1420 for mixing the mixed solution containing the first phosphate material and the second phosphate material with the solution containing the phosphate ions may also be performed at a temperature in the range of 550° C. or above and 100° C. or below. However, when the requirement that the "aging" process S1440 of the mixed solution containing the first phosphate material, the second phosphate material, and phosphate ions is performed in the temperature range of 50° C. or above and 100° C. or below is satisfied, the objective of the present application can be achieved.

In process S1100 of forming the mixed solution including the first phosphate material, process S1200 of forming the mixed solution including the second phosphate material, and process S1400 of aging the solution including the first phosphate material and the second phosphate material, a solution including phosphate ions is mixed.

The phosphate ions may include all forms of phosphoric acid that can exist in an aqueous solution depending on the pH. Generally speaking, the phosphate ion may refer to $PO_4^{3-}$, but is not limited thereto, and may include any form of phosphoric acid that can exist in an aqueous solution. For example, phosphate ion ($PO_4^{3-}$), hydrogen phosphate ion ($HPO_4^{2-}$), dihydrogen phosphate ion ($H_2PO_4^{-}$), and phosphoric acid ($H_3PO_4$) are all regarded as phosphate ions.

The phosphate ion may be supplied by at least one phosphate ion feed material selected from phosphoric acid, diammonium hydrogen phosphate, ammonium phosphate, and phosphate. Preferably, the phosphate ion may be supplied by phosphoric acid.

The solution containing phosphate ions may be prepared by dissolving a phosphate ion feed material (for example, diammonium phosphate, ammonium phosphate, or phosphate) present as a solid at room temperature in water or an aqueous solution. Alternatively, in the case of a phosphate ion feed material, such as phosphoric acid, water is present as a solvent. In this case, the phosphate ion feed material itself may contain phosphate ions.

For example, when a solution including calcium ions and a solution including phosphate ions are mixed in process S1100 of forming a mixed solution including the first phosphate material, an aqueous solution in which solid diammonium phosphate is dissolved in water may be mixed with a solution including calcium ions, or a phosphate aqueous solution in which a phosphate ion feed material itself contains water as a solvent may be mixed with a solution including calcium ions.

In process S1100 of forming the mixed solution including the first phosphate material, process S1200 of forming the mixed solution including the second phosphate material, and process S1400 of aging the solution including the first phosphate material and the second phosphate material, when a solution including phosphate ions is added and mixed, the solution may be added by pouring. The addition by pouring is different from dropwise addition and refers to a method in which substantially the entire volume of a solution to be added is added in a lump sum manner in a very short time. For example, in the conventional whitlockite preparation method, a solution containing phosphate ions was continuously mixed in a dropwise manner at a volume flow rate of 12.5 ml/min. On the other hand, in the whitlockite preparation method according to an embodiment of the present application, the solution containing phosphate ions may be mixed at once at a volume flow rate of 2 ml/sec (120 ml/min) to 130 ml/sec (7800 ml/min). The mixing time of the solution containing the phosphate ions is shortened, and thus the whitlockite preparation time can be shortened.

That is, the second time period, the fifth time period, or the eighth time period may be substantially a very short period of time (for example, less than about 1 second). However, depending on the volume of the solution containing the phosphate ions, the second time period, the fifth time period, or the eighth time period may be increased to several seconds to several tens of seconds.

The volume of the phosphate ion-containing solution used in process S1100 of forming the mixed solution containing the first phosphate material and process 1200 of forming the mixed solution containing the second phosphate material may be determined according to the stoichiometric ratio and pH which vary depending on the purpose of the formation of a phosphate material.

For example, in the first container, a phosphate ion feed material containing an amount of phosphate ions determined according to a stoichiometric ratio to form hydroxyapatite, which is one of the first phosphate materials, by reacting calcium ions and phosphate ions may be mixed. In addition, a phosphate ion feed material including an amount of phosphate ions determined according to the pH of the mixed solution for stably forming the first phosphate material and maintaining a stable state may be mixed. For example, when phosphoric acid is used as a phosphate ion feed material, a first amount (volume) of phosphoric acid may be mixed. In this case, the first amount may be determined in consideration of an amount (for example, mole) of phosphate ions to reliably generate hydroxyapatite and an amount (for example, mole) of hydrogen ion to provide pH at which hydroxyapatite can be stably maintained. Alternatively, when phosphoric acid is used as a phosphate ion feed material, the amount of phosphoric acid determined depending on the amount (mole) of phosphate ions for stable formation of hydroxyapatite may be mixed, and then a substance other than phosphoric acid may be additionally mixed to provide (or adjust) the pH at which the generated hydroxyapatite can be stably maintained.

In this case, preferably, the ratio of the amount of phosphate ions (mole) to the amount of calcium ions (mole) mixed in process S1100 of forming the mixed solution containing the first phosphate material is in the range of 0.6 or more and 1.4 or less. In the case of a ratio outside this range, other substances aside from whitlockite may be generated and mixed in the resultant product.

Likewise, in the second container, a phosphate ion feed material containing phosphate ions may be added by mixing and reacting with magnesium ions, taking into account the stoichiometric ratio to form a second phosphate material which is preferably dimagnesium phosphate ($MgHPO_4$). In addition, a phosphate ion feed material containing phosphate ions may be mixed, taking into account the pH for stably generating the second phosphate material and maintaining a stable state of the second phosphate material. For example, in consideration of an amount of phosphate ions (mole) for stably generating dimagnesium phosphate from magnesium ions and phosphate ions and an amount of hydrogen ions (mole) for providing pH at which dimagnesium phosphate can be stably maintained, a second amount (volume) of the phosphoric acid to be mixed may be determined. Alternatively, when phosphoric acid is used as a phosphate ion feed material, the amount of phosphoric acid (volume) determined depending on the amount (mole) of phosphate ions for stable formation of dimagnesium phosphate may be mixed, and then a substance other than phosphoric acid may be additionally mixed to provide (or adjust) the pH at which the generated dimagnesium phosphate can be stably maintained.

In this case, preferably, the ratio of the amount of phosphate ions (mole) to the amount of magnesium ions (mole) mixed in process S1200 of forming the mixed solution containing the second phosphate material is in the range of 0.6 or more and 5 or less. In the case of a ratio outside this range, substances aside from whitlockite may be generated and mixed in the resultant product.

In this case, the first amount (volume) of the phosphoric acid and the second amount (volume) of the phosphoric acid may be the same, but preferably, the first amount and the second amount may be different.

The volume of the solution containing phosphate ions mixed in process S1400 of aging the solution containing the first phosphate material and the second phosphate material is determined depending on the pH at which whitlockite can be generated from the first phosphate material and the second phosphate material or on the target amount of whitlockite to be generated. For example, the amount of the solution containing the phosphate ions may be determined depending on the pH condition at which whitlockite can be generated through ion exchange between hydroxyapatite and magnesium phosphate. However, since a substance other than phosphoric acid for pH adjustment can be mixed, phosphoric acid is first mixed to supply phosphate ions taking the target amount of whitlockite to be generated into account, and a substance other than phosphoric acid for pH adjustment may then be additionally mixed.

When a feed material (for example, diammonium hydrogen phosphate, ammonium phosphate, or phosphate) other than phosphoric acid is used as the phosphate ion feed material, a solution containing hydrogen ions for pH adjusting may be added along with the solution containing phosphate ions. For example, when solid diammonium hydrogen phosphate is dissolved to prepare a solution containing phosphate ions, and the resulting solution is then added to the mixed solution containing the first phosphate material and the second phosphate material, a solution containing hydrogen ions (or a solution for pH adjustment) may be additionally added so that the mixed solution can be aged at the pH at which whitlockite can be stably generated.

In addition, the amount (volume) of the solution containing phosphate ions mixed in process S1400 of aging the solution containing the first phosphate material and the second phosphate material is determined depending on the ratio of the total amount of cations to the total amount of anions to form whitlockite.

For example, the amount of a phosphoric acid solution containing phosphate ions required to form a predetermined amount of whitlockite is a third amount (volume), the amount of a phosphoric acid solution to be mixed in process S1100 of forming the mixed solution containing the first phosphate material is a first amount (volume), and the amount of a phosphoric acid solution to be mixed in process S1200 of forming the mixed solution containing the second phosphate material is a second amount (volume), the amount of a phosphoric acid solution to be mixed in process S1400 of aging the mixed solution containing both the first phosphate material and the second phosphate material is obtained by the equation "third amount−(first amount+second amount)".

Preferably, the ratio of the amount of the phosphoric acid solution mixed in process 1400 of aging the mixed solution containing both the first phosphate material and the second phosphate material to the sum of the first amount and the second amount is in the range of 0.3 or more 0.55 or less. In the case of a ratio outside the range, substances aside from whitlockite may be generated and mixed in the resultant.

According to an embodiment disclosed in the present application, whitlockite can be prepared by adding a predetermined amount of phosphate ions three times without highly precisely adjusting the pH. Therefore, this method has the advantage of being able to manufacture whitlockite in an intuitive and clear way and in a much simpler manner than conventional whitlockite preparation methods.

Referring back to FIGS. 7 and 8, since the solution containing phosphate ions is mixed by pouring, the end point of the third time period may be behind the end point of the second time period.

In other words, process S1120 of mixing the solution containing calcium ions with the solution containing phosphate ions is completed before the time point at which the reaction for forming the first phosphate material is completed (end point of the third time period). For example, when the mixing of the solution containing phosphate ions with the solution containing calcium ions is completed within a short time such as one second by pouring, the reaction for forming the first phosphate material may continuously proceed even after the completion of the mixing (i.e., the end point of the second time period).

Similarly, the end point of the sixth time period may be behind the end point of the fifth time period. In other words, process S1220 of mixing a solution containing second cations with a solution containing phosphate ions may be completed before the time point at which the reaction for forming the second phosphate material is completed (end point of the sixth time period). For example, when the mixing of the solution containing phosphate ions with the solution containing the second cations is completed within a short time such as one second by pouring, the reaction for forming the second phosphate material may continuously proceed even after the completion of the mixing (i.e., the end point of the fifth time period).

Similarly, the end point of the ninth time period may be behind the end point of the eighth time period. In other words, process S1420 of mixing the solution containing the first phosphate material and the second phosphate material with the solution containing phosphate ions may be completed before the time point at which the aging for forming whitlockite is completed (end point of the ninth time period). For example, when the mixing of the solution containing phosphate ions with the solution containing the first phosphate material and the second phosphate material is completed within a one second by pouring, the aging for forming whitlockite may continuously proceed even after the completion of the mixing (i.e., the end point of the eighth time period).

In addition, according to one embodiment of the present application, in each of process S1100 of forming a mixed solution containing a first phosphate material, process S1200 of forming a mixed solution containing a second phosphate material, and process S1400 of aging a mixed solution containing the first phosphate material and the second phosphate material, a solution containing phosphate ions is added and mixed.

In this case, the solution containing phosphate ions may be mixed three times at predetermined time intervals.

In other words, a start point of the eighth time period may be behind the end point of the second time period and the end point of the fifth time period. For example, after a predetermined time elapses from the time point at which process S1120 of mixing the solution containing calcium ions with the solution containing phosphate ions is completed (end point of the second time period), process S1420 of mixing the solution containing the first phosphate material and the second phosphate material with a solution containing phosphate ions may start.

In addition, after a predetermined time elapses from the time point at which process S1220 of mixing the solution containing second cations with the solution containing phosphate ions is completed (end point of the fifth time period), process S1420 of mixing the solution containing the first phosphate material and the second phosphate material with a solution containing phosphate ions may be started.

However, since process S1120 of mixing the solution containing calcium ions with the solution containing phosphate ions and process S1220 of mixing the solution containing the second cations with the solution containing phosphate ions can be performed at the same time on the time axis, the order of the end point of the second time period and the end point of the fifth time period on the time axis are irrespective with each other, and may be exactly the same point on the time axis.

In process S1440 of aging the solution containing the first phosphate material and the second phosphate material, the second cations included in liquid phase of the mixed solution or the second cations derived from a solid second phosphate material is substituted to some atoms in the first phosphate material, and binds in the form of atoms. And some atom substituted from the first phosphate material may be in ionic form in the liquid phase. Next, since the first phosphate material which is partially substituted with the second cations is aged, the crystalline structure changes through a phase transformation, thereby forming whitlockite.

For example, the crystalline structure of hydroxyapatite before some calcium atoms of the hydroxyapatite are substituted with magnesium atoms is a hexagonal structure. Since some calcium atoms are substituted with magnesium atoms and aged, the structure of hydroxyapatite changes into a rhombohedral structure, thereby forming whitlockite. In other words, hydroxyapatite has a hexagonal structure, whitlockite has a rhombohedral structure different from the structure of hydroxyapatite. When the hydroxyapatite some of calcium ions of which are substituted with magnesium ions is aged, the crystalline structure of the hydroxyapatite undergoes a phase transformation, turning into whitlockite.

According to a preferred embodiment of the present invention, at least one or more processes selected from process S1100 of forming the mixed solution including the first phosphate material, process S1200 of forming the mixed solution including the second phosphate material, process S1300 of gathering the two solutions into one mixed solution, and process S1400 of aging the mixed solution including the first phosphate material and the second phosphate material may be performed at a temperature in the range of 50° C. or above and 95° C. or below.

According to an embodiment disclosed by the present application, in the whitlockite preparation method, an oxidizing agent may be further added (or mixed) in at least one or more processes selected from process S1100 of forming the mixed solution including the first phosphate material, process S1200 of forming the mixed solution including the second phosphate material, process S1300 of gathering the two mixed solutions into one mixed solution, and process S1400 of aging the resulting mixed solution including the first phosphate material and the second phosphate material. For example, in process S1100 of forming the mixed solution including the first phosphate material, the oxidizing agent may be added when mixing a solution including first cations with a solution including phosphate ions (S1120).

Alternatively, the oxidizing agent may be added before a start point of the first time period, which is the start time of process S1100 of forming the mixed solution containing the first phosphate material. For example, the oxidizing agent may be added to the first container before process S1100 of forming the mixed solution containing the first phosphate material is started.

Alternatively, the oxidizing agent may be added before a start point of the fourth time period, which is the start time of process S1200 of forming the mixed solution containing the second phosphate material. For example, the oxidizing agent may be added to the second container before process S1200 of forming the mixed solution containing the second phosphate material is started.

The whitlockite preparation method by spatial separational manner according to one embodiment of the present application may further include a fifth process of mixing the oxidizing agent for a tenth time period. In this process, a start point of the tenth time period is prior to the start point of the first time period or the fourth time period or may overlap with at least a portion of the first time period to the ninth time period on the time axis.

The addition of the oxidizing agent reduces the preparation time for whitlockite crystal.

Preferably, the oxidizing agent may be hydrogen peroxide.

The whitlockite preparation method may further include filtering, washing, oven drying, ball milling, and sieving processes.

Whitlockite that is prepared by the method of the present application can be used as a raw material for products such as artificial bone, dental restorations, bone cement, oral compositions, and fillers to be inserted into the body for regeneration or treatment of human tissue.

(2)-1 Experimental Example

In an experiment (Experiment 1) in connection with the whitlockite preparation method by spatial separation according to the present embodiment, the amount of magnesium ions were about 26% by mole with respect to the total amount of all cations, and the molar ratio of the total amount of phosphate ions to the total amount of all cations was 1:1. Aging for the formation of whitlockite was performed at 80° C.

In a first container, 6.85 g (about 0.0924 mole) of solid calcium hydroxide was dissolved in 125 ml of distilled water to obtain of a solution containing calcium ions. That is, 125 ml of a 0.74 M aqueous calcium hydroxide solution was prepared. After that, the solution was mixed with 3.81 ml of an 85% phosphoric acid solution containing phosphate ions (107.19 ml of distilled water, i.e., 111 mL of 0.5 M aqueous phosphoric acid solution). Thereafter, stirring was performed at 80° C. for 1 hour to form a calcium phosphate material.

In a second container, 1.90 g (about 0.032579 mol) of solid magnesium hydroxide was dissolved in 125 ml of distilled water to obtain of a solution containing magnesium ions (0.26M, 125 mL aqueous magnesium hydroxide solution). Next, the solution was mixed with 2.23 ml of an 85% phosphoric acid solution containing phosphate ions (62.77 ml of distilled water, i.e., 65 ml of a 0.5M aqueous phosphoric acid solution). Thereafter, stirring was performed at 80° C. for 1 hour to form a magnesium phosphate material. In this case, the molar ratio of the number of moles of magnesium ions to the total number of moles of all cations, which is the sum of the number of moles of magnesium ions and the number of moles of calcium ions, was 26%. The ratio of the amount (moles) of phosphate ions added to the first container and the amount (moles) of phosphate ions added to the second container, or the ratio of the amount (volume) of the phosphoric acid solution mixed in the first container and the amount (volume) of the phosphoric acid solution mixed in the second container was 1.7:1. That is, the amount (moles) of phosphate ions added to the first container and the amount (moles) of phosphate ions added to the second container were different from each other.

Then, the mixed solution of the first container and the mixed solution of the second container were added into one mixed solution. Thus, a mixed solution containing the calcium phosphate material and the magnesium phosphate material was obtained.

Next, 2.54 ml of an 85% phosphoric acid solution containing phosphate ions (71.46 ml of distilled water, i.e., 74 ml of 0.5M aqueous phosphoric acid solution) was mixed with the mixed solution containing the calcium phosphate material and the magnesium phosphate material. Thereafter, aging of the mixed solution was performed. To this end, the mixed solution was stirred at 80° C. for 23 hours. When the solution containing phosphate ions was added, the solution was not added by dropwise addition but by pouring. That is, phosphoric acid in an amount corresponding to each was added three times through pouring manner.

After the mixed solution was aged for 23 hours, the mixed solution was filtered, and the residue was washed, oven dried, ball milled, and sieved to prepare a dried powder.

Figure 9:
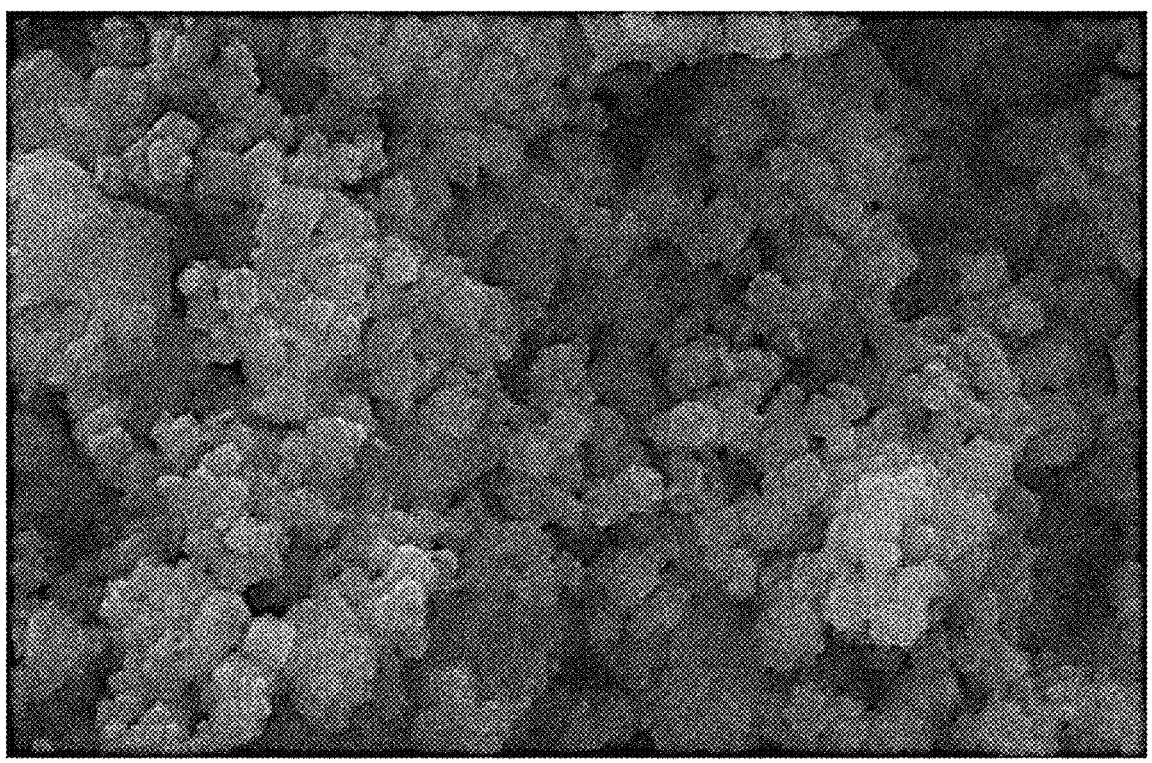
FIG. 9 is SEM data of a resulting product prepared by the whitlockite preparation method by spatial separation according one embodiment of the present application.
Figure 10:
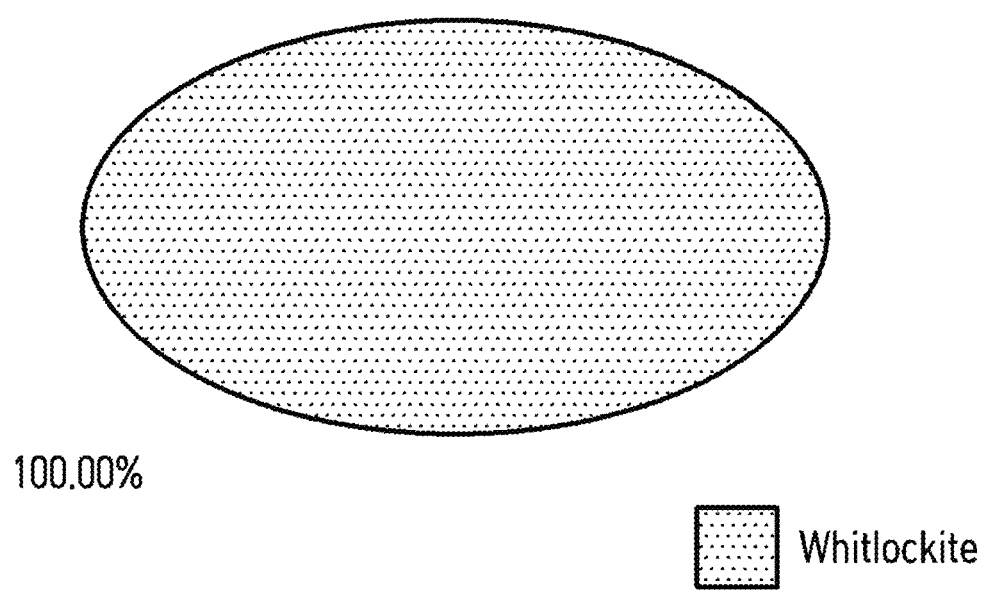
FIG. 10 is a graph showing XRD data of a resulting product prepared by the whitlockite preparation method by spatial separation according to one embodiment disclosed in the present application.

Thereafter, the powder was analyzed through SEM and XRD. Referring to FIGS. 9 and 10, it was confirmed that a highly pure whitlockite powder having various particle shapes and fine particle sizes was synthesized through the present experiment. SEM data shown in FIG. 9 is data of 50000-fold magnification of the produced crystal.

(3) Method for Preparing Whitlockite by Temporal Separation

Figure 11:
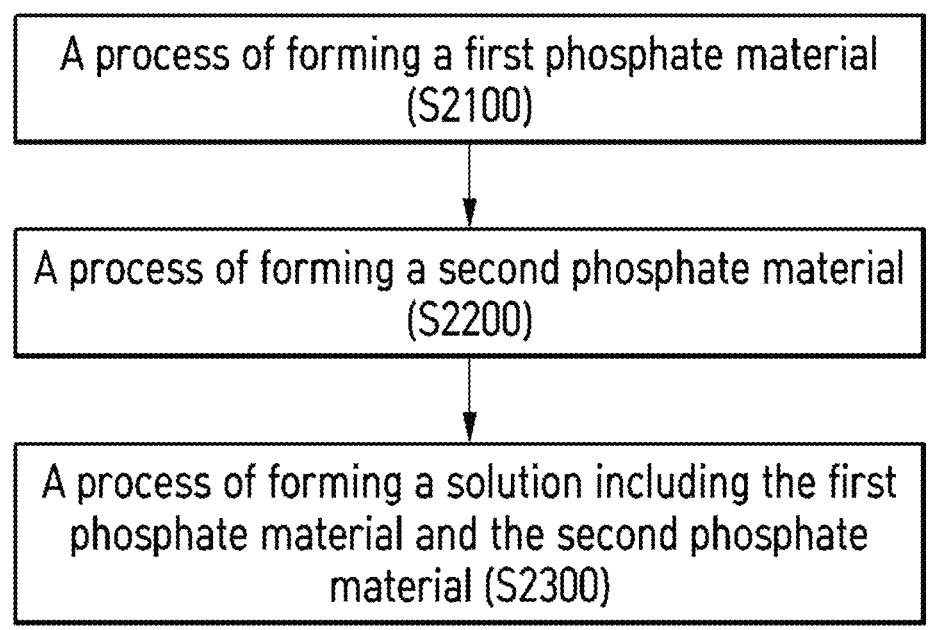
FIG. 11 is a flowchart schematically illustrating a whitlockite preparation method by temporal separation according to one embodiment of the present application.

Referring to FIG. 11, a whitlockite preparation method according to one embodiment of the present application includes process S2100 of preparing a mixed solution including a first phosphate material, process S2200 of preparing a mixed solution including a second phosphate material, and process S2300 of aging a mixed solutions including both the first phosphate material and the second phosphate material.

Referring to FIGS. 3 and 11, unlike the space-separational whitlockite preparation method described above, the whitlockite preparation method according to one embodiment of the present application uses the same container in process S2100 of preparing the solution including the first phosphate material and S2200 of preparing the solution including the second phosphate material. Unlike the space-separational whitlockite preparation method capable of reducing a whitlockite preparation time compared to conventional arts by using spatial separation, this embodiment can shorten the preparation time of whitlockite through temporal separation compared to the conventional arts.

A description will be given with reference to FIGS. 11 and 12. According to one embodiment of the present application, process S2100 of making the mixed solution containing the first phosphate material includes a process of mixing a solution containing calcium ions and a solution containing phosphate ions for a first time period (hereinafter, referred to as a first process, S2120) and a process of forming a mixed solution by allowing the resultant of the first process to react for a second time period so that the first phosphate material can be generated (hereinafter, referred to as a second process, S2140).

After process S2100 of preparing the mixed solution containing the first phosphate material is performed, process S2200 of preparing the mixed solution containing the second phosphate material may be subsequently performed.

Referring to FIGS. 11 and 13, process S2200 of making the mixed solution containing the second phosphate material includes a process of mixing a solution containing second cations that are cations other than calcium ions and a solution containing phosphate ions for a third time period (hereinafter, referred to as a third process, S2220) and a process of forming a mixed solution by allowing the resultant of the third process to react for a fourth time period so that the second phosphate material can be generated (hereinafter, referred to as a fourth process, S2240).

According to the whitlockite preparation method disclosed by the present application, preferably, the mixing of the first process S2120 and the reaction of the second process S2140 may be carried out in the same container, but the use of the same container is not a condition that must be satisfied.

Similarly, the mixing of the third process S2220 and the reaction of the fourth process S2240 may be carried out in the same container, but the use of the same container is not a condition that must be satisfied.

In other words, according to the present application, if the mixed solution including the first phosphate material is prepared in a first container, and the mixed solution including the second phosphate material is prepared in the first container, the objective of the present application can be achieved.

Unlike the space-separational whitlockite preparation method, process S2100 of making the mixed solution containing the first phosphate material and process S2200 of making the mixed solution containing the second phosphate material are sequentially performed in one container, the mixed solution of the resultant of the fourth process may contain both the first phosphate material and the second phosphate material.

In addition, this method differs from the space-separational whitlockite preparation method in the point that the mixed solution containing both the first phosphate material and the second phosphate material can be formed without the process of gathering two mixed solutions into one mixed solution (FIG. 3, S1300).

After process S2200 of preparing the mixed solution containing the second phosphate material is performed, process S2300 of aging the mixed solution containing the first phosphate material and the second phosphate material may be subsequently performed.

Referring to FIGS. 11 and 14, process S2300 of aging the mixed solution including both the first phosphate material and the second phosphate material includes a process of mixing a solution including phosphate ions with the mixed solution including both the first phosphate material and the second phosphate material, which results from the fourth process, for a fifth time period (hereinafter, referred to as a fifth process, S2320) and a process of aging the resultant of the fifth process for a sixth time period (hereinafter, referred to as a sixth process, S2340).

In the conventional whitlockite preparation method, calcium ions and second cations were mixed from the beginning, and the reaction proceeded in such a way that a phosphate ion feed material was added to an aqueous solution in which the two types of cations coexist, and whitlockite was prepared depending on the pH-dependent thermodynamic stability of a first phosphate and a second phosphate that were generated.

In the conventional whitlockite preparation method, it was necessary to supply phosphate ions in a dropwise manner to precisely control the pH, and it was necessary to precisely control the feed rate and amount of phosphate ions, which caused the problems that the whitlockite preparation time was long and the preparation method was complicated.

In the whitlockite preparation method according to the preferred embodiment of the present application, process S2100 of preparing the mixed solution containing the first phosphate material and process S2200 of preparing the mixed solution containing the second phosphate material may be performed separately in time.

The temporal separation means that a first reaction condition for preparing the mixed solution containing the first phosphate material is built first, and a second reaction condition for preparing the mixed solution containing the second phosphate material is then built when a predetermined time elapses after the first reaction condition is applied.

For example, in process S2100 of preparing the mixed solution including the first phosphate material, a solution including calcium ions and a solution including a first amount of phosphate ions may be mixed and reacted to generate the first phosphate material. When a predetermined time elapses, in process S2200 of preparing the mixed solution containing the second phosphate material, a solution containing second cations and a solution containing a second amount of phosphate ions may be mixed and reacted to generate the second phosphate material.

Targeted intermediate products can be generated in respective processes through the temporal separation, and it is not necessary to control the pH in a complicated manner to generate the targeted intermediate products. Therefore, with this method, it is possible to prepare whitlockite in a simple and intuitive manner.

In addition, since it is not necessary to precisely control the pH, it is possible to add a phosphate ion feed material in a pouring addition manner rather than a dropwise addition manner, resulting in a significant reduction in preparation time of whitlockite. In other words, according to the whitlockite preparation method disclosed in the present application, a whitlockite preparation method capable of preparing highly pure whitlockite in a simple and intuitive manner in a short time can be provided.

Hereinafter, each of the processes will be described in more detail with reference to FIGS. 11 through 16.

According to one embodiment of the present application, process S2100 of making a mixed solution containing a first phosphate material includes a process of mixing a solution containing calcium ions and a solution containing phosphate ions for a first time period (hereinafter, referred to as a first process, S2120) and a process of forming a mixed solution by allowing the resultant of the first process to react for a second time period so that the first phosphate material can be generated (hereinafter, referred to as a second process, S2140).

The first phosphate material may be a phosphate material including calcium ions. That is, it may be a calcium phosphate material. The calcium phosphate material may include hydroxyapatite, dicalcium phosphate dehydrate (DCPD), brushite, monetite, or a material containing any combination thereof. However, the calcium phosphate material is not limited to the examples. Any material in which calcium ions and phosphate ions are combined may be regarded as a calcium phosphate material. Preferably, the first phosphate material may be hydroxyapatite, and may be present in the form of a solid in the mixed solution.

The solution containing calcium ions may be prepared by dissolving in water a material that contains calcium atoms and which is easily ionized when dissolved in water. That is, the solution containing first cations may be prepared by dissolving a calcium ion feed material in water. The calcium ion feed material may be calcium hydroxide, calcium carbonate, calcium nitrate, calcium acetate, or the like.

As described above, process S2100 of forming the mixed solution containing the first phosphate material has been described as a process of mixing a solution containing phosphate ions and a solution containing calcium ions with each other. However, if it is possible to prepare a solution in which calcium ions and phosphate ions can coexist, this process may be performed by directly mixing a calcium ion feed material with a phosphate ion feed material or by mixing a phosphate ion feed material and a calcium ion feed material together in water at once.

Figure 15:
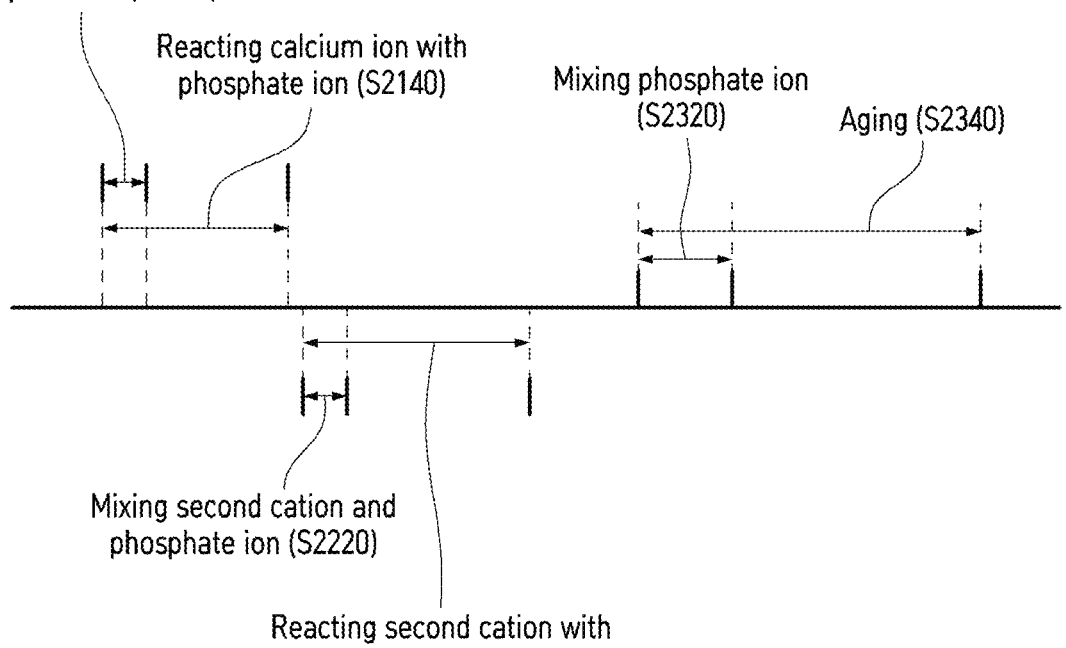
FIG. 15 is a timeline schematically illustrating a whitlockite preparation method by temporal separation according to one embodiment of the present application on a time axis.
Figure 16:
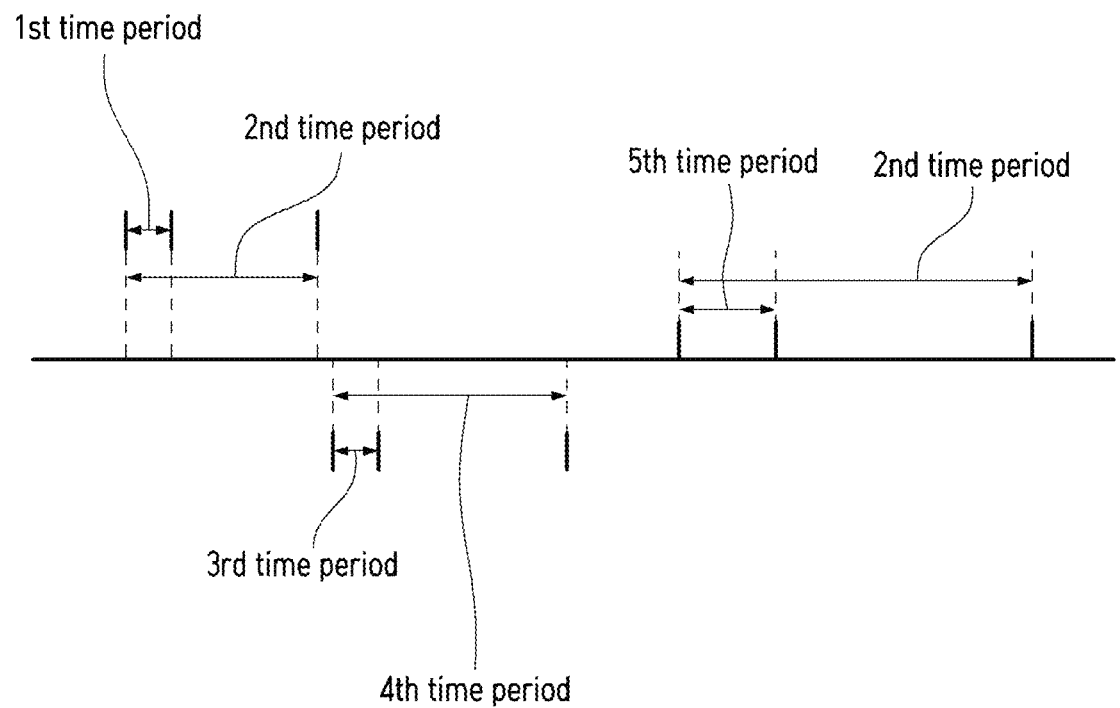
FIG. 16 is a timeline schematically illustrating time points and periods for respective processes of FIG. 15.

Reference to FIGS. 15 and 16, the first time period refers to a duration from the time at which the solution containing calcium ions and the solution containing phosphate ions start to mix, to the time at which the mixing is completed. The second time period refers to a duration from the time at which the solution containing calcium ions and the solution containing phosphate ions start to react, to the time at which the reaction is completed.

At least a portion of the first time period and at least a portion of the second time period may overlap on the time axis. That is, while the mixing process (first process, S2120) proceeds, the reaction process (second process, S2140) of generating the first phosphate material may proceed. For example, there may be a case where as soon as the solution containing calcium ions and the solution containing phosphate ions start to mix, the reaction to generate the first phosphate material may start.

According to one embodiment of the present application, at the time at which the first process of mixing the solution including calcium ions with the solution including phosphate ions is completed, that is, at an end point of the first time period, calcium ions and phosphate ions may be included in an aqueous solution. However, since the first process S2120 and the second process S2140 to be described later may be carried out partially concurrently, a calcium phosphate material, which is the first phosphate material, may also be contained in the mixed solution at the end point of the first time period.

According to a preferred embodiment of the present application, in the second process S2140, the mixed solution including calcium phosphate material which is solid first phosphate material formed by reaction of calcium ion and phosphate ion, may be formed. Therefore, the solid calcium phosphate material may be contained in the mixed solution at the time at which the second process is completed, i.e., at an end point of the second time period.

According to one embodiment of the present application, at least the reaction process S2140 in which the solution containing calcium ions and the solution containing phosphate ions react may be performed at a temperature in the range of 50° C. or above and 100° C. or below. The mixing process S2120 in which the solution containing calcium ions and the solution containing phosphate ions are mixed may also be performed at a temperature in the range of 50° C. or above and 100° C. or below. However, if the requirement that the reaction process S2140 to prepare the first phosphate material is performed at a temperature in the range of 50° C. or above and 100° C. or below is satisfied, the objective of the present application can be achieved.

According to one embodiment of the present application, after process S2100 of preparing the mixed solution including the first phosphate material is performed, process S2200 of preparing the mixed solution including the second phosphate material is subsequently performed.

Process S2200 of making the mixed solution including the second phosphate material includes a process of mixing a solution including second cations(or cation other than calcium ion) and a solution including phosphate ions with the resultant of the second process for a third time period (hereinafter, referred to as a third process, S2220), and a process of forming a mixed solution by allowing the resultant of the third process to react for a fourth time period so that the second phosphate material can be generated (hereinafter, referred to as a fourth process, S2240).

The second cation is a non-calcium ion which is a cation other than a calcium ion. The second cation may be, for example, an ionic form of at least one or more selected from Mg, Co, Sb, Fe, Mn, Y, Eu, Cd, Nd, Na, La, Sr, Pb, Ba, and K. Preferably the second cation may be a magnesium ion.

The second phosphate material is a phosphate material including second cations. That is, the second phosphate material may be a material in which the second cations and phosphate ions are combined.

For example, when the second cation is a magnesium ion, the second phosphate material is a magnesium phosphate material. Examples of the magnesium phosphate material include monomagnesium phosphate, dimagnesium phosphate, newberyite, trimagnesium phosphate, or combinations thereof. However, the magnesium phosphate material is not limited to the examples. Any material in which magnesium ions and phosphate ions are combined may be regarded as a magnesium phosphate material.

In addition, when the second cation is a cobalt ion, the second phosphate material may be cobalt (II) phosphate hydrate.

In addition, when the second cation is an iron ion, the second phosphate material may be iron (III) phosphate dihydrate, iron (III) phosphate tetrahydrate, or a material containing any combination of these.

In addition, when the second cation is a sodium ion, the second phosphate material may be sodium phosphate.

In addition, when the second cation is a potassium ion, the second phosphate material may be potassium phosphate tribasic.

In addition, when the second cation is a strontium ion, the second phosphate material may be strontium phosphate.

In addition, when the second cation is a barium ion, the second phosphate material may be barium phosphate.

However, the second phosphate material is not limited to the exemplified material. Any material in which the second cations and phosphate ions are combined and which can exist as combined in an aqueous solution, the material can be regarded as the second phosphate material.

The solution containing the second cations may be prepared by dissolving in water a material that includes the atomic form (X) of the second cation and which can be easily ionized when dissolved in water. That is, the solution containing second cations may be prepared by dissolving a second cation feed material in water. The second cation feed material may be X hydroxide, X carbonate, X nitrate, X acetate, or the like.

For example, when the second cation is a magnesium ion, the second cations may be supplied by a magnesium ion feed material including at least one or more selected from magnesium hydroxide, magnesium carbonate, magnesium nitrate, and magnesium acetate. Preferably, the second cations may be supplied by magnesium hydroxide.

In the description above, process S2200 of forming the mixed solution containing the second phosphate material has been described as a process of mixing a solution containing phosphate ions and a solution containing second cations with the resultant of the second process. However, if a solution in which phosphate ions and the second cations can coexist can be prepared, the mixed solution may be obtained by directly mixing the second ion feed material with the phosphate ion feed material, or by mixing the phosphate ion feed material and the second cation feed material with the resultant of the second process at once.

For example, when the second cation is a magnesium ion, the solution containing the second cations may be prepared by dissolving magnesium hydroxide, which is a solid material, in water, and the resulting solution may be mixed with a solution containing phosphate ions and the resultant of the second process. Alternatively, a solid magnesium hydroxide material is directly mixed with a phosphate ion feed material and then mixed with the resultant of the second process. Further alternatively, a phosphate ion feed material and magnesium hydroxide are mixed with the resultant of the second process at the same time.

Reference to FIGS. 15 and 16, the third time period refers to a duration from the time at which the mixing S2220 of the third process starts, to the time at which the mixing is completed, and the fourth time period refers to a duration from the time at which the reaction S2240 of the fourth process starts, to the time at which the reaction is completed.

According to one embodiment of the present application, at least a portion of the third time period and at least a portion of the fourth time period may overlap on the time axis. That is, while the mixing of the third process S2220 proceeds, the reaction of the fourth process S2240 to generate the second phosphate material may proceed. For example, as soon as mixing the solution containing magnesium ions and the solution containing phosphate ions with the resultant of the second process starts, the reaction to form the second phosphate material may proceed.

According to one embodiment of the present application, since calcium phosphate which is a solid material is included in the mixed solution resulting from the second process, the calcium phosphate, the second cations, and the phosphate ions are contained in the mixed solution at the time at which the mixing of the solution containing second cations other than calcium ions, the solution containing phosphate ions, and the resultant of the second process is completed (at an end point of the third time period). However, since the third process S2220 and the fourth process S2240 to be described later may be carried out partially concurrently, the second phosphate material also may be included at the end point of the third time period.

According to one embodiment of the present application, in the fourth process S2240, the mixed solution including solid second phosphate material generated by the reaction of the second cation and the phosphate ion, may be formed. Therefore, the second phosphate material which is a solid material may be contained in the mixed solution at the time at which the fourth process is completed, i.e., at an end point of the fourth time period.

In addition, since the first phosphate material which is a solid material formed in the second process remains during the fourth process, the mixed solution may further include the first phosphate material at the time at which the fourth process is completed, i.e., at the end point of the fourth time period. In other words, at the end point of the fourth time period, the mixed solution may include the first phosphate material and the second phosphate material.

According to one embodiment of the present application, at least the reaction process S2240 in which the solution containing cations other than calcium ions and the solution containing phosphate ions react may be performed at a temperature in the range of 50° C. or above and 100° C. or below. The mixing process S2220 in which the solution containing cations other than calcium ions and the solution containing phosphate ions are mixed may also be performed at a temperature in the range of 50° C. or above and 100° C. or below. However, if the requirement that the reaction process S2240 to prepare the second phosphate material is performed at a temperature in the range of 50° C. or above and 100° C. or below is satisfied, the objective of the present application can be achieved.

According to a preferred embodiment according to the present application, after the mixed solution containing the solid calcium phosphate material is preferentially formed in the second process S2140, the fourth process S2240 in which the second phosphate material is formed is performed. Thus, it is characterized in that the mixed solution containing both the solid calcium phosphate material and the solid second phosphate material can be formed immediately after the start of the fourth process.

In addition, this method differs from the space-separational whitlockite preparation method in the point that the mixed solution containing both the first phosphate material and the second phosphate material can be formed without the process of gathering two mixed solutions into one mixed solution (FIG. 3, S1300).

After the mixed solution containing both the first phosphate material and the second phosphate material is formed through the fourth process, process S2300 of aging the mixed solution containing both the first phosphate material and the second phosphate material proceeds. In this case, a condition allowing for a sufficient phase transformation to occur may be provided to form whitlockite in the mixed solution containing the first phosphate material and the second phosphate material.

According to one embodiment of the present application, process S2300 of aging the mixed solution containing both the first phosphate material and the second phosphate material includes: a process of mixing the mixed solution containing both the first phosphate material and the second phosphate material, which results from the fourth process, with a solution containing phosphate ions for a fifth time period (hereinafter, referred to as a fifth process, S2320); and a process of aging the resultant of the fifth process for a sixth time period (hereinafter, referred to as a sixth process, S2340).

Referring to FIGS. 15 and 16, the fifth time period refers to a period from the time at which the mixing of the solution containing phosphate ions with the mixed solution containing the first phosphate material and the second phosphate material starts, to the time at which the mixing is completed.

The sixth time period refers to a period from the time at which the mixed solution containing the first phosphate material and the second phosphate material starts to age, to the time at which the aging is completed to form whitlockite.

At least a portion of the fifth time period and at least a portion of the sixth time period may overlap on the time axis. That is, while the mixing of the fifth process S2320 proceeds, the aging of the sixth process S2340 may proceed.

For example, as soon as the solution containing phosphate ions is mixed with the mixed solution containing hydroxyapatite and dimagnesium phosphate, the aging of the mixed solution containing hydroxyapatite and magnesium phosphate may proceed.

According to one embodiment of the present application, at the time at which the mixing process S2320 for mixing the mixed solution containing the first phosphate material and the second phosphate material with the solution containing phosphate ions is completed, i.e., at an end point of the fifth time period, all of the first phosphate material, the second phosphate material, and the phosphate ions may be included in the mixed solution. However, since the fifth process and the aging process S2340 (i.e., the sixth process) to be described later may be carried out partially concurrently, whitlockite may also be contained in the mixed solution at the end point of the fifth time period.

According to one embodiment according to the present application, in the aging process of the mixed solution containing the first phosphate material and the second phosphate material and the solution containing the phosphate ions (sixth process, S2340), the aging may proceed for a sixth time period. In process S2340, second cations contained in the mixed solution, which is a liquid phase, or second cations derived from the second phosphate material, which is a solid phase, may be substituted with some atoms in the first phosphate material and combine in the form of atoms, and some atoms expelled from the first phosphate material due to the substitution may become present in an ionic form in the liquid phase. In this case, since the first phosphate material which is partially substituted with the second cations is aged, the crystalline structure changes through a phase transformation, thereby forming whitlockite.

For example, the crystalline structure of hydroxyapatite before some calcium atoms of the hydroxyapatite are substituted with magnesium atoms is a hexagonal structure. Since some calcium atoms are substituted with magnesium atoms and aged, the structure of hydroxyapatite changes into a rhombohedral structure, thereby forming whitlockite. In other words, a calcium phosphate material, which is preferably hydroxyapatite, has a hexagonal structure, whitlockite has a rhombohedral structure different from the structure of hydroxyapatite. When the hydroxyapatite some of calcium ions of which are substituted with magnesium ions is aged, the crystalline structure of the hydroxyapatite undergoes a phase transformation, turning into whitlockite.

Accordingly, at an end point of the sixth time period, the mixed solution may contain solid whitlockite.

According to an embodiment according to the present application, the "aging" process S2340 of the mixed solution containing the first phosphate material, the second phosphate material, and phosphate ions may be performed at a temperature in the range of 50° C. or above and 100° C. or below. The "mixing" process S2320 for mixing the mixed solution containing the first phosphate material and the second phosphate material with the solution containing the phosphate ions may also be performed at a temperature in the range of 50° C. or above and 100° C. or below. However, when the requirement that the "aging" process S2340 of the mixed solution containing the first phosphate material, the second phosphate material, and phosphate ions is performed in the temperature range of 50° C. or above and 100° C. or below is satisfied, the objective of the present application can be achieved.

According to one embodiment of the present application, in each of process S2100 of forming a mixed solution including a first phosphate material, process S2200 of forming a mixed solution including a second phosphate material, and process S2300 of aging a mixed solution including the first phosphate material and the second phosphate material, a solution including phosphate ions is added and mixed.

The phosphate ions may include all forms of phosphoric acid which can exist in an aqueous solution depending on the pH. Generally speaking, the phosphate ion may refer to $PO_4^{3-}$, but is not limited thereto, and may include any form of phosphoric acid that can exist in an aqueous solution. For example, phosphate ions ($PO_4^{3-}$), hydrogen phosphate ions ($HPO_4^{2-}$), dihydrogen phosphate ions ($H_2PO_4^-$), and phosphoric acid ($H_3PO_4$) are all regarded as phosphate ions.

The phosphate ions may be supplied by phosphate ion feed material comprising at least one or more selected from phosphoric acid, diammonium hydrogen phosphate, ammonium phosphate, and phosphate. Preferably, the phosphate ions may be supplied by phosphoric acid.

The solution including phosphate ions may be prepared by dissolving a phosphate ion feed material (for example, diammonium phosphate, ammonium phosphate, or phosphate) present as a solid at room temperature in water or an aqueous solution. Alternatively, in the case of a phosphate ion feed material such as phosphoric acid, the phosphate ion feed material itself may include phosphate ions in a water solvent.

For example, when a solution containing calcium ions and a solution containing phosphate ions are mixed in process S2100 of forming a mixed solution containing the first phosphate material, an aqueous solution in which solid diammonium phosphate is dissolved in water may be mixed with a solution containing calcium ions, or a phosphate aqueous solution in which a phosphate ion feed material itself contains water as a solvent may be mixed with a solution containing calcium ions.

In process S2100 of forming the mixed solution containing the first phosphate material, process S2200 of forming the mixed solution containing the second phosphate material, and process S2300 of aging the solution containing the first phosphate material and the second phosphate material, when a solution containing phosphate ions is mixed, the solution containing phosphate ions may be mixed by pouring. The pouring is different from dropwise addition and refers to a method in which substantially the entire volume of a solution to be added is added in a lump sum manner in a very short time. For example, in the conventional whitlockite preparation method, a solution containing phosphate ions was continuously mixed in a dropwise manner at a volume flow rate of 12.5 ml/min. However, in the whitlockite preparation method according to an embodiment of the present application, the solution containing phosphate ions may be mixed at once at a volume flow rate of 2 ml/sec (120 ml/min) to 130 ml/sec (7800 ml/min). The mixing time of the solution containing the phosphate ions is shortened, and thus the whitlockite preparation time can be shortened.

That is, the first time period, the third time period, or the fifth time period may be substantially a very short period of time (for example, less than about 1 second). However, depending on the volume of the solution containing phosphate ions, the first time period, the third time period, or the fifth time period may be increased to several seconds to several tens of seconds.

The amount(volume) of the phosphate ion-containing solution used in process S2100 of forming the mixed solution containing the first phosphate material and process 1200 of forming the mixed solution containing the second phosphate material may be determined by considering a stoichiometric ratio and pH of the mixed solution for forming a desired phosphate material.

For example, in process S2100 of forming the mixed solution containing the first phosphate material, a predetermined amount of a phosphate ion feed material containing an amount (mole) of phosphate ions, which is determined according to the stoichiometric ratio of the first phosphate material (for example, hydroxyapatite) by mixing and reacting with magnesium ions, may be added. In addition, a predetermined amount of a phosphate ion feed material including an amount of phosphate ions determined according to the pH of the mixed solution to stably form the first phosphate material and maintain a stable state of the first phosphate material may be added. For example, when phosphoric acid is used as a phosphate ion feed material, a first amount (for example, volume) of phosphoric acid is determined depending on the amount of phosphate ions to reliably generate hydroxyapatite and on the pH for maintaining a stable state of the hydroxyapatite, and the first amount of phosphoric acid may be mixed. Alternatively, when phosphoric acid is used as a phosphate ion feed material, the amount of phosphoric acid determined depending on the amount (mole) of phosphate ions for stable formation of hydroxyapatite may be added, and then a substance other than phosphoric acid may be additionally mixed to provide (or adjust) the pH at which the generated hydroxyapatite can be stably maintained. In this case, preferably, the ratio of the amount (mole) of phosphate ions to the amount (mole) of calcium ions mixed in process S2100 of forming the mixed solution containing the first phosphate material is in the range of 0.6 or more and 1.4 or less. In the case of a ratio outside this range, substances aside from whitlockite may be generated and mixed in the resultant product.

In addition, in process S2200 of forming the mixed solution containing the second phosphate material, a phosphate ion feed material containing an amount (mole) of phosphate ions determined according to the stoichiometric ratio of the second phosphate material, which is preferably dimagnesium phosphate ($MgHPO_4$), by mixing and reacting with magnesium ions, may be added. In addition, the phosphate ion feed material containing phosphate ions may be mixed, taking into account the pH for stably generating the second phosphate material and maintaining a stable state of the second phosphate material. For example, the second amount (for example, volume) of phosphoric acid is determined depending on the amount of phosphate ions to reliably generate dimagnesium phosphate from magnesium ions and phosphate ions and on the pH for maintaining a stable state of the dimagnesium phosphate, and the second amount of phosphoric acid may be mixed. In addition, when phosphoric acid is used as a phosphate ion feed material, the amount of phosphoric acid determined depending on the amount (mole) of phosphate ions for stable formation of dimagnesium phosphate may be mixed, and then a substance other than phosphoric acid may be additionally mixed to provide (or adjust) the pH at which the generated dimagnesium phosphate can be stably maintained.

In this case, preferably, the ratio of the amount (mole) of phosphate ions to the amount (mole) of magnesium ions mixed in process S2200 of forming the mixed solution containing the second phosphate material is in the range of 0.6 or more and 5 or less. In the case of a ratio outside this range, substances aside from whitlockite may be generated and mixed in the resultant product.

The amount (volume) of phosphoric acid to be mixed in process S2300 of aging the solution containing the first phosphate material and the second phosphate material may be determined depending on the pH at which whitlockite can be generated from the first phosphate material and the second phosphate material or on the target amount of whitlockite to be generated. For example, the amount of the phosphoric acid solution containing phosphate ions may be determined depending on the pH condition at which whitlockite can be generated through ion exchange between hydroxyapatite and magnesium phosphate. However, since a substance other than phosphoric acid for pH adjustment can be mixed, phosphoric acid may be mixed to supply phosphate ions in an amount determined according to the target amount of whitlockite to be generated, and a substance other than phosphoric acid may then be additionally mixed for pH adjustment.

When a feed material (for example, diammonium hydrogen phosphate, ammonium phosphate, and phosphate) other than phosphoric acid is used as the phosphate ion feed material, a solution containing hydrogen ions for pH adjusting may be added along with a solution containing phosphate ions. For example, when solid diammonium hydrogen phosphate is dissolved to prepare a solution containing phosphate ions, and the resulting solution is then added to the mixed solution containing the first phosphate material and the second phosphate material, a solution containing hydrogen ions (or a solution for pH adjustment) may be additionally added so that the mixed solution can be aged at a pH at which whitlockite can be stably generated.

In addition, the amount (volume) of the solution containing phosphate ions, to be mixed in process S2300 of aging the solution containing the first phosphate material and the second phosphate material, may be determined depending on the ratio of the total amount of cations to the total amount of anions to form whitlockite.

For example, the amount (volume) of a phosphoric acid solution to form a predetermined amount of whitlockite is a third amount, the amount (volume) of a phosphoric acid solution to be mixed in process S2100 of forming the mixed solution containing the first phosphate material is a first amount, and the amount (volume) of a phosphoric acid solution to be mixed in process S2200 of forming the mixed solution containing the second phosphate material is a second amount, the amount (volume) of a phosphoric acid solution to be mixed in process S2300) of aging the mixed solution containing both the first phosphate material and the second phosphate material is obtained by the equation "third amount−(first amount+second amount)".

Preferably, the amount of the phosphoric acid solution mixed in process 2300 of aging the mixed solution containing both the first phosphate material and the second phosphate material to the sum of the first amount and the second amount is in the range of 0.3 or more 0.55 or less. In the case of a ratio outside this range, substances aside from whitlockite may be generated and mixed in the resultant product.

In addition, preferably, the ratio of the first amount, the second amount, and the third amount may be 0.44(±0.05): 0.26(±0.05):0.30(±0.05) (the first amount:the second amount:the third amount). In other words, the ratio of the first amount may be within the range of 0.39 or more and 0.49 or less. Alternatively, the ratio of the second amount may be within the range of 0.21 or more and 0.31 or less. Alternatively, the ratio of the third amount may be within the range of 0.25 or more and 0.35 or less.

According to one embodiment disclosed in the present application, whitlockite can be prepared by adding a predetermined amount of a solution containing phosphate ions three times without highly precisely adjusting the pH. Therefore, this method has the advantage of being able to product whitlockite in a much simpler, intuitive, and clear way.

In addition, referring to FIGS. 15 and 16, since the solution containing phosphate ions is mixed by a pouring manner, it is allowed that the end point of the second time period is behind the end point of the first time period. In other words, process S2120 of mixing the solution containing calcium ions and the solution containing phosphate ions is completed before the time point (end point of the second time period) at which the reaction for forming the first phosphate material is completed. For example, when the mixing of the solution containing phosphate ions and the solution containing calcium ions is completed within one second by pouring, a reaction that produces the first phosphate material may proceed even after the completion of the mixing (i.e., the end point of the first time period).

Similarly, the end point of the fourth time period may be behind the end point of the third time period. In other words, process S2220 of mixing a solution containing second cations and a solution containing phosphate ions may be completed before the time point (end point of the second time period) at which the reaction for forming the second phosphate material is completed. For example, when the mixing of the solution containing phosphate ions and the solution containing the second cations is completed within one second by pouring, a reaction that produces the second phosphate material may proceed even after the completion of the mixing (i.e., the end point of the third time period).

Similarly, the end point of the sixth time period may be behind the end point of the fifth time period. In other words, process S2320 of mixing the solution containing the first phosphate material and the second phosphate material with the solution containing phosphate ions may be completed before the time point at which the aging for forming whitlockite is completed (end point of the sixth time period). For example, when the mixing of the solution containing phosphate ions with the solution containing the first phosphate material and the second phosphate material is completed within one second by pouring, the aging for forming whitlockite may proceed even after the completion of the mixing (i.e., the end point of the fifth time period).

As described above, while the solution containing phosphate ions is mixed in a substantially short time by pouring, it is possible to significantly shorten the production time of whitlockite.

According to a preferred embodiment according to the present application, the solution containing phosphate ions is mixed in process S2100 of forming the mixed solution containing the first phosphate material, process S2200 of forming the mixed solution containing the second phosphate material, and process S2300 of aging the solution containing the first phosphate material and the second phosphate material. That is, the solution containing phosphate ions is mixed a total of three times.

In this case, the solution containing phosphate ions may be mixed three times at predetermined time intervals.

In other words, a start point of the fifth time period may be behind the end point of the first time period and the end point of the third time period. In addition, the end point of the third time period may be behind the end point of the first time period.

For example, after a predetermined time elapses from the time point at which process S2120 of mixing the solution containing calcium ions with the solution containing phosphate ions is completed (end point of the first time period), process S2220 of mixing a solution containing phosphate ions with the solution containing cations other than calcium ions and the mixed solution containing the first phosphate material may start.

In addition, after a predetermined time elapses from the time point at which process S2220 of mixing the solution containing second cations with the solution containing phosphate ions is completed (end point of the third time period), process S2320 of mixing the solution containing the first phosphate material and the second phosphate material with a solution containing phosphate ions may start.

In summary, the start point of the fifth time period may be behind the end point of the third time period, and the end point of the third time period may be behind the end point of the first time period. In other words, the solution containing phosphate ions may be mixed three times at predetermined time intervals.

As described above, since the solution containing phosphate ions is mixed three times in a specific amount per each time, whitlockite can be prepared without the need to finely control the pH. Therefore, whitlockite can be prepared in a much simpler way than the conventional whitlockite preparation method and in an intuitive and clear way.

According to one embodiment of the present application, at least one or more process selected from the first to sixth processes may be performed at a temperature in the range of 50° C. or above and 95° C. or below.

According to one embodiment disclosed by the present application, in the whitlockite preparation method, an oxidizing agent may be further added (or mixed) in at least one or more process selected from the process S2100 of forming the mixed solution containing the first phosphate material, the process S2200 of forming the mixed solution containing the second phosphate material, and the process S2300 of aging the solution containing the first phosphate material and the second phosphate material. For example, in process S2100 of forming the mixed solution containing the first phosphate material, the oxidizing agent may be added when mixing a solution containing first cations with a solution containing phosphate ions (S2120).

Alternatively, the oxidizing agent may be added before a start point of the first time period, which is the start time of process S2100 of forming the mixed solution containing the first phosphate material. For example, the oxidizing agent may be added before process S2100 of forming the mixed solution containing the first phosphate material starts.

In other words, the whitlockite preparation method by temporal separation disclosed by the present application may further include a seventh process of mixing the oxidizing agent for a seventh time period, in which a start point of the seventh time period is prior to the start point of the first time period or may overlap with at least a portion of a duration corresponding the sum of the first through sixth time periods on the time axis.

The addition of the oxidizing agent reduces the preparation time for whitlockite crystal.

Preferably, the oxidizing agent may be hydrogen peroxide.

The whitlockite preparation method may further include filtering, washing, oven drying, ball milling, and sieving processes.

Whitlockite that is prepared by the present method can be used as a raw material for products such as artificial bone, dental restorations, bone cement, oral compositions, and fillers to be inserted into the body for regeneration or treatment of human tissue.

(3)-1 Experimental Example

In an experiment (hereinafter, referred to as Experiment 1) in connection with the whitlockite preparation method by temporal separation, the amount of magnesium ions added were about 26% by mole with respect to the total amount of all cations, and the molar ratio of the total amount of phosphate ions to the total amount of all cations was 1:1. Aging for the formation of whitlockite was performed at 80° C.

25 ml of a 30% aqueous hydrogen peroxide solution and 66.85 g (about 0.0924 mole) of solid calcium hydroxide were dissolved in 112.5 ml of distilled water to obtain of a solution containing calcium ions. That is, 125 ml of a 0.74M aqueous calcium hydroxide solution was prepared. Next, this solution was mixed with 3.81 ml of an 85% phosphoric acid solution containing phosphate ions (107.19 ml of distilled water, i.e., 111 ml of a 0.5M aqueous phosphoric acid solution). Thereafter, stirring was performed at 80° C. for a first time period for a reaction to form a calcium phosphate material. In Experiment 1, the first time period for reaction was set to 1 hour.

Subsequently, 1.90 g (about 0.032579 mol) of solid magnesium hydroxide was dissolved in 112.5 ml of distilled water to obtain of a solution containing magnesium ions. That is, 125 ml of a 0.26M aqueous magnesium hydroxide solution was prepared. Next, this solution was mixed with 2.23 ml of an 85% phosphoric acid solution containing phosphate ions (62.77 ml of distilled water, i.e., 65 ml of a 0.5M aqueous phosphoric acid solution). Thereafter, stirring was performed at 80° C. for a second time period for a reaction to form a magnesium phosphate material. In Experiment 1, the second time period for reaction was set to 1 hour.

Subsequently, 2.54 ml of an 85% phosphoric acid solution containing phosphate ions (71.46 ml of distilled water, that is, 74 ml of a 0.5M aqueous phosphoric acid solution) was mixed with the mixed solution containing the calcium phosphate material and the magnesium phosphate material. Next, the mixed solution was aged at 80° C. for a third time period under stirring. In Experiment 1, the third reaction period for aging was set to 5 hours.

When the solution containing phosphate ions was added, the solution was not added by dropwise addition but by pouring. That is, in three times, the corresponding amounts of phosphoric acid were poured at respective times.

The ratio of the moles of the phosphate ions added over three times or the ratio of the volumes of the phosphate solution containing phosphate ions mixed over three times was mixed 0.444:0.260:0.296.

After the mixed solution was aged for 5 hours, the mixed solution was filtered, and the residue was washed, oven dried, ball milled, sieved to prepare a dried powder.

Figure 17:
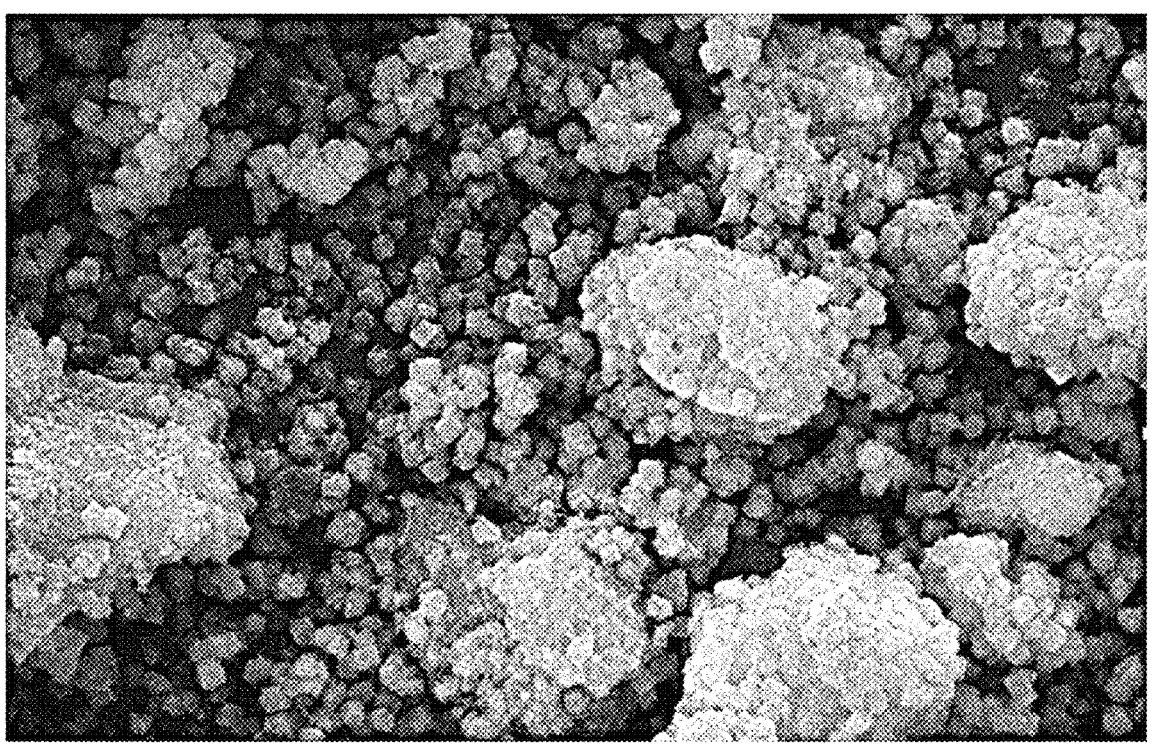
FIG. 17 is SEM data of a resulting product prepared by the whitlockite preparation method by temporal separation according one embodiment of the present application.

Next, the powder was analyzed through SEM and XRD. Referring to FIGS. 17 and 18, it was confirmed that a highly pure whitlockite powder having various particle shapes was synthesized through Experiment 1. SEM data shown in FIG. 17 is data of 5000-fold magnification of the produced crystal.

Figure 19:
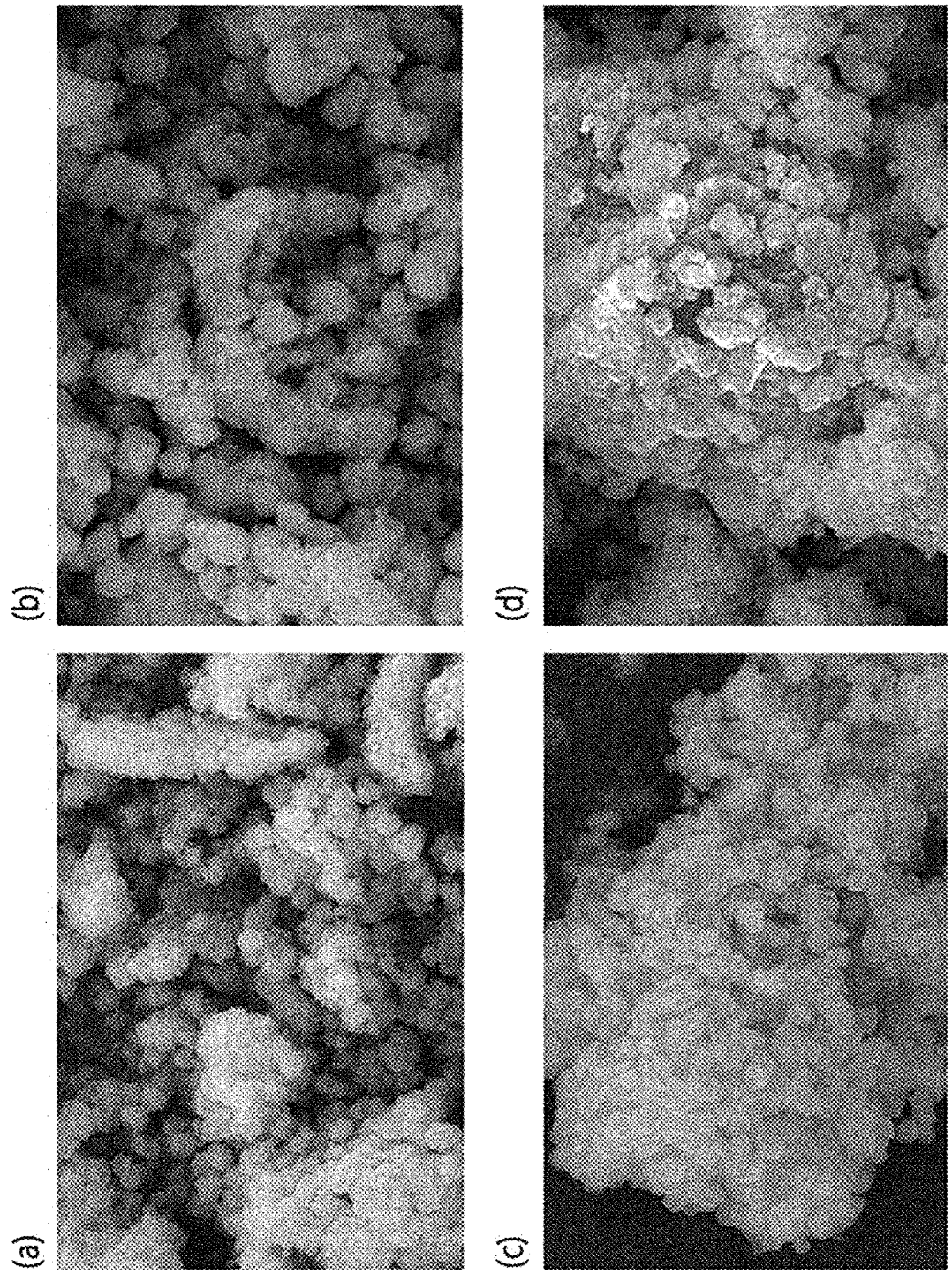
FIG. 19 is SEM data of a resulting product prepared by Experiment 2 of the whitlockite preparation method by temporal separation disclosed in the present application.
Figure 20:
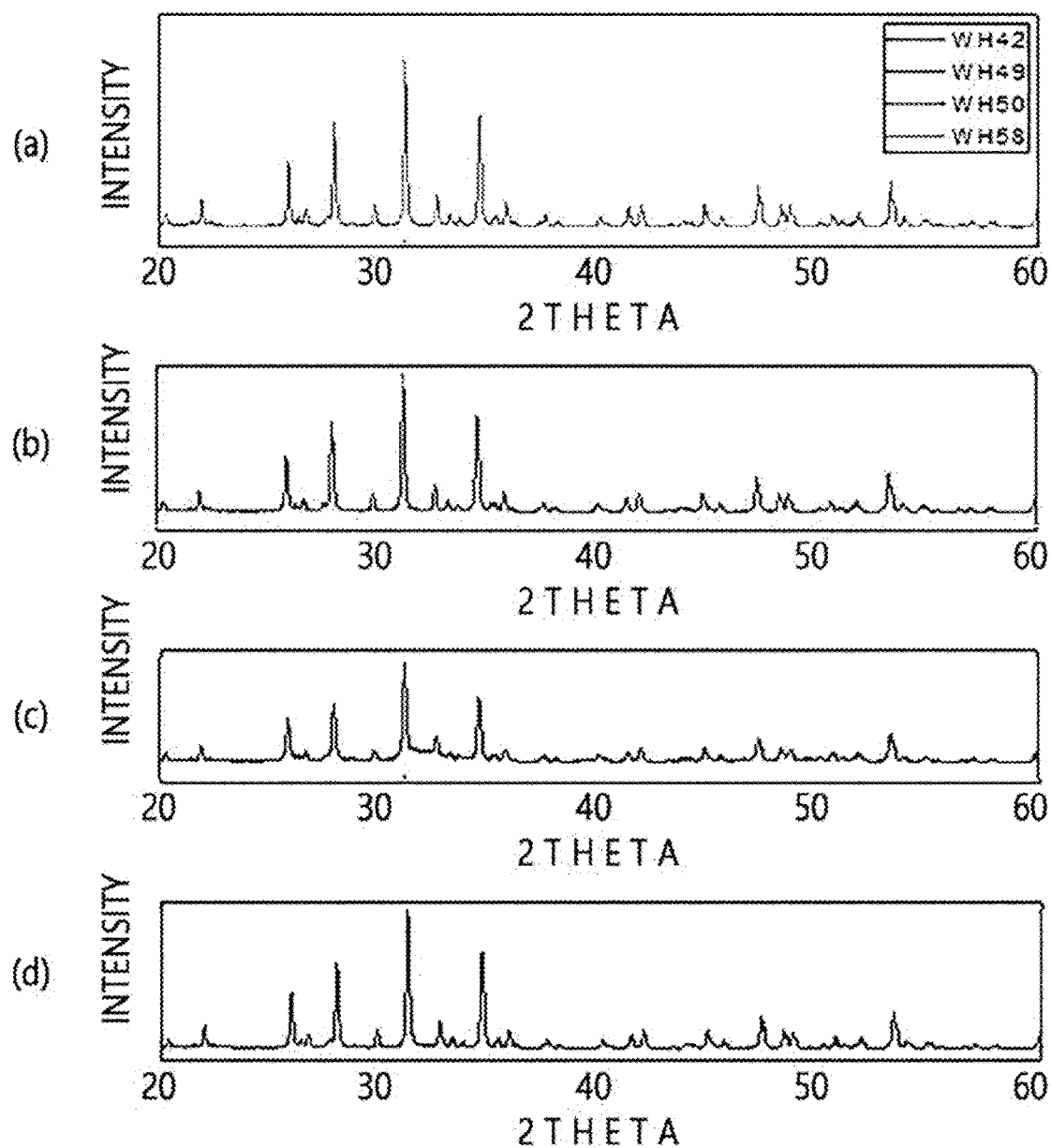
FIG. 20 is XRD data of a resulting product prepared by Experiment 2 of the whitlockite preparation method by temporal separation disclosed in the present application.
Figure 21:
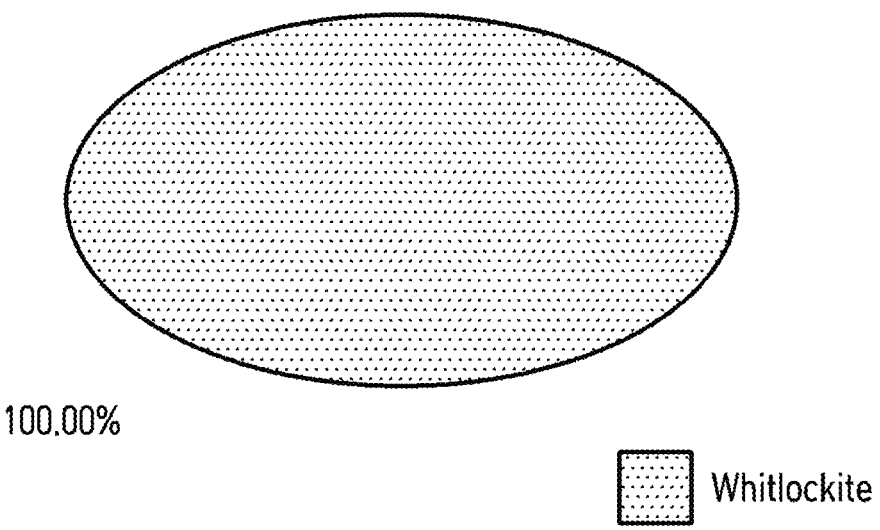
FIG. 21 is a graph showing a result of XRD data of a resulting product prepared by Experiment 2 of the whitlockite preparation method by temporal separation disclosed in the present application.

In a first modification (hereinafter referred to as Experiment 2 or a first modified experiment) to Experiment 1, the experiment was conducted in a manner that a third time period for aging was fixedly set to 5 hours and a first time period for reaction was varied. The first time period for reaction was changed to 5 minutes, 15 minutes, 30 minutes, and 60 minutes, and the other experimental conditions were the same as in the first experiment. Thus, whitlockite powders for respective cases were obtained. Next, the powders were analyzed through SEM and XRD. Referring to FIGS. 19 through 21, it was confirmed that highly pure whitlockite powders were synthesized in a significantly reduced preparation time as short as 7 hours. SEM data of FIG. 19 is 10000-fold magnification data of the prepared crystal. In FIG. 19, (a), (b), (c), and (d) represent SEM data for the cases where the first time period for reaction was 5 minutes, 15 minutes, 30 minutes, and 60 minutes, respectively. In FIG. 20, (a), (b), (c), and (d) represent XRD data for the cases where the first time period for reaction was 5 minutes, 15 minutes, 30 minutes, and 60 minutes, respectively.

In a second modification (hereinafter referred to as experiment 3 or a second modified experiment) to the first experiment, the experiment was conducted in a manner that the first time period for reaction was fixedly set to 60 minutes and the third time period for aging was varied. In the experiment, the third time period for aging was set to 5 hours and 10 hours, and the other experimental conditions were the same as in the first experiment. Thus, whitlockite powders for respective cases were obtained.

Figure 22:
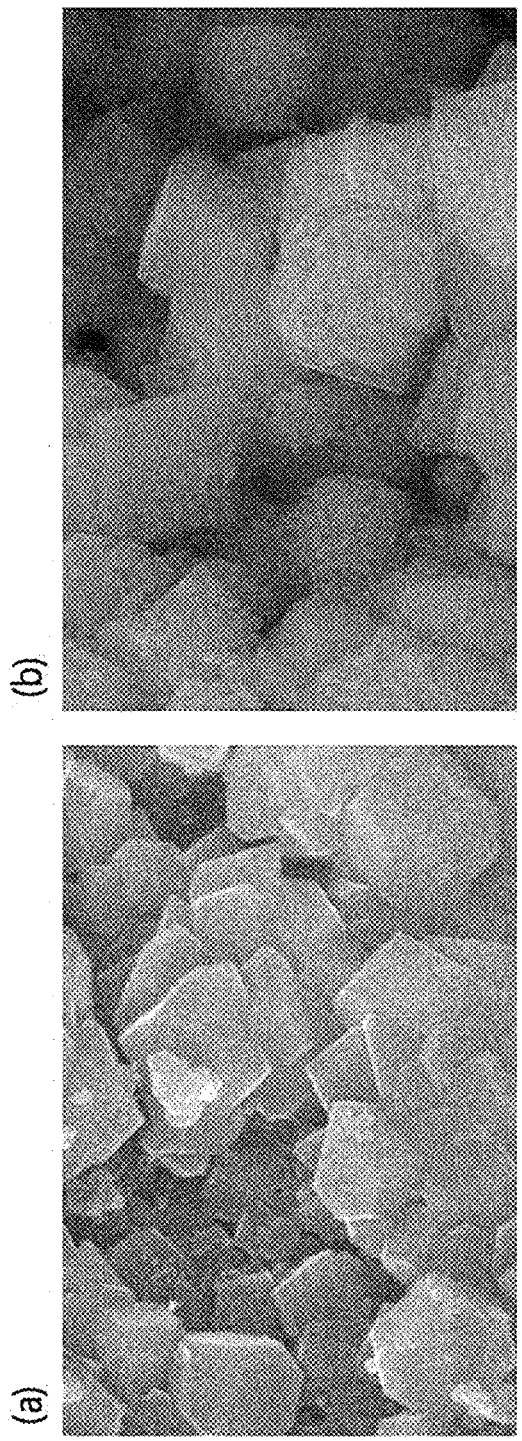
FIG. 22 is SEM data of a resulting product prepared by Experiment 3 of the whitlockite preparation method by temporal separation disclosed in the present application.
Figure 23:
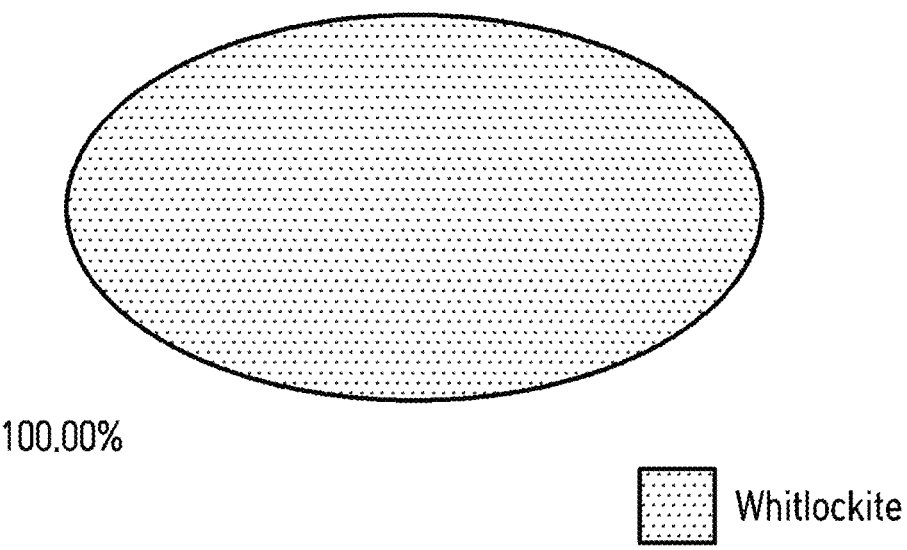
FIG. 23 is a graph showing XRD data of a resulting product prepared by Experiment 3 of the whitlockite preparation method by temporal separation disclosed in the present application.

Next, the powders were analyzed through SEM and XRD. Referring to FIGS. 22 and 23, it was confirmed that highly pure whitlockite powders were synthesized in a significantly reduced preparation time as short as 12 hours through the third experiment. SEM data shown in FIG. 22 is 50000-fold magnification data of the produced crystal. In FIG. 22, (a) represents SEM data for the case where the third time period for aging was set to 5 hours, (b) represents SEM data for the case where the third time period for aging was set to 10 hours.

In a third modification (hereinafter referred to as experiment 4 or a third modified experiment) to the first experiment, the experiment was conducted in a manner that the first time period for reaction was fixedly set to 15 minutes and the third time period for aging was varied. The third time period for aging was set to 30 minutes, 1 hour, 3 hours, and 5 hours, and the other experimental conditions were the same as in the first experiment. Thus, whitlockite powders for respective cases were obtained.

Figure 24:
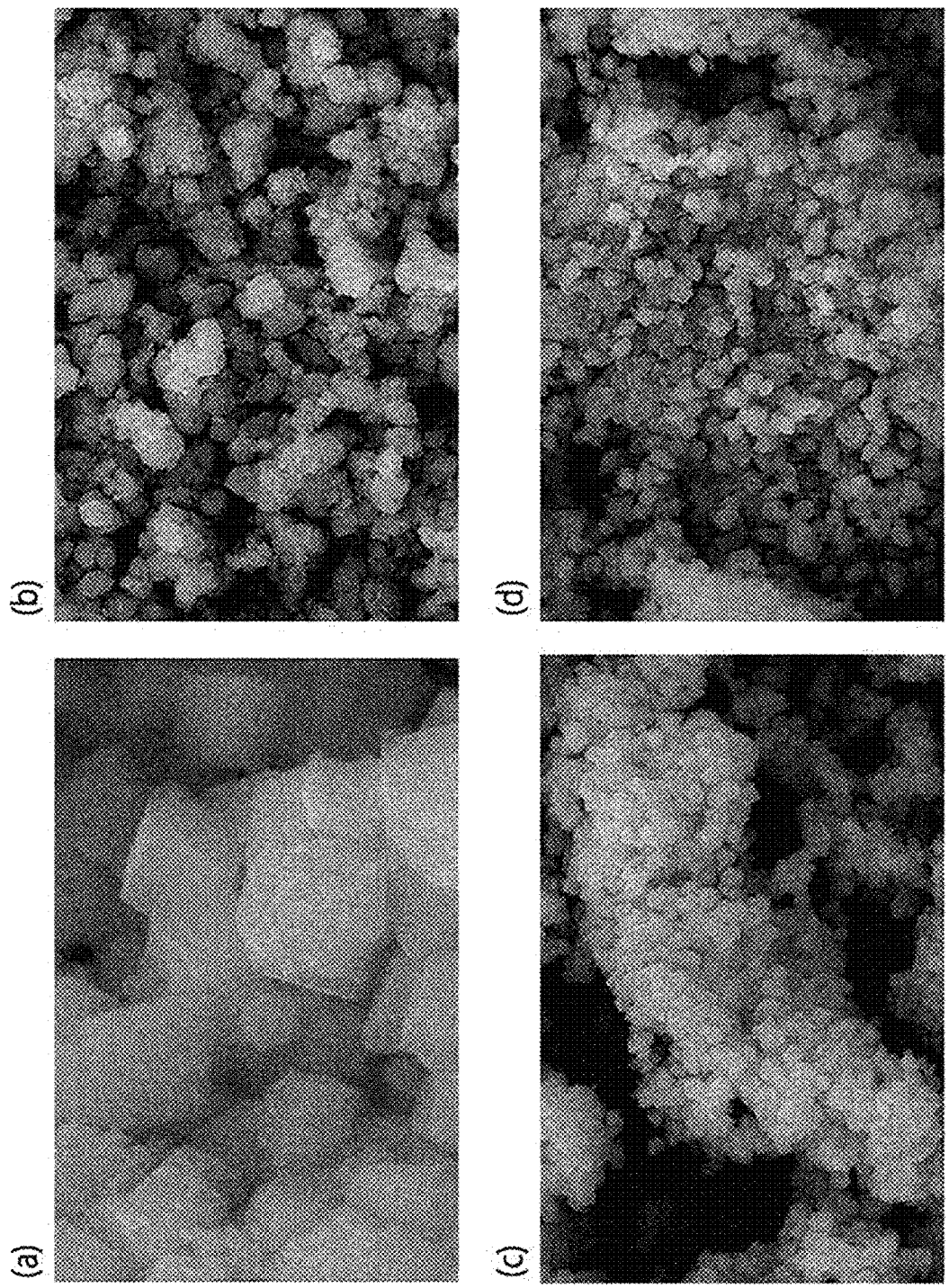
FIG. 24 is SEM data of a resulting product prepared by Experiment 4 of the whitlockite preparation method by temporal separation disclosed in the present application.
Figure 25:
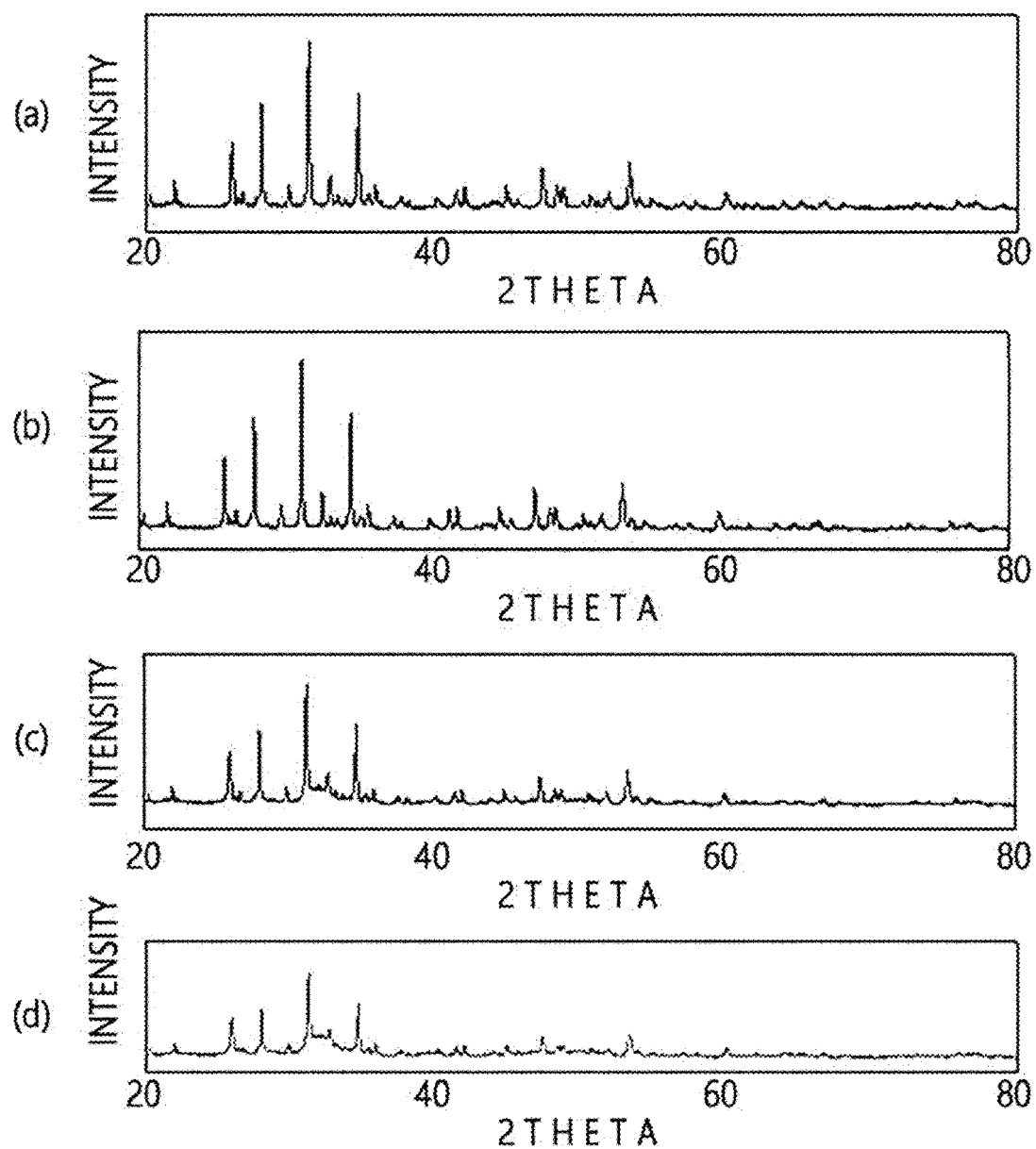
FIG. 25 is XRD data of a resulting product prepared by Experiment 4 of the whitlockite preparation method by temporal separation disclosed in the present application.

Next, the powders were analyzed through SEM and XRD. Referring to FIGS. 24 to 26, it was confirmed that highly pure whitlockite powders were synthesized within 6 hours and even within 2 hours. That is, the preparation time for whitlockite was significantly reduced. SEM data of FIG. 24 is 10000-fold magnification data of the prepared crystal. In FIG. 24, (a), (b), (c), and (d) represent SEM data for the cases where the third time period for aging was set to 5 hours, 3 hours, 1 hour, and 30 minutes, respectively. In FIG. 25, (a), (b), (c), and (d) represent XRD data for the cases where the third time period for aging was set to 5 hours, 3 hours, 1 hour, and 30 minutes, respectively.

Hereinafter, a method for controlling the particle size of whitlockite crystals, according to another embodiment of the present application, will be described. The details of the above-described whitlockite preparation methods may be similarly applied. Hereinafter, description will be made focusing on details that have not been described above.

According to one embodiment of the present application, the particle size of whitlockite crystals can be controlled by adding some cations other than calcium ions to the process for preparing first phosphate crystals. That is, it is possible to control the crystal size of the produced whitlockite.

According to one embodiment of the present application, the particle size of whitlockite crystals can be controlled by adjusting the reaction temperature for the formation of first phosphate crystals or second phosphate crystals, or by adjusting the aging temperature of a solution containing the first phosphate crystals and the second phosphate crystals.

2. Method for Controlling Particle Size of Whitlockite Crystal (1) First Embodiment of Method for Controlling Particle Size of Whitlockite Crystal A description will be made with reference to FIG. 27. According to one embodiment of the present application, a whitlockite preparation method includes a process (S3100) of determining the particle size of whitlockite crystals to be prepared, and a process (S3200) of determining a first amount of cations other than calcium ions on the basis of the determined crystal particle size.

In this case, when the determined size of whitlockite crystals is a first size, the first amount is set to a first value. On the other hand, when the determined size of whitlockite crystals is a second size larger than the first size, the first amount is set to a second value. In this case, the first value is greater than the second value.

The method for preparing whitlockite crystal according to one embodiment of the present application may include: mixing a calcium ion and a phosphate ion in order to prepare a first phosphate crystal, wherein the determined first amount of cation other than calcium ion is also mixed therewith(S3300); mixing cation other than calcium ion and the phosphate ion in order to prepare a second phosphate crystal(S3400); and aging a solution containing the first phosphate crystal and the second phosphate crystal(S3500). In other words, in order to produce whitlockite crystals having a second size that is larger than a first size, the amount of cations that are not calcium ions and which are to be mixed with calcium ions and phosphate ions to prepare the first phosphate crystals may be determined to be small.

According to one embodiment of the present application, the first amount of cations that are not calcium ions and which are to be mixed to prepare the first phosphate crystals, and the second amount of cations that are not calcium ions and which are to be mixed to prepare the second phosphate crystals may be determined independently of each other. Accordingly, the amount of cations other than calcium ions, which are to be mixed to prepare the first phosphate crystals, and the amount of cations other than calcium ions, which are to be mixed to prepare the second phosphate crystals, may be the same or different from each other.

For example, when the amount of cations that are not calcium ions and which are to be mixed to prepare the second phosphate crystals is referred to as a second amount, the first amount and the second amount may be irrespectively determined in order to control the particle size of whitlockite crystals. In other words, in order to prepare whitlockite crystals having a second size larger than a first size, the first amount may be set to a second value less than a first value. In this case, the first amount may be determined regardless of a value of the second amount. In this case, the first value is the value of the first amount when the particle size of the whitlockite crystal to be produced is the first size.

In addition, for example, the second amount may be determined independently of the first amount to control the size of whitlockite crystals to be produced. Preferably, the second amount of cations that are not calcium ions and which are to be mixed to prepare the second phosphate crystals may be determined depending on the amount of whitlockite crystals to be produced, regardless of the first amount.

That is, according to a preferred embodiment of the present application, the amount (first amount) of cations that are not calcium ions and which are to be mixed to prepare the first phosphate crystals is determined to be a small value regardless of the second amount, so that whitlockite crystals having a larger size can be produced.

In addition, cations that are not calcium ions and which are added in process S3100, and cations that are not calcium ions and which are added in process S3200 may be determined independently of each other. In addition, cations that are not calcium ions and which are added in process S3100, and cations that are not calcium ions and which are added in process S3200 may be the same type of cations or may be different types of cations.

Alternatively, according to one embodiment of the present application, the first amount to control the size of whitlockite crystals to be produced may be determined depending on a relationship with the second amount.

For example, when cations that are not calcium ions and which are added in process S3100 and the cation that are not calcium ion and which are added in process S3200 are the same type of cations, the first amount and the second amount have a predetermined relationship with each other. Even in this case, it is possible to produce the desired amount of whitlockite and to control the particle size of whitlockite crystals produced.

Unlike in the embodiment described above, the sum of the first amount and the second amount may be determined depending on the amount of whitlockite to be prepared (in the embodiment described above, the second amount is determined depending on the amount of whitlockite to be prepared). Thereafter, as described above, the first amount may be determined depending on the particle size of whitlockite to be prepared. Accordingly, the second amount can be naturally determined.

Assuming equal amounts of whitlockite are produced, the sum of the first and second amounts required to produce whitlockite crystals having the first size, and the sum of the first and second amounts required to produce whitlockite crystals having the second size may be equal. In this case, when the sum of the first amount and the second amount is constant, the particle size of the whitlockite crystal can be controlled according to a ratio of a value of the second amount to a value of the first amount. In this case, reference may be made to the embodiment in which the particle size of the whitlockite crystals can be controlled to be smaller when the first amount is increased. For example, when the value of the first amount is M1 and the value of the second amount is M2, the value of M1+M2 may not change although the particle size of whitlockite crystals changes. When the particle size of whitlockite crystals changes from a relatively large second size to a relatively small first size, as the value of M1 increases, the ratio of the value of M1 to the value of M2 value (M1/M2) may increase. That is, when the value of M1+M2 is constant, as the value of M1 is increased, the value of M1/M2 increases. Accordingly, the particle size of whitlockite crystals can be controlled so that the particle size of whitlockite crystals gradually decreases.

When the sum of the first amount and the second amount is constant, there may be an advantage in that raw materials can be saved compared to a case where the first amount is determined independently of the second amount.

For example, in the case of producing the same amount of whitlockite, it is assumed that the required total amount of non-calcium cations is 1 (assuming that the non-calcium cations mixed in S3100 and the non-calcium cations mixed in S3200 are the same).

When the sum of the first amount and the second amount is constant, the sum of the first amount and the second amount may be determined depending on the target amount of whitlockite to be prepared. Therefore, the sum of the two amounts may be 1.

However, when the first amount is determined independently of the second amount, the second amount can be determined depending on the target amount of whitlockite to be prepared. In this case, the second amount may be 1, and a first amount (for example, 0.1) may be additionally needed to control the particle size of whitlockite crystals. Accordingly, in this case, the sum of the first amount and the second amount exceeds 1 to control the particle size when a certain amount of whitlockite crystals.

Accordingly, when the sum of the first amount and the second amount is constant, there may be an advantage that a raw material for a non-calcium cation can be reduced compared to a case where the first amount and the second amount are independently determined.

According to one embodiment of the present application, calcium ions and phosphate ions are mixed to prepare first phosphate crystals. In this mixing step, the determined first amount of non-calcium cations is mixed together. To prepare second phosphate crystals, phosphate ions and non-calcium cations are mixed. Next, a solution containing the first phosphate crystals and the second phosphate crystals is aged.

The first phosphate may be phosphate including calcium ions. That is, the first phosphate may be the crystal of a calcium phosphate material. For example, the first phosphate may be the calcium phosphate material. For example, the calcium phosphate material may be hydroxyapatite, dicalcium phosphate dehydrate (DCPD), brushite, monetite, or a material including any combination thereof. However, the calcium phosphate material is not limited to the examples. Any material in which calcium ions and phosphate ions are combined may be regarded as a calcium phosphate material.

The second phosphate may be a phosphate material including non-calcium cations. That is, the second phosphate material may be a material in which phosphate ions and non-calcium cations are combined. For example, when the non-calcium cation is a magnesium ion, the second phosphate material is a magnesium phosphate material. The magnesium phosphate material may be monomagnesium phosphate, dimagnesium phosphate, newberyite, trimagnesium phosphate, or a material including any combination of these. However, the magnesium phosphate material is not limited to the examples. Any material in which magnesium ions and phosphate ions are combined may be regarded as a magnesium phosphate material.

In addition, when the second cation is a cobalt ion, the second phosphate material may be cobalt (II) phosphate hydrate.

In addition, when the second cation is an iron ion, the second phosphate material may be iron (III) phosphate dihydrate, iron (III) phosphate tetrahydrate, or a material containing any combination of these.

In addition, when the second cation is a sodium ion, the second phosphate material may be sodium phosphate.

In addition, when the second cation is a potassium ion, the second phosphate material may be potassium phosphate tribasic.

In addition, when the second cation is a strontium ion, the second phosphate material may be strontium phosphate.

In addition, when the second cation is a barium ion, the second phosphate material may be barium phosphate.

However, the second phosphate material is not limited to the exemplified materials. Any material in which the second cations and phosphate ions are combined and which can exist as combined in an aqueous solution, the material can be regarded as the second phosphate material.

Calcium ions may be supplied by a calcium ion feed material including at least one or more selected from calcium hydroxide, calcium carbonate, calcium nitrate, and calcium acetate. Preferably, calcium ions may be supplied by calcium hydroxide.

For example, by mixing an aqueous solution in which solid calcium hydroxide is dissolved in water to contain calcium ions with phosphate ions, or by mixing solid calcium hydroxide with an aqueous solution containing phosphate ions, phosphate ions and calcium ions can be mixed to coexist in a solution. However, the mixing method is not limited thereto and may include all cases in which phosphate ions and calcium ions are mixed to coexist in a solution.

The cation other than calcium ion (non-calcium cation) may be an ionic form of at least one element selected from Mg, Co, Sb, Fe, Mn, Y, Eu, Cd, Nd, Na, La, Sr, Pb, Ba, and K.

In addition, the non-calcium cation (the ionic form of an X atom) may be supplied by a cation feed material including at least one selected from among X hydroxide, X carbonate, X nitrate and X acetate.

For example, when the non-calcium cation is a magnesium ion, the magnesium ion may be supplied by a magnesium feed material such as magnesium hydroxide, magnesium carbonate, magnesium nitrate, or magnesium acetate, etc.

In this case, by mixing an aqueous solution in which solid magnesium hydroxide is dissolved in water to contain magnesium ions with phosphate ions, or by mixing solid magnesium hydroxide with an aqueous solution containing phosphate ions, phosphate ions and magnesium ions can be mixed to coexist in a solution. However, the mixing method is not limited thereto and may include all cases in which phosphate ions and magnesium ions are mixed to coexist in a solution.

The non-calcium cations mixed to prepare the first phosphate crystals may serve to inhibit the formation and growth of the calcium phosphate crystals generated by reaction between the calcium ions and the phosphate ions. For example, when the non-calcium cation to be mixed to prepare the first phosphate crystal is magnesium ion, when calcium ions and phosphate ions react to form calcium phosphate, the magnesium ions reduce the chance of collision between the calcium ions and the phosphate ions, thereby inhibiting the formation and growth of calcium phosphate. In other words, when magnesium ions are not mixed, the frequency of collisions between calcium ions and phosphate ions may be relatively high, and thus the chance of the reaction for the production of calcium phosphate may be high. However, when magnesium ions are mixed together, since phosphate ions may collide with magnesium ions as well as with calcium ions, the frequency of collisions between phosphate ions and calcium ions may be reduced compared to a case where magnesium ions are not mixed. Accordingly, the chance of the reaction to form calcium phosphate crystals is also reduced, so that the growth of calcium phosphate crystals may be suppressed. That is, magnesium ions may be involved in inhibiting the growth of calcium phosphate crystals.

Non-calcium cations to be mixed to prepare first phosphate crystals, and non-calcium cations to be mixed to prepare second phosphate crystals may be the same cations. For example, both of the non-calcium cation mixed to prepare first phosphate crystals and the non-calcium cation mixed to prepare second phosphate crystals may be magnesium ion.

For example, non-calcium cations mixed to prepare the first phosphate crystals may play a role of inhibiting the growth of first phosphate crystals, and cations that can play the role may be mixed. Therefore, non-calcium cations mixed to prepare first phosphate crystals and non-calcium cations mixed to prepare second phosphate crystals may be different. For example, non-calcium cations mixed to prepare second phosphate crystals may be magnesium ions, and non-calcium cations mixed to prepare first phosphate crystals and functioning to inhibit the growth of the first phosphate crystals may not be magnesium ions but be cations having similar physical characteristics (for example, size of ions) and similar chemical characteristics (for example, amount of charge) to magnesium ions.

The phosphate ions may include all forms of phosphoric acid which can exist in an aqueous solution depending on the pH. Generally speaking, the phosphate ion may refer to $PO_4^{3-}$, but is not limited thereto, and may include any form of phosphoric acid that can exist in an aqueous solution. For example, phosphate ions ($PO_4^{3-}$), hydrogen phosphate ions ($HPO_4^{2-}$), dihydrogen phosphate ions ($H_2PO_4^{-}$), and phosphoric acid ($H_3PO_4$) are all regarded as phosphate ions.

The phosphate ions may be supplied by a phosphate ion feed material (or phosphate ion donor material) including at least one or more selected from phosphoric acid, diammonium hydrogen phosphate, ammonium phosphate, and phosphate. Preferably, the phosphate ions may be supplied by phosphoric acid. For example, a solid phosphate ion feed material (for example, diammonium hydrogen phosphate, ammonium phosphate, etc.) may be dissolved in water or an aqueous solution to obtain a solution containing phosphate ions, and the solution containing phosphate ions may be mixed. Alternatively, when water is present as a solvent in a phosphate ion donor material (for example, phosphoric acid), the phosphate ion donor material itself contains phosphate ions. In this case, the phosphate ion donor material may be mixed with calcium ions.

In addition, when phosphate ions are mixed with calcium ions or non-calcium cations, the phosphate ions may be mixed in a dropwise addition manner or a pouring addition manner. The pouring addition is different from dropwise addition and refers to a method in which substantially the entire volume of a solution to be added is added in a lump sum manner in a very short time. For example, in the conventional whitlockite preparation method, a solution containing phosphate ions was continuously mixed in a dropwise manner at a volume flow rate of 12.5 ml/min. On the other hand, in the whitlockite preparation method according to one embodiment of the present application, the solution containing phosphate ions may be mixed at once at a volume flow rate of 2 ml/sec (120 ml/m in) to 130 ml/sec (7800 ml/min). However, even with the use of the pouring addition, the mixing time may increase from several seconds to several tens of seconds depending on the volume of the solution containing phosphate ions to be mixed.

In addition, the solution containing phosphate ions may be mixed over several times at predetermined time intervals. For example, the phosphate ions mixed to prepare first phosphate crystals and the phosphate ions mixed to prepare second phosphate crystals may be mixed at a predetermined time interval between each time of mixing. In this case, the predetermined time interval may be determined depending on the reaction time for forming the first phosphate crystals.

In addition, when a solution containing the first phosphate crystals and the second phosphate crystals is aged, phosphate ions may be additionally mixed. In this case, the mixing of phosphate ions for the aging may be performed at a predetermined time interval from the mixing of phosphate ions to prepare the first phosphate crystals or from the mixing of phosphate ions to prepare the second phosphate crystals.

A description will be given with reference to FIGS. 27 and 28.

According to one embodiment of the present application, a process of mixing a phosphate ion and a first amount of a non-calcium cation to prepare first phosphate crystals, and a process of mixing a phosphate ion and non-calcium cation to prepare second phosphate crystals may be performed in the same container or in different container, respectively.

A description will be made with reference to FIG. 27. According to one embodiment according to the present application, a process of mixing calcium ion and phosphate ion in order to prepare the first phosphate crystal (preferably, calcium phosphate crystal), wherein a first amount of cation other than calcium ion is mixed therewith (S3300); and a process of mixing phosphate ion and a second amount of cation other than calcium ion in order to prepare the second phosphate crystal (S3400) may be performed in a separate container. That is, calcium ions, phosphate ions, and the first amount of non-calcium cations may be mixed in a first container, and phosphate ions and the second amount of non-calcium cations may be mixed in a second container.

Different reaction conditions can be provided by spatial separation. In other words, first reaction conditions for preparing the first phosphate crystals may be provided in the first container, and second reaction conditions for preparing the second phosphate crystals may be provided in the second container at the same time. In this case, the reaction conditions may be determined depending on pH, the amount of phosphoric acid, and the like.

Although the second phosphate material can be produced in the first container, preferably, first phosphate crystals are produced in the first container. In the second container, second phosphate crystals are produced.

Accordingly, the mixed solution including the first phosphate crystals and the second phosphate crystals may be formed through a process of gathering the mixed solution of the first container and the mixed solution of the second container into one container.

Subsequently, by providing conditions for sufficient phase transformation so that whitlockite can be formed from the mixed solution including the first phosphate crystals and the second phosphate crystals, whitlockite crystals having the determined size are prepared.

A description will be made with reference to FIG. 28. According to one embodiment according to the present application, a process of mixing calcium ion and phosphate ion in order to prepare the first phosphate material, wherein a first amount of cation other than calcium ion is mixed therewith(S4300); and a process of mixing phosphate ion and a second amount of cation other than calcium ion in order to prepare the second phosphate material(S4400) may be performed in a same container.

For example, in the first container, calcium ions, phosphate ions, and the first amount of non-calcium cations are mixed and reacted to form a first mixed solution. In this case, the first mixed solution preferably refers to a mixed solution containing calcium phosphate crystals formed by the reaction of calcium ions and phosphate ions. Phosphate crystals formed by the reaction of phosphate ions with non-calcium cations may also be included. However, even in a case where phosphate crystals formed by the reaction between the non-calcium ions and the phosphate ions are not included in the first mixed solution, the objective of the present application can be achieved Subsequently, non-calcium cations and phosphate ions may be additionally mixed and reacted with the first mixed solution in the first container to produce a second phosphate crystal material. For example, second phosphate crystals, formed in process S4400 of mixing phosphate ions and a second amount of non-calcium cations to prepare second phosphate crystal, may be added to the mixed solution containing calcium phosphate. Wherein the mixed solution containing calcium phosphate is the product of process S4300 of mixing the determined first amount of non-calcium cations at the time of mixing calcium ions and phosphate ions to prepare first phosphate crystals. Thus, a mixed solution containing the first phosphate crystals and the second phosphate crystals can be obtained.

Subsequently, the mixed solution containing the first phosphate crystals and the second phosphate crystals is aged (S4500) to prepare whitlockite crystals having the desired size.

That is, mixing and reaction are performed in one container, but mixing and reaction are sequentially performed through temporal separation.

The temporal separation may mean that: applying a first reaction condition for forming the first phosphate crystal, and applying a second reaction condition for forming the second phosphate crystal after a predetermined time interval has elapsed.

For example, in process S4300 of preparing the first phosphate crystals, calcium ions and phosphate ions may be mixed to generate the first phosphate crystals. In this process, a first amount of non-calcium cations may also be mixed along with the calcium ions and the phosphate ions. In this case, the first reaction conditions may be applied depending on the amounts of phosphate ions and calcium ions for the preparation of the first phosphate crystals, on and the pH condition of the mixed solution. After a predetermined period of time has elapsed, in process S4400 of preparing the second phosphate crystals, non-calcium cations and phosphate ions may be mixed to form a second phosphate material. In this case, the second reaction conditions may be applied depending on the amounts of the phosphate ions and non-calcium cations for the preparation of the second phosphate crystals, and on the pH condition of the mixed solution.

The targeted intermediate products can be generated in respective processes through this temporal separation, and it is not necessary to control the pH in a complicated manner to generate the targeted intermediate products. Therefore, with this method, it is possible to prepare whitlockite in a simple and intuitive manner.

In addition, since it is not necessary to precisely control the pH, it is possible to add a phosphate ion feed material in a pouring addition manner rather than a dropwise addition manner, resulting in a significant reduction in preparation time of whitlockite.

A description will be given with reference to FIGS. 27 and 28. According to one embodiment of the present application, a whitlockite crystal preparation method includes: a process (S3100) of determining the particle size of whitlockite crystals to be prepared; and a process (S3200) of determining a first amount of cations other than calcium ions on the basis of the determined particle size of the crystal. Wherein, when the determined size of whitlockite crystals is a first size, the first amount is set to a first value, when the determined size of whitlockite crystals is a second size larger than the first size, the first amount is set to a second value.

To prepare first phosphate crystals, which are preferably calcium phosphate crystals, calcium ions and phosphate ions are mixed(S3300). In this case, the determined first amount of cations other than calcium ions is mixed together. To prepare second phosphate crystals, phosphate ions and cations other than calcium ions are mixed (S3400). Next, a solution including the first phosphate crystals and the second phosphate crystals is aged (S3500). In this case, the first value is larger than the second value.

A process of mixing an oxidizing agent may be further included. For example, the oxidizing agent may be mixed in at least one process among process S3300 of mixing calcium ions, phosphate ions, and the first amount of non-calcium cations to prepare first phosphate crystals, process S3400 of mixing non-calcium cations and phosphate ions to prepare second phosphate crystals, and process S3500 of aging the solution containing the first phosphate crystals and the second phosphate crystals.

Alternatively, the process of mixing the oxidizing agent may be performed prior to process S3300 of mixing calcium ions, phosphate ions, and the first amount of non-calcium cations to prepare the first phosphate crystals.

Alternatively, the process of mixing the oxidizing agent may be performed prior to process of S3400 of mixing non-calcium cations and phosphate ions to prepare the second phosphate crystals.

The addition of the oxidizing agent reduces the preparation time for whitlockite crystals. Preferably, hydrogen peroxide may be used the oxidizing agent.

The whitlockite preparation method may further include filtering, washing, oven drying, ball milling, and sieving processes.

(1)-1 Experimental Example

Two types of experiments related to the present embodiment were conducted. First, a process of mixing calcium ions and phosphate ions to prepare first phosphate crystals, in which non-calcium cations are also mixed together, and a process of mixing non-calcium ions and phosphate ions to prepare second phosphate crystals were performed in respectively different container. That is, whitlockite was prepared through spatial separation.

Second, a process of mixing calcium ions and phosphate ions to prepare first phosphate crystals, in which non-calcium cations are also mixed together, and a process of mixing non-calcium ions and phosphate ions to prepare second phosphate crystals were performed in the same container. That is, whitlockite was prepared through temporal separation.

(1)-1-1 Spatial Separation

In an experiment (hereinafter, referred to as a Experiment 1) in connection with the preparation method by spatial separation according to the present embodiment, calcium ions and phosphate ions were mixed in a first container. At this time, a first amount of magnesium ions were also mixed together. At this time, 6.85 g (about 0.0924 mol) of solid calcium hydroxide was dissolved in distilled water to prepare a solution containing calcium ions, and the solution containing calcium ions was mixed with 3.81 ml of an 85% phosphoric acid solution containing phosphate ions (107.19 ml of distilled water, i.e., 0.5M aqueous solution of phosphoric acid (111 ml). At this time, X g of solid magnesium hydroxide was dissolved in distilled water ($125*(1+(X/1.9))$ ml) and mixed with calcium ions. Thereafter, stirring was performed at 80° C. for 1 hour to form a calcium phosphate material.

In a second container, magnesium ions and phosphate ions were mixed. At this time, Y g of solid magnesium hydroxide was dissolved in distilled water ($125*(Y/1.9)$ ml) to prepare a solution containing magnesium ions, and the solution containing magnesium ions was mixed with 2.23 ml of an 85% phosphoric acid solution containing phosphate ions (62.77 ml distilled water, i.e., 0.5M aqueous solution of phosphoric acid (65 ml)). Thereafter, stirring was performed at 80° C. for 1 hour to form a magnesium phosphate material.

At this time, the amounts X g and Y g of the solid magnesium hydroxide mixed in the first container and the second container were set to 0.19 g and 1.9 g, respectively. These amounts were changed to 0.38 g and 1.52 g, respectively, then to 0.63 g and 1.27 g, respectively, and then to 1.27 g and 0.63 g, respectively.

Then, the mixed solution of the first container and the mixed solution of the second container were gathered into one mixed solution. Thus, a mixed solution including the calcium phosphate material and the magnesium phosphate material was obtained.

Subsequently, 2.54 ml of an 85% phosphoric acid solution containing phosphate ions (71.46 ml distilled water, i.e., 74 ml of 0.5M aqueous phosphoric acid solution) was mixed with the mixed solution including the calcium phosphate material and the magnesium phosphate material. Thereafter, aging of the mixed solution was performed. To this end, the mixed solution was stirred at 80° C. for 23 hours.

When the solution containing phosphate ions was added, the solution was not added by dropwise addition but was added by pouring. That is, phosphoric acid in the amount corresponding to each was added three times using the pouring method.

After the mixed solution was aged for 23 hours, the mixed solution was filtered, and the residue was washed, oven dried, ball milled, and sieved to prepare a dried powder.

Figure 31:
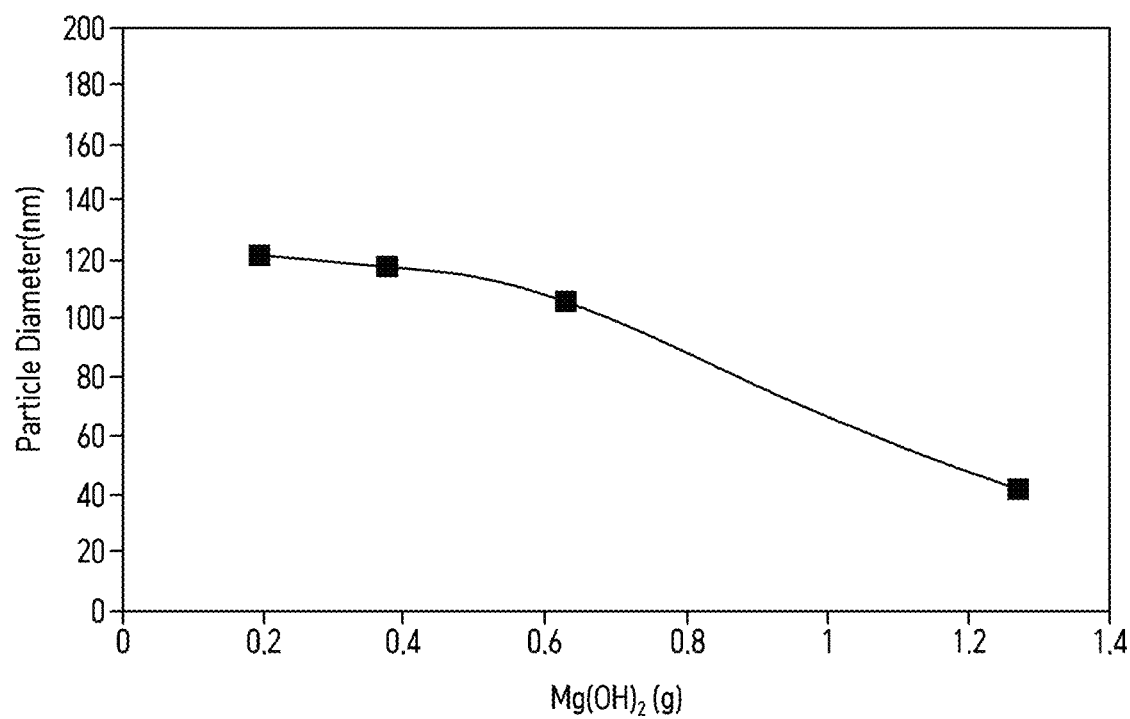
FIG. 31 is a graph showing an average particle size of whitlockite crystals prepared by the whitlockite preparation method by spatial separation being capable of controlling the particle size of whitlockite crystals, according to one embodiment disclosed in the present application.

Next, the synthesized powder was analyzed through SEM and XRD. Refer to FIG. 29. Through the experiment 1, it was confirmed that high purity whitlockite was formed when magnesium ions were added to the first container together with the calcium ions and the phosphate ions. In addition, referring to FIGS. 30 and 31, as the amount of magnesium hydroxide mixed (which is proportional to the amount of magnesium ions) in the first container was increased, it was confirmed that the particle size of whitlockite crystals was gradually decreased. In FIG. 30, (a) shows 10000-fold magnification SEM data of crystal prepared through a case where the amounts X g and Y g of solid magnesium hydroxide mixed in the first container and the second container were 0.19 g and 1.9 g, respectively, (b) shows 10000-fold magnification SEM data of crystal prepared through a case where the amounts X g and Y g were 0.38 g and 0.52 g, respectively, (c) show 10000-fold magnification SEM data of crystal prepared through a case where the amounts X g and Y g were 0.63 g and 1.27 g, respectively, and (d) shows 10000-fold magnification SEM data of crystal prepared through a case where the amounts X g and Y g were 1.27 g and 0.63 g, respectively.

(1)-1-2 Temporal Separation

In an experiment (hereinafter, referred to as a Experiment 2) in connection with the whitlockite preparation method by temporal separation according to the present embodiment, the total amount of magnesium ions added were about 26% by mole with respect to the total amount of all cations, and the molar ratio of the total amount of phosphate ions to the total amount of all cations was 1:1. Aging for the formation of whitlockite was performed at 80° C.

6.85 g (about 0.0924 mol) of solid calcium hydroxide was dissolved in distilled water to prepare a solution containing calcium ions, and the solution containing calcium ions was mixed with 3.81 ml of an 85% phosphoric acid solution containing phosphate ions (107.19 ml of distilled water, i.e., 0.5M aqueous solution of phosphoric acid (111 ml)). At this time, X g of solid magnesium hydroxide was dissolved in distilled water ($125*(1+(X/1.9))$ ml) and mixed with calcium ions. Thereafter, stirring was performed at 80° C. for 1 hour to form a calcium phosphate material.

Subsequently, Y g of solid magnesium hydroxide was dissolved in distilled water ($125*(Y/1.9)$ ml) to prepare a solution containing magnesium ions, and the solution containing magnesium ions was mixed with 2.23 ml of an 85% phosphoric acid solution containing phosphate ions (62.77 ml distilled water, i.e., 0.5M aqueous solution of phosphoric acid (65 ml)). Thereafter, stirring was performed at 80° C. for 1 hour to form a magnesium phosphate material.

The amounts X g and Y g of the solid magnesium hydroxide which were mixed were set to 0.38 g and 1.52 g, respectively, and changed to 0.63 g and 1.27 g, respectively, then to 0.95 g and 0.95 g, respectively, then to 1.27 g and 0.63 g, respectively, and to 1.52 g and 0.38 g, respectively.

Subsequently, 2.54 ml of an 85% phosphoric acid solution containing phosphate ions (71.46 ml of distilled water, that is, 74 ml of a 0.5M aqueous phosphoric acid solution) was mixed with the mixed solution containing the calcium phosphate material and the magnesium phosphate material. Thereafter, aging was performed at 80° C. for 23 hours under stirring.

When the solution containing phosphate ions was added, the solution was not added by dropwise addition but was added by pouring. That is, phosphoric acid in the amount corresponding to each was added three times using the pouring method.

After the mixed solution was aged for 23 hours, the mixed solution was filtered, and the residue was washed, oven dried, ball milled, and sieved to prepare a dried powder.

Figure 32:
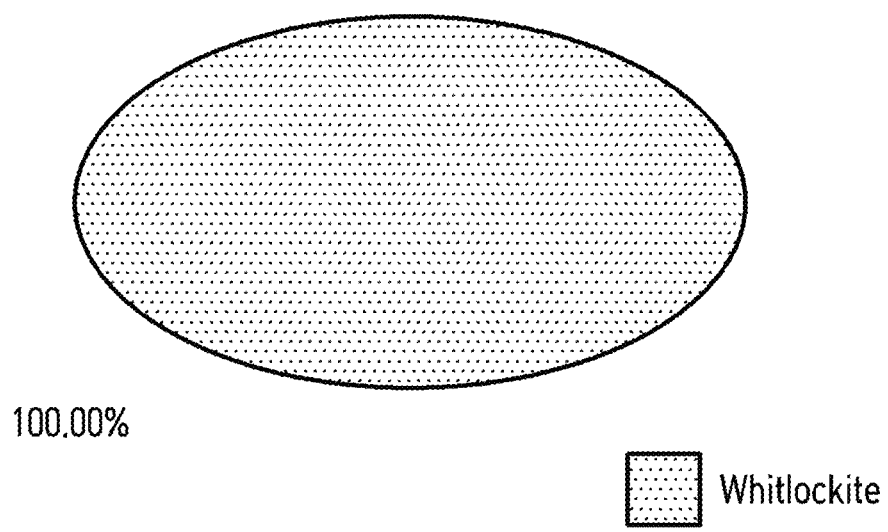
FIG. 32 is a circle graph showing XRD data of a resulting product prepared by the whitlockite preparation method by temporal separation capable of controlling the particle size of whitlockite crystals, according to one embodiment disclosed in the present application.
Figure 33:
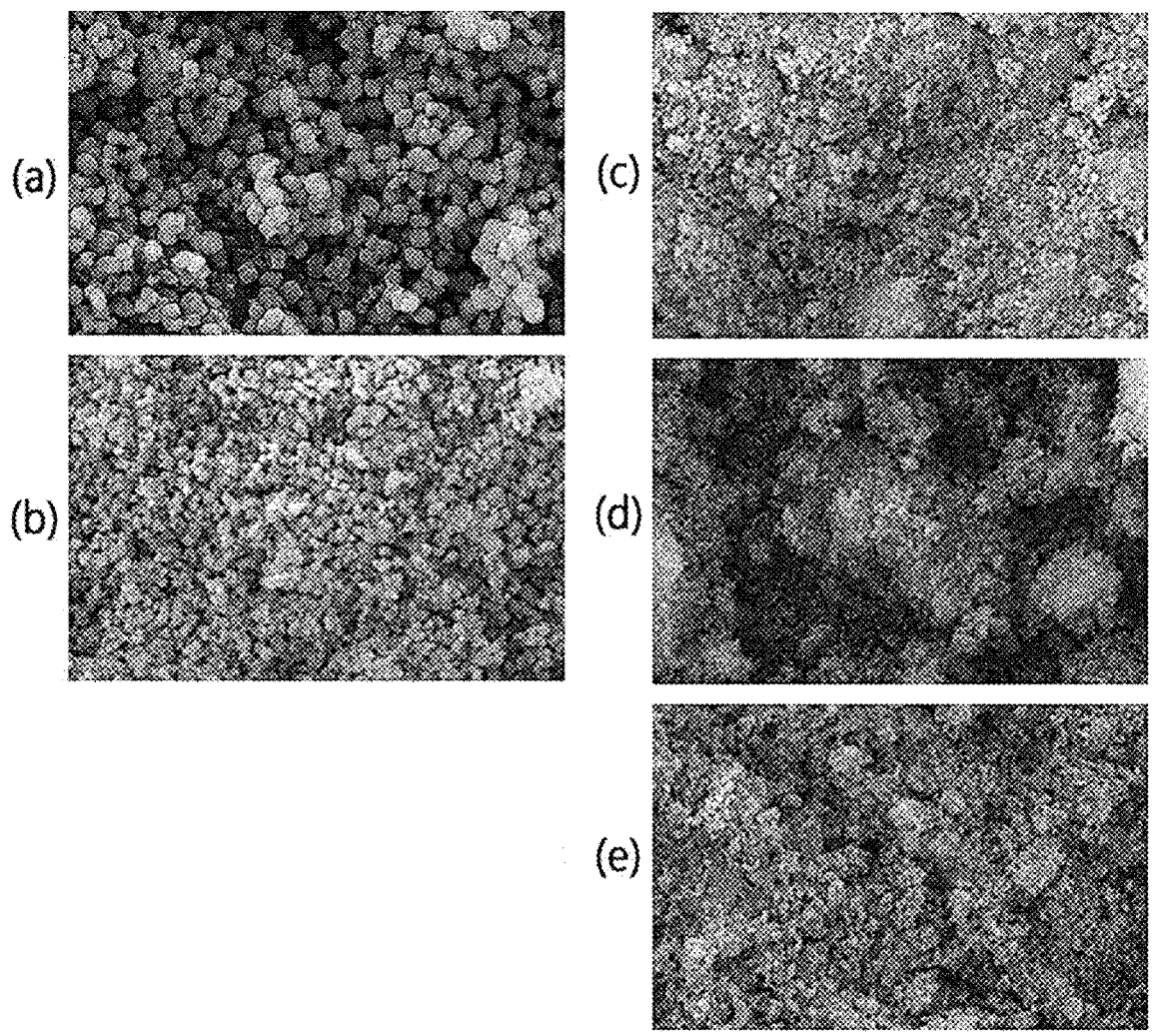
FIG. 33 is SEM data of a resulting product prepared by the whitlockite preparation method by temporal separation capable of controlling the particle size of whitlockite crystals, according one embodiment disclosed in the present application.
Figure 34:
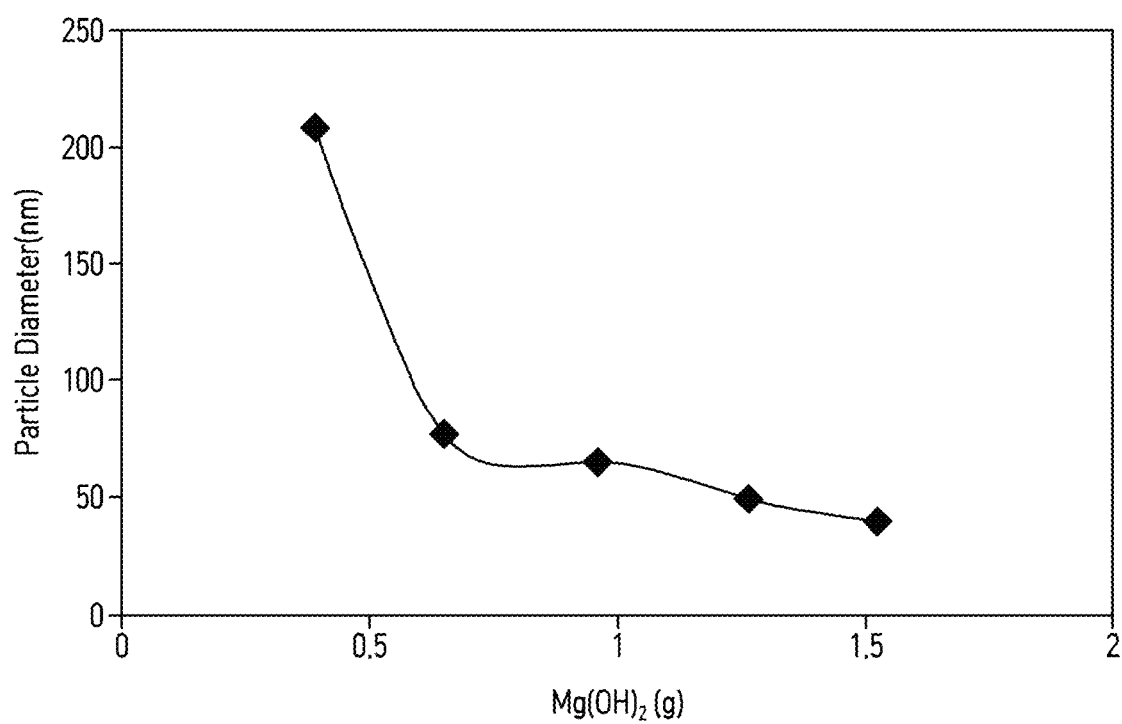
FIG. 34 is a graph showing an average particle size of whitlockite crystals prepared by the whitlockite preparation method by temporal separation capable of controlling the particle size of whitlockite crystals, according to one embodiment disclosed in the present application.

Next, the synthesized powder was analyzed through SEM and XRD. Referring to FIG. 32, through the experiment 2, it was confirmed that the highly pure whitlockite was formed, when magnesium ions were added together with calcium ions and phosphate ions. In addition, referring to FIGS. 33 and 34, as the amount of magnesium hydroxide (which is proportional to the amount of magnesium ions) mixed to produce the first phosphate crystals was increased, it was confirmed that the particle size of whitlockite crystals was gradually decreased. In FIG. 33, (a) shows 10000-fold magnification SEM data of crystal prepared through a case where the amounts X g and Y g of the solid magnesium hydroxide mixed were 0.38 g and 1.52 g, (b) shows 10000-fold magnification SEM data of crystal prepared through a case where the amounts X g and Y g were 0.63 g and 1.27 g, (c) show 10000-fold magnification SEM data of crystal prepared through a case where the amounts X g and Y g were 0.95 g and 0.05 g, and (d) shows 10000-fold magnification SEM data of crystal prepared through a case where the amounts X g and Y g were 1.52 g and 0.28 g.

In a second experiment (hereinafter referred to as Experiment 3) according to temporal separation manner in connection with the present embodiment, most of the experimental conditions were the same as in Experiment 2, but the reaction temperature and the aging temperature were set to 60° C. instead of 80° C. After the reaction temperature and the aging temperature were fixedly set to 60° C., the experiment was conducted while changing the first amount X g and the second amount Y g. The other experimental conditions were the same as in Experiment 2.

That is, Experiment 3 was conducted as described below.

6.85 g (about 0.0924 mol) of solid calcium hydroxide was dissolved in distilled water to prepare a solution containing calcium ions, and the solution containing calcium ions was mixed with 3.81 ml of an 85% phosphoric acid solution containing phosphate ions (107.19 ml of distilled water, i.e., 0.5M aqueous solution of phosphoric acid (111 ml)). At this time, X g of solid magnesium hydroxide was dissolved in distilled water and mixed with calcium ions. Thereafter, stirring was performed at 60° C. for 15 minutes to form a calcium phosphate material.

Subsequently, Y g of solid magnesium hydroxide was dissolved in distilled water to prepare a solution containing magnesium ions, and the solution containing magnesium ions was mixed with 2.23 ml of an 85% phosphoric acid solution containing phosphate ions (62.77 ml distilled water, i.e., 0.5M aqueous solution of phosphoric acid (65 ml)). Thereafter, stirring was performed at 60° C. for 1 hour to form a magnesium phosphate material.

The amounts X g and Y g of the solid magnesium hydroxide which were mixed were set to 0.63 g and 1.27 g, respectively, and then changed to 0.95 g and 0.95 g, respectively.

Subsequently, 2.54 ml of an 85% phosphoric acid solution containing phosphate ions (71.46 ml of distilled water, that is, 74 ml of a 0.5M aqueous phosphoric acid solution) was mixed with the mixed solution containing the calcium phosphate material and the magnesium phosphate material. Thereafter, aging was performed at 60° C. for 23 hours under stirring.

The other experimental processes were the same as in Experiment 2.

Figure 35:
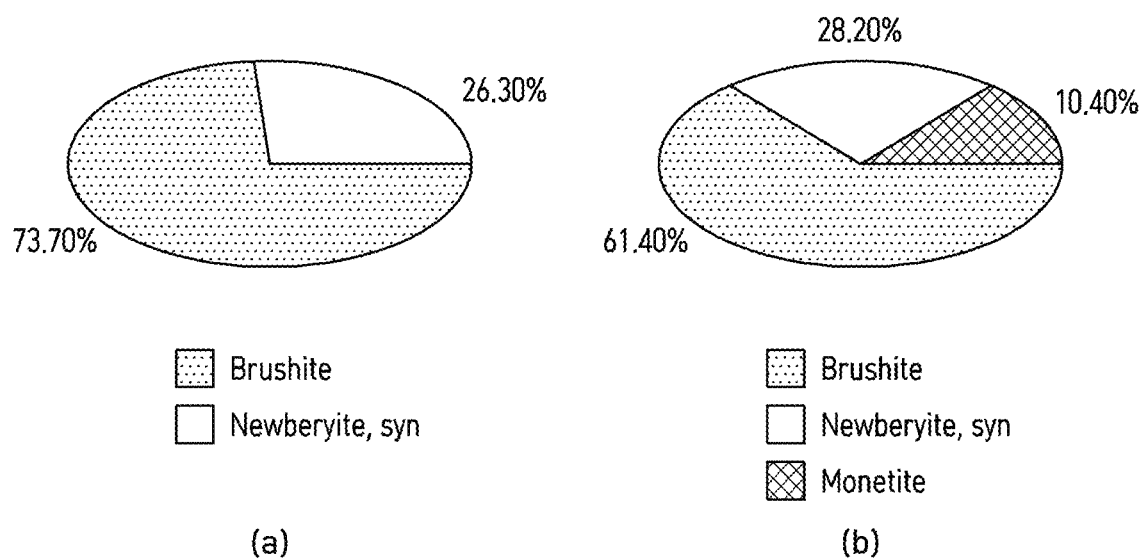
FIG. 35 is a circle graph showing XRD data of a resulting product prepared by the whitlockite preparation method by temporal separation capable of controlling the particle size of whitlockite crystals, according to one embodiment disclosed in the present application.

Next, the synthesized powder was analyzed through SEM and XRD. Referring to FIG. 35, when magnesium ions, calcium ions, and phosphate ions were added together to prepare first phosphate crystals as in Experiment 3, and the reaction temperature and the aging temperature was set to 60° C., it was confirmed that whitlockite was not formed. Therefore, it can be inferred that the reaction and aging temperatures must be set to a temperature higher than 60° C. to control the particle size of whitlockite crystals while using the amount of magnesium ions to be mixed to prepare the first phosphate crystal as a variable parameter.

Hereinafter, an experiment for controlling the particle size of whitlockite crystals while producing whitlockite in large quantities will be described in detail.

In a third experiment (hereinafter, referred to as Experiment 4) according to temporal separation in connection with the present embodiment, the total amount of magnesium ions added were about 26% by mole with respect to the total amount of all cations, and the molar ratio of the total amount of phosphate ions to the total amount of all cations was 1:1. Aging for the formation of whitlockite was performed at 80° C.

137.05 g (about 1.8514 mol) of solid calcium hydroxide was dissolved in distilled water to prepare a solution containing calcium ions, and the solution containing calcium ions was mixed with 75.49 ml of an 85% phosphoric acid solution containing phosphate ions (2.12451 L of distilled water, i.e., 2.2 L of 0.5M aqueous solution of phosphoric acid). At this time, X g of solid magnesium hydroxide was dissolved together with calcium ions in the distilled water. Through this, magnesium ions were mixed. Thereafter, stirring was performed at 80° C. for 1 hour (first reaction time) to form a calcium phosphate material.

Subsequently, Y g of solid magnesium hydroxide was dissolved in distilled water to prepare a solution containing magnesium ions, and the solution containing magnesium ions was mixed with 44.61 ml of an 85% phosphoric acid solution containing phosphate ions (1.25539 L of distilled water, i.e., 1.3 L of 0.5M aqueous solution of phosphoric acid). Thereafter, stirring was performed at 80° C. for 1 hour (second reaction time) to form a magnesium phosphate material.

The amounts X g and Y g of the solid magnesium hydroxide which were mixed were set to 18.95 g and 18.95 g, respectively, and then changed to 30.32 g and 7.58 g, respectively.

Subsequently, 51.47 ml of an 85% phosphoric acid solution containing phosphate ions (1.44853 L of distilled water, i.e., 1.5 L of a 0.5M aqueous phosphoric acid solution) was mixed with the mixed solution containing the calcium phosphate material and the magnesium phosphate material. Thereafter, aging was performed at 80° C. for 23 hours (aging time) under stirring.

When the solution containing phosphate ions was added, the solution was not added by dropwise addition but was added by pouring. That is, phosphoric acid in the amount corresponding to each was added three times using the pouring method.

After the mixed solution was aged for 23 hours, the mixed solution was filtered, and the residue was washed, oven dried, ball milled, and sieved to prepare a dried powder.

Figure 36:
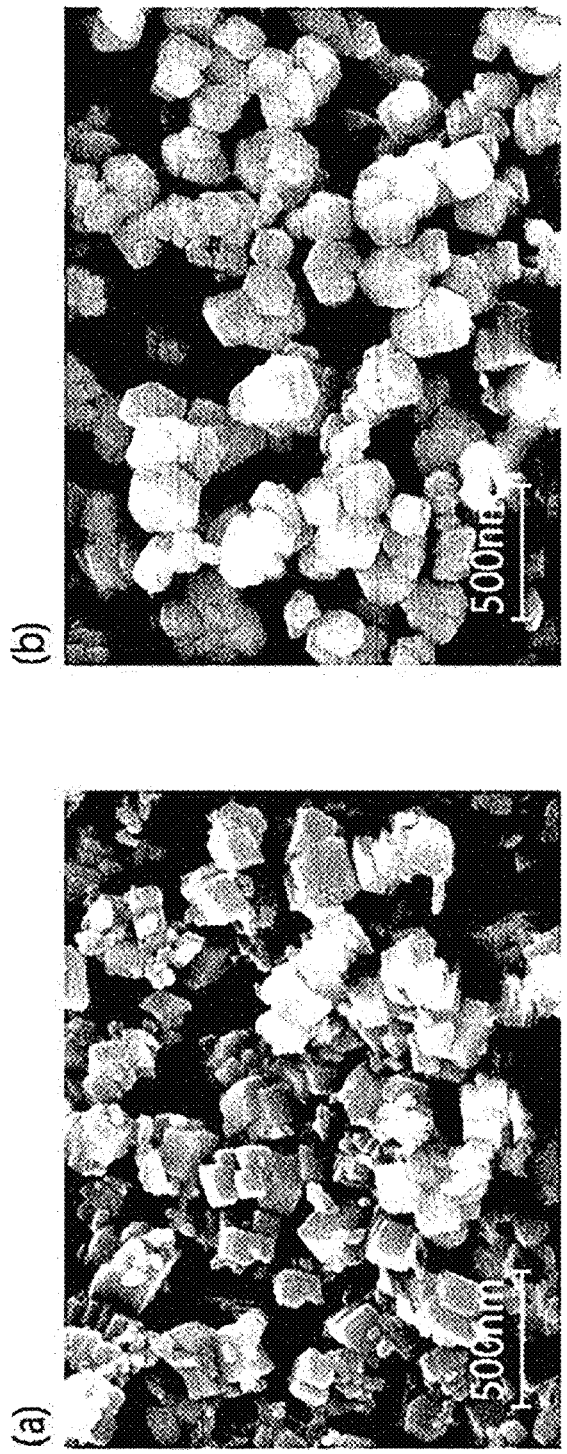
FIG. 36 is SEM data of a resulting product prepared by the whitlockite preparation method by temporal separation capable of controlling the particle size of whitlockite crystals, according one embodiment disclosed in the present application.
Figure 37:
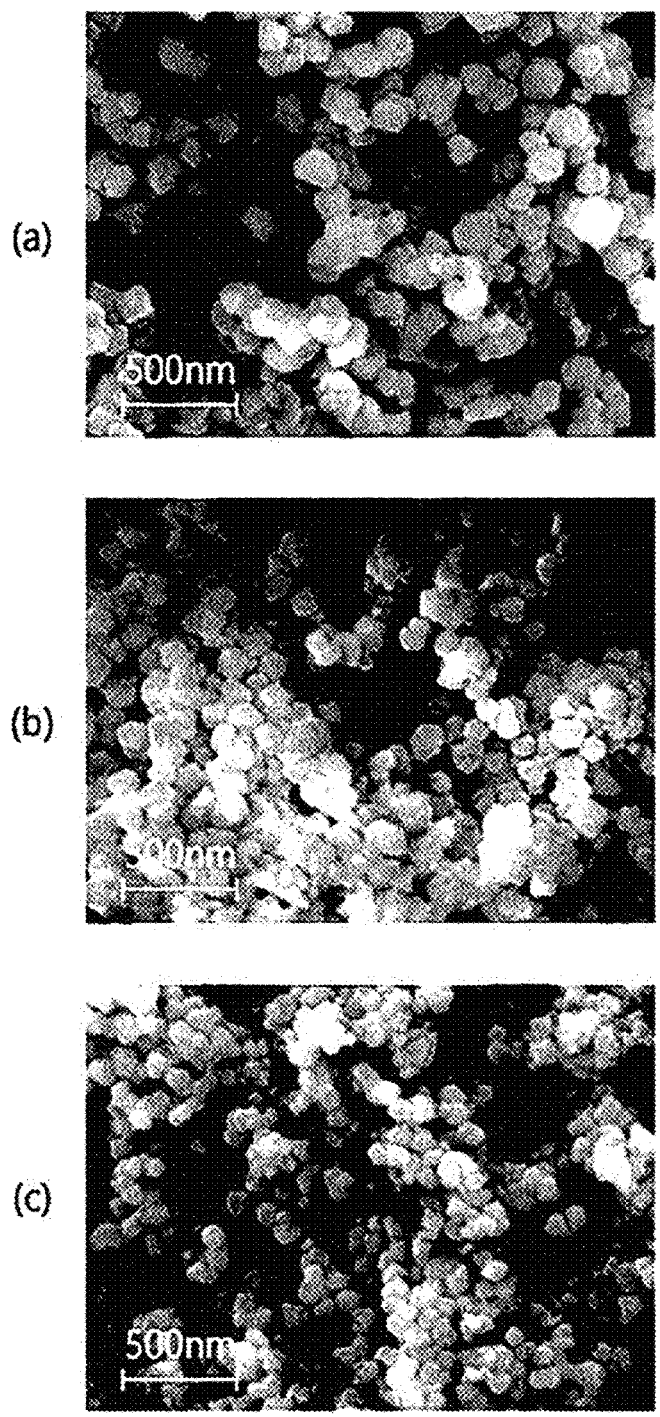
FIG. 37 is SEM data of a resulting product prepared by the whitlockite preparation method by temporal separation capable of controlling the particle size of whitlockite crystals, according one embodiment disclosed in the present application.
Figure 38:
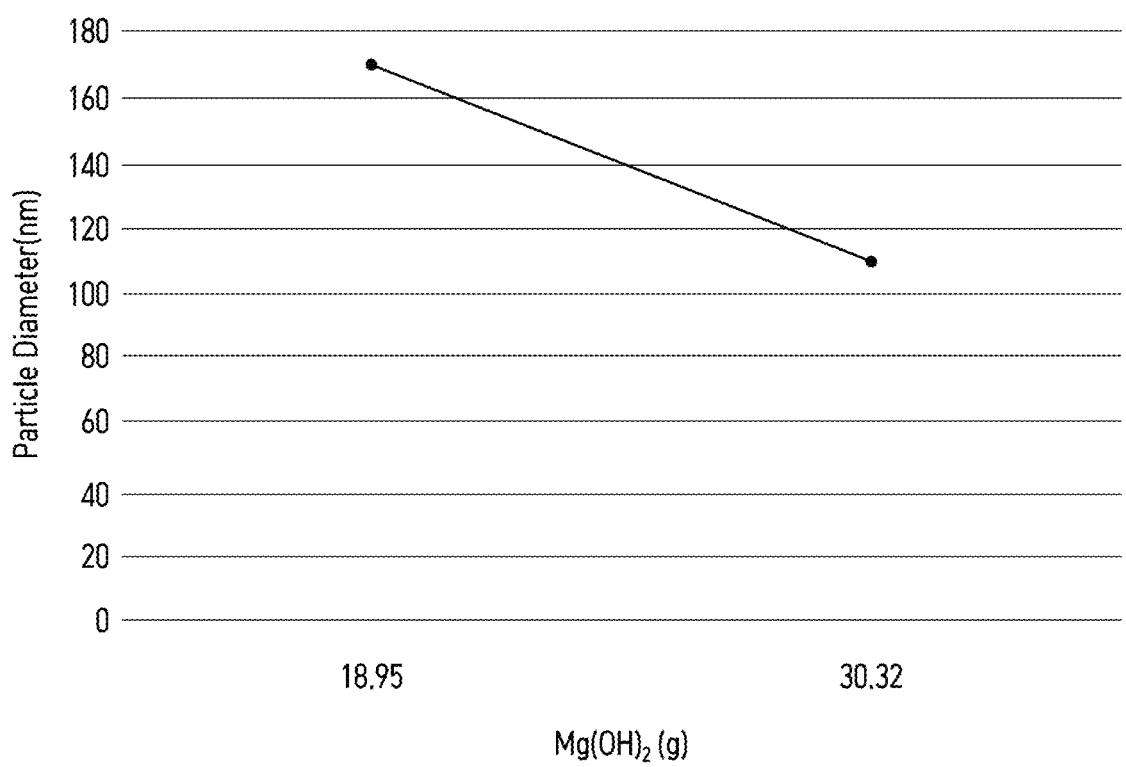
FIG. 38 is a graph showing an average particle size of whitlockite crystals prepared by the whitlockite preparation method by temporal separation capable of controlling the particle size of whitlockite crystals, according to one embodiment disclosed in the present application.

Next, the size of the synthesized powder was analyzed through SEM. Referring to FIG. 36 FIG. 37, when magnesium ions were mixed together with calcium ions and phosphate ions to prepare first phosphate crystals in Experiment 4, it was confirmed that highly pure whitlockite was formed. In addition, referring to FIG. 38, as the amount of magnesium hydroxide (which is proportional to the amount of magnesium ions) mixed to produce the first phosphate crystals was increased, it was confirmed that the particle size of whitlockite crystals was gradually decreased. FIG. 36 is SEM data of the experiment in which the amounts X g and Y g of the mixed solid magnesium hydroxide were 18.95 g and 18.95 g, and the produced crystal was magnified by 50000 times for analysis. FIG. 37 is SEM data of the experiment in which the amounts X g and Y g of the mixed solid magnesium hydroxide were 30.32 g and 7.58 g, and the produced crystal was magnified by 50000 times for analysis.

In this case, in Experiment 4, an oxidizing agent may be added, and the oxidizing agent may shorten the whitlockite preparation time. Specifically, the oxidizing agent may be hydrogen peroxide.

Specifically, in Experiment 4, 137.05 g (about 1.8514 mol) of solid calcium hydroxide was dissolved in distilled water and hydrogen peroxide serving as an oxidizing agent.

According to hydrogen peroxide is used as an oxidizing agent, the first reaction time of the Experiment 4 may be shortened to about 10 to 15 minutes. In addition, the second reaction time of the Experiment 4 may be shortened to about 10 to 15 minutes. In addition, the aging time of the Experiment 4 may be reduced to 3 hours. In other words, in the experimental example related to Experiment 4 in which an oxidizing agent is added, whitlockite may be prepared according to the following experimental examples, and the particle size of whitlockite crystals may be successfully controlled.

137.05 g (about 1.8514 mol) of solid calcium hydroxide was dissolved in distilled water and "hydrogen peroxide" to prepare a solution containing calcium ions, and the solution containing calcium ions was mixed with 75.49 ml of an 85% phosphoric acid solution containing phosphate ions (2.12451 L of distilled water, i.e., 2.2 L of a 0.5M aqueous solution of phosphoric acid). At this time, X g of solid magnesium hydroxide was dissolved in distilled water and mixed with calcium ions. Thereafter, stirring was performed at 80° C. for 10 to 15 minutes to form a calcium phosphate material.

Subsequently, Y g of solid magnesium hydroxide was dissolved in distilled water to prepare a solution containing magnesium ions, and the solution containing magnesium ions was mixed with 44.61 ml of an 85% phosphoric acid solution containing phosphate ions (1.25539 L of distilled water, i.e., 1.3 L of a 0.5M aqueous solution of phosphoric acid). Thereafter, stirring was performed at 80° C. for 10 to 15 minutes to form a magnesium phosphate material.

The amounts X g and Y g of the solid magnesium hydroxide which were mixed were set to 18.95 g and 18.95 g, respectively, and then changed to 30.32 g and 7.58 g, respectively.

Subsequently, 51.47 ml of an 85% phosphoric acid solution containing phosphate ions (1.44853 L of distilled water, i.e., 1.5 L of a 0.5M aqueous phosphoric acid solution) was mixed with the mixed solution containing the calcium phosphate material and the magnesium phosphate material. Thereafter, aging of the mixed solution was performed at 80° C. for 3 hours under stirring.

When the solution containing phosphate ions was added, the solution was not added by dropwise addition but was added by pouring. That is, phosphoric acid in the amount corresponding to each was added three times using the pouring method.

After the mixed solution was aged for 3 hours, the mixed solution was filtered, and the residue was washed, oven dried, ball milled, and sieved to prepare a dried powder.

In a fourth experiment (hereinafter, referred to as Experiment 5) in connection with the whitlockite preparation method by temporal separation according to the present embodiment, the total amount of magnesium ions added were about 26% by mole with respect to the total amount of all cations, and the molar ratio of the total amount of phosphate ions to the total amount of all cations was 1:1. Aging for the formation of whitlockite was performed at 80° C. In Experiment 5, a relatively large amount of whitlockite was synthesized compared to Experiment 4.

685.25 g (about 9.2163 mol) of solid calcium hydroxide was dissolved in distilled water to prepare a solution containing calcium ions, and the solution containing calcium ions was mixed with 377.45 ml of an 85% phosphoric acid solution containing phosphate ions (10.62255 L of distilled water, i.e., 11.00 L of a 0.5M aqueous solution of phosphoric acid). At this time, X g of solid magnesium hydroxide was dissolved in distilled water and mixed with calcium ions. Thereafter, stirring was performed at 80° C. for 1 hour (first reaction time) to form a calcium phosphate material.

Subsequently, Y g of solid magnesium hydroxide was dissolved in distilled water to prepare a solution containing magnesium ions, and the solution containing magnesium ions and 223.2 ml of an 85% phosphoric acid solution containing phosphate ions (6.2768 L of distilled water, i.e., 6.50 L of a 0.5M aqueous solution of phosphoric acid) were mixed with the mixed solution including the calcium phosphate material. Thereafter, stirring was performed at 80° C. for 1 hour (second reaction time) to form a magnesium phosphate material.

The amounts X g and Y g of the solid magnesium hydroxide which were mixed were set to 94.75 g and 94.75 g, respectively, and then changed to 151.60 g and 37.90 g, respectively.

Subsequently, 257.35 ml of an 85% phosphoric acid solution containing phosphate ions (7.24265 L of distilled water, i.e., 7.5 L of a 0.5M aqueous phosphoric acid solution) was mixed with the mixed solution containing the calcium phosphate material and the magnesium phosphate material. Thereafter, aging of the mixed solution was performed at 80° C. for 23 hours (aging time) under stirring.

When the solution containing phosphate ions was added, the solution was not added by dropwise addition but was added by pouring. That is, phosphoric acid in an amount corresponding to each was added three times through pouring manner.

After the mixed solution was aged for 23 hours, the mixed solution was filtered, and the residue was washed, oven dried, ball milled, and sieved to prepare a dried powder.

In this case, in Experiment 5, an oxidizing agent may be added, and the oxidizing agent may shorten the whitlockite preparation time. Specifically, the oxidizing agent may be hydrogen peroxide.

Specifically, in Experiment 5, 685.25 g (about 9.2163 mol) of solid calcium hydroxide may be dissolved in distilled water and hydrogen peroxide serving as an oxidizing agent.

According to hydrogen peroxide is used as the oxidizing agent, the first reaction time of Experiment 5 may be reduced to about 15 minutes. In addition, the second reaction time of Experiment 5 may be shortened to about 15 minutes. In addition, the aging time of Experiment 5 may be reduced to 3 hours. In other words, in the experimental example related to Experiment 5 in which an oxidizing agent is added, whitlockite may be prepared according to the following experimental examples, and the particle size of whitlockite crystals may be successfully controlled.

685.25 g (about 9.2163 mol) of solid calcium hydroxide was dissolved in distilled water and "hydrogen peroxide" to prepare a solution containing calcium ions, and the solution containing calcium ions was mixed with 377.45 ml of an 85% phosphoric acid solution containing phosphate ions (10.62255 L of distilled water, i.e., 11 L of a 0.5M aqueous solution of phosphoric acid). At this time, X g of solid magnesium hydroxide was dissolved in distilled water and mixed with calcium ions. Thereafter, stirring was performed at 80° C. for 15 minutes to form a calcium phosphate material.

Subsequently, Y g of solid magnesium hydroxide was dissolved in distilled water to prepare a solution containing magnesium ions, and the solution containing magnesium ions and 223.2 ml of an 85% phosphoric acid solution containing phosphate ions (6.2768 L of distilled water, i.e., 6.50 L of a 0.5M aqueous solution of phosphoric acid) were mixed with mixed solution including the calcium phosphate material. Thereafter, stirring was performed at 80° C. for 15 minutes to form a magnesium phosphate material.

The amounts X g and Y g of the solid magnesium hydroxide which were mixed were set to 94.75 g and 94.75 g, respectively, and then changed to 151.60 g and 37.90 g, respectively.

Subsequently, 257.35 ml of an 85% phosphoric acid solution containing phosphate ions (7.24265 L of distilled water, i.e., 7.5 L of a 0.5M aqueous phosphoric acid solution) was mixed with the mixed solution containing the calcium phosphate material and the magnesium phosphate material. Thereafter, aging of the mixed solution was performed at 80° C. for 3 hours under stirring.

When the solution containing phosphate ions was added, the solution was not added by dropwise addition but was added by pouring. That is, phosphoric acid in an amount corresponding to each was added three times through pouring manner.

After the mixed solution was aged for 3 hours, the mixed solution was filtered, and the residue was washed, oven dried, ball milled, and sieved to prepare a dried powder.

Through Experiments 1 to 5, it was confirmed that as the amount of magnesium ions, which are non-calcium cations, mixed to prepare the first phosphate crystals increased, the particle size of the prepared whitlockite crystals gradually decreased.

Calcium phosphate crystals are substances that undergo phase transformation in the aging state, thereby turning into whitlockite. Therefore, it is reasonable to think that the size of they formed calcium phosphate crystals is related to the size of the whitlockite crystals. In addition, it can be inferred that the size of the calcium phosphate crystal has a correlation with the degree and amount of reaction between the calcium ions and the phosphate ions.

In this case, assuming the role of magnesium ions, the magnesium ions can inhibit the formation and growth of calcium phosphate crystals formed through the reaction between the calcium ions and the phosphate ions, thereby preventing the calcium phosphate crystals from growing to be large. Therefore, as the amount of magnesium ions mixed to prepare the first phosphate crystals increases, it seems that the size of whitlockite crystals decreases.

It is because the presence of magnesium ions chemically and statistically reduces the frequency of collisions that occur for the reaction between calcium ions and phosphate ions. For example, when magnesium ions are not mixed, since phosphate ions can collide more actively with calcium ions, the frequency of occurrences of the reaction by which calcium phosphate is produced may be higher than a case where magnesium ions are present. However, when magnesium ions are mixed together, since phosphate ions may collide with magnesium ions as well as with calcium ions, the frequency of collisions between phosphate ions and calcium ions may be reduced compared to a case where magnesium ions are not mixed. Accordingly, the chance of the reaction to form calcium phosphate crystals is also reduced, so that the formation and growth of calcium phosphate crystals may be suppressed. Taken together, it can be inferred that magnesium ions are involved in inhibiting the formation and growth of calcium phosphate crystals.

(2) Second Embodiment of Method for Controlling Particle Size of Whitlockite Crystal A description will be made with reference to FIG. 39. According to one embodiment of the present application, a whitlockite crystal preparation method includes: A process S5100 of determining the size of whitlockite crystals to be produced; and a process S5200 of determining at least one temperature selected from a first temperature, a second temperature, and a third temperature, depending on the determined size of the whitlockite crystals, wherein when the determined size of the whitlockite crystals is a first size, at least one of the first temperature, the second temperature, and the third temperature is determined as a third value, and when the determined size of the whitlockite crystals is a second size larger than the first size, at least one of the first temperature, the second temperature, and the third temperature is determined as a fourth value.

The first temperature and the second temperature may be determined to be different from each other, or may be determined to be the same temperature. The first temperature and the third temperature may be determined to be different from each other, or may be determined to be the same temperature. Likewise, the second temperature and the third temperature may be determined to be different from each other, or may be determined to be the same temperature.

The method may further include: A process S5300 of mixing a calcium ion and a phosphate ion at the first temperature to prepare a first phosphate crystal, wherein a first amount of a non-calcium cation is also mixed therewith;

A process S5400 of mixing a phosphate ion and a second amount of a non-calcium cation at the second temperature to prepare a second phosphate crystal; and A process S5500 of aging a solution containing the first phosphate crystal and the second phosphate crystal at the third temperature.

In this case, the fourth value is greater than the third value. In addition, preferably, the third value and the fourth value may be a value in the range of 50° C. or above and 100° C. or below.

For example, to prepare whitlockite crystals having a first size, in process S5300 of preparing the first phosphate crystal, process S5400 of preparing the second phosphate crystal, and process S5500 of aging the solution containing the first phosphate crystal and the second phosphate crystal, the first through third temperatures may be determined to be 60° C. which is the third value. In this case, in order to prepare whitlockite crystals having a second size larger than the first size, the first through third temperatures may be determined to be 80° C. which is the fourth value larger than the third value. That is, as the values of the first to third temperatures are increased, the particle size of the whitlockite crystals may be gradually increased.

Figure 27:
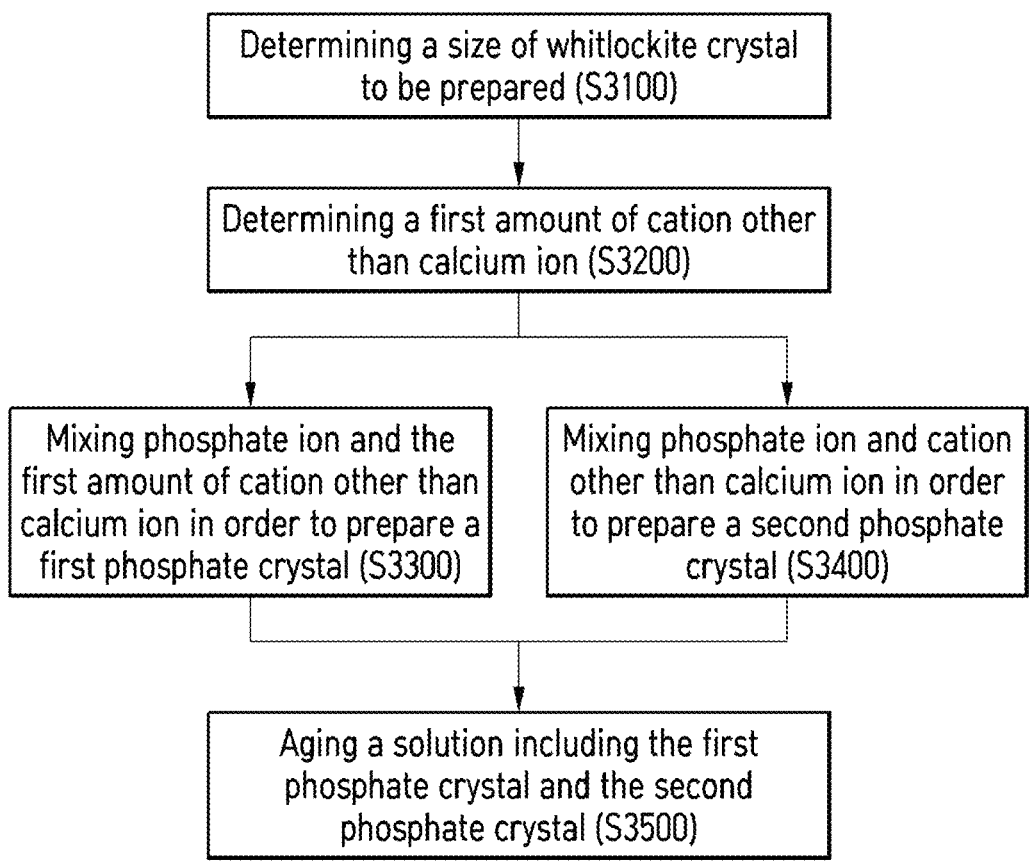
FIG. 27 is a flowchart schematically illustrating a whitlockite preparation method capable of controlling the particle size of whitlockite crystals, according to one embodiment disclosed in the present application.
Figure 28:
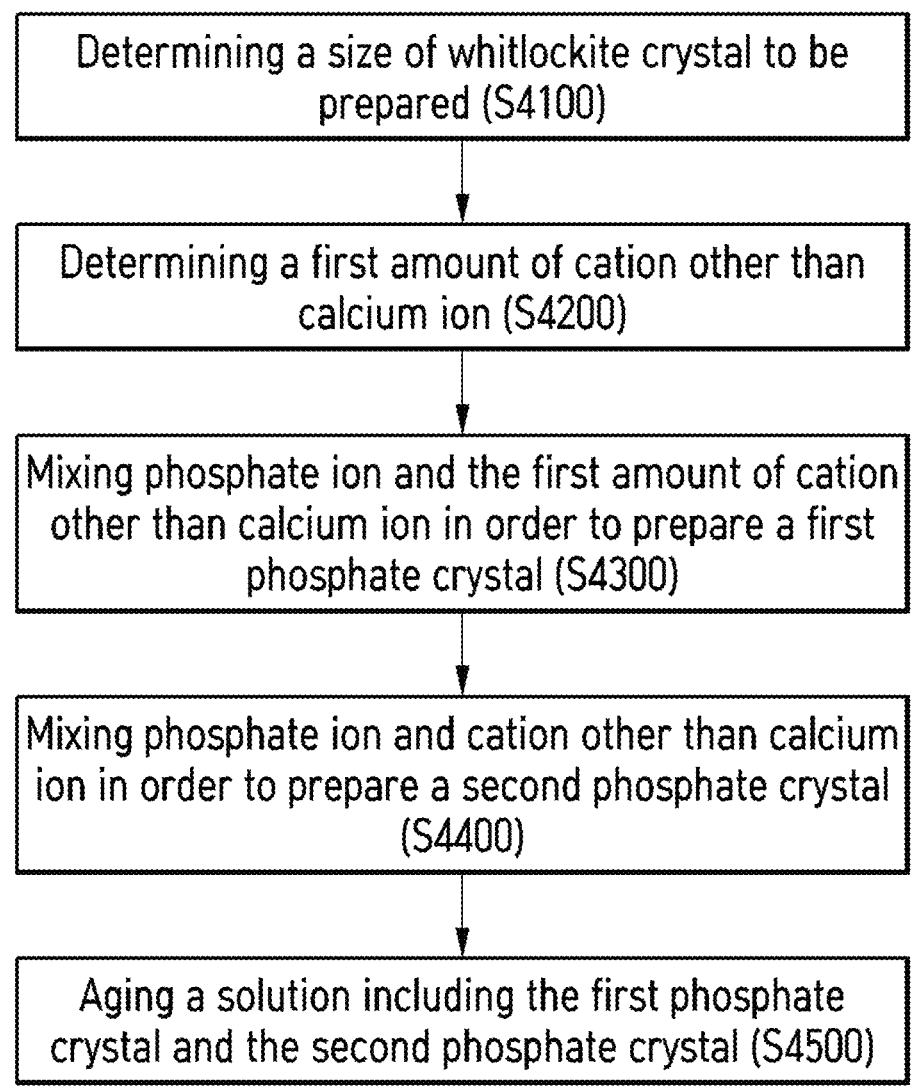
FIG. 28 is a flowchart schematically illustrating a whitlockite preparation method capable of controlling the particle size of whitlockite crystals, according to another embodiment disclosed in the present application.
Figure 39:
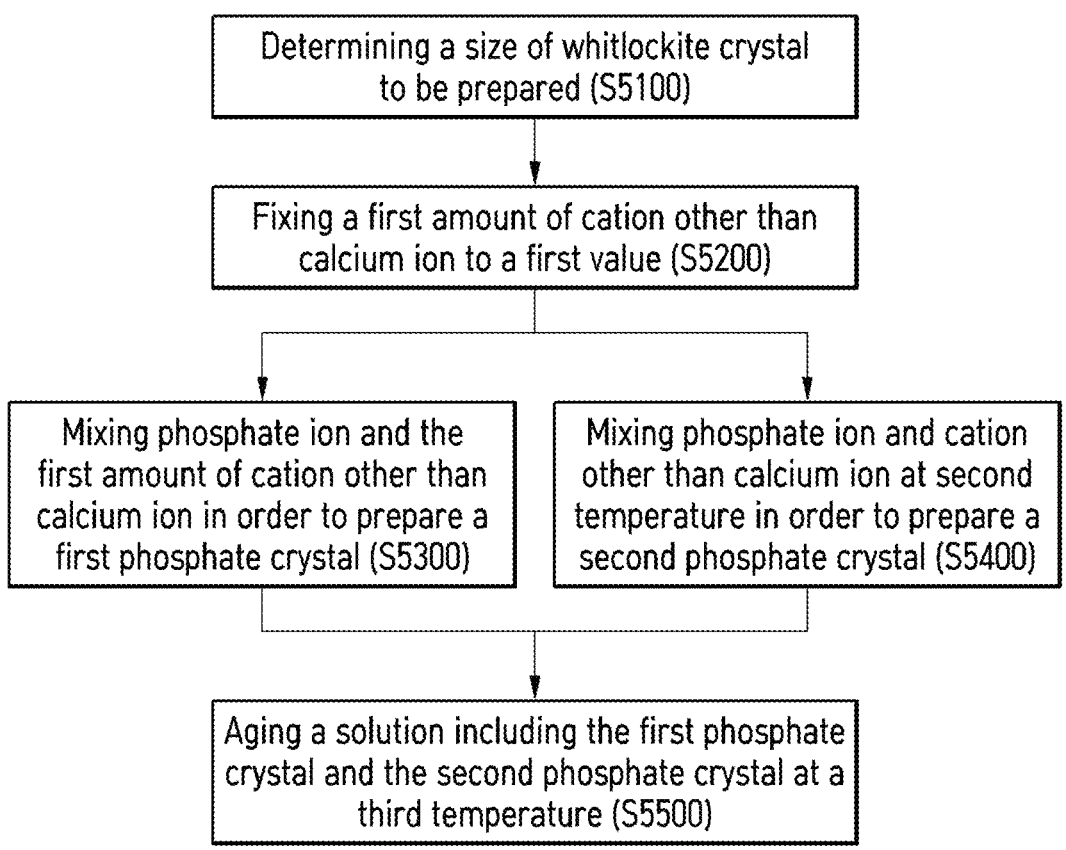
FIG. 39 is a flowchart schematically illustrating a whitlockite preparation method according to temperature variables capable of controlling the particle size of whitlockite crystals, according to one embodiment disclosed in the present application.

In summary, according to the method of controlling particle size of whitlockite crystal disclosed by the present application, a parameter for the control of the size of the whitlockite crystals produced may be the first amount of the non-calcium cation added in the process of preparing the first phosphate (S3300 of FIG. 27 or S5300 of FIG. 39).

Furthermore, in the whitlockite preparation method disclosed by the present application, another parameter for the control of the size of whitlockite crystals may be at least one temperature among the first temperature, the second temperature, and the third temperature.

That is, according to the method of controlling particle size of whitlockite crystal disclosed in the present application, after the size of whitlockite crystals to be prepared is determined, the first amount which is the amount of a non-calcium cation added in the process of preparing the first phosphate, and at least one temperature among the first temperature, the second temperature, and the third temperatures are selected, and the processes described above are performed. In this way, a desired whitlockite crystal can be prepared.

That is, the above-described two embodiments do not have to be independently performed but can be used in combination. The case where the above-described two embodiments are used in combination is advantageous over a case where any one of the embodiments is used to control the size of whitlockite crystals in the points described below.

Since each of the first temperature, the second temperature, and the third temperature are part of the reaction conditions required for the production of the first phosphate, the production of the second phosphate, and the production of whitlockite, respectively, the temperature range from which the first, second, and third temperatures are selected is not broad. Therefore, in the case of controlling the size of whitlockite by controlling only the temperature, the range of the sizes of the whitlockite may be limited. In this case, by controlling the first amount in process S3300 (or S5300 of FIG. 39), an effect that the controllable range of the size of the whitlockite produced becomes wider occurs.

Similarly, a material associated with the first amount (the amount of non-calcium cations added) in process S3300 is also a material consumed for the production of the second phosphate and is a material directly affecting the process of preparing the second phosphate and the process of preparing the whitlockite. Therefore, the upper limit of the first amount is inevitably limited. Therefore, the lower limit of the size range of the whitlockite crystals obtained by controlling the first amount is also limited. In this case, by controlling any one or more temperatures selected from the first temperature, the second temperature, and the third temperature, the minimum value of the size of the whitlockite crystals limited due to the upper limit of the first amount can be reduced by the adjustment of the temperature.

A description will be made with reference to FIG. 39. According to a preferred embodiment of the present application, process S5300 of mixing phosphate ions and calcium ions at the first temperature to prepare the first phosphate crystal, and also mixing the first amount of a non-calcium cation, and process S5400 of mixing non-calcium cations with phosphate ions to prepare the second phosphate crystals at the second temperature may be performed in the same container or preferably performed in respectively different container. That is, calcium ions, phosphate ions, and the first amount of non-calcium cations may be mixed in a first container, and phosphate ions and non-calcium cations may be mixed in a second container.

Different reaction conditions can be provided by spatial separation. In other words, first reaction conditions for preparing the first phosphate crystals may be provided in the first container, and second reaction conditions for preparing the second phosphate crystals may be provided in the second container at the same time. In this case, the reaction conditions may be determined depending on pH, the amount of phosphoric acid, temperature, and the like. For example, in order to prepare whitlockite crystals having the determined particle size, the first reaction condition (the first reaction condition comprises the first temperature is third value) is provided in the first container, and the second reaction condition (the second reaction condition comprises the second temperature is the fourth value) is provided in the second container. Since the first and second phosphate crystals are prepared respectively in separate containers, and the temperatures which are parameters for controlling the particle size of whitlockite crystals can be differently set in the each containers, the effect that the controllable range of the size of the whitlockite becomes wider can be produced. For example, in the case of preparing the first phosphate crystal and the second phosphate crystal in one container, even though each phosphate crystal is prepared in the temporal separation manner, some manufacturing processes may overlap on the time axis. During the overlapped time period, it is impossible to differently set the temperatures at which the first phosphate crystal and the second phosphate crystal are respectively prepared. However, when the process of preparing the first phosphate crystal and the process of preparing the second phosphate crystal are carried out in separate containers, different temperatures may be set in respective containers. In addition, the temperature can be adjusted according to the degree of progress of the reaction in each container. Therefore, the reaction temperatures, which are parameters that can control the size of whitlockite, can be variously selected.

According to one embodiment of the present application, the second phosphate material can be produced in the first container, preferably, the first phosphate crystals are produced in the first container. In the second container, second phosphate crystals may be prepared.

Accordingly, the mixed solution including the first phosphate crystals and the second phosphate crystals may be formed through a process of gathering the mixed solution of the first container and the mixed solution of the second container in one container.

Subsequently the mixed solution including the first phosphate crystals and the second phosphate crystals is aged (S5500) to prepare whitlockite crystals having the determined size.

A description will be made with reference to FIG. 39. According to one embodiment of the present application, a whitlockite crystal preparation method includes: determining the size of whitlockite crystals to be produced (S5100); and determining at least one temperature selected from a first temperature, a second temperature, and a third temperature, depending on the determined size of the whitlockite crystals (S5200), wherein when the determined size of the whitlockite crystals is a first size, at least one of the first temperature, the second temperature, and the third temperature is determined as a third value, and when the determined size of the whitlockite crystals is a second size larger than the first size, at least one of the first temperature, the second temperature, and the third temperature is determined as a fourth value.

The method further includes: mixing a calcium ion and a phosphate ion at the first temperature to prepare a first phosphate crystal, in which a first amount of a non-calcium cation is also mixed (S5300);

mixing a phosphate ion and a second amount of a non-calcium cation at the second temperature to prepare a second phosphate crystal (S5400); and aging a solution containing the first phosphate crystal and the second phosphate crystal at the third temperature (S5500).

In this case, the fourth value may be greater than the third value.

The first phosphate may be phosphate including calcium ions. That is, it is the crystal of a calcium phosphate material. For example, the calcium phosphate material may be hydroxyapatite, dicalcium phosphate dehydrate (DCPD), brushite, monetite, or a material including any combination thereof. However, the calcium phosphate material is not limited to the examples. Any material in which calcium ions and phosphate ions are combined may be regarded as a calcium phosphate material.

The second phosphate may be a phosphate material containing non-calcium cations. That is, the second phosphate material may be a material in which phosphate ions and non-calcium cations are combined. For example, when the non-calcium cation is a magnesium ion, the second phosphate material is a magnesium phosphate material. The magnesium phosphate material may be monomagnesium phosphate, dimagnesium phosphate, newberyite, trimagnesium phosphate, or a material including any combination thereof. However, the magnesium phosphate material is not limited to the examples. Any material in which magnesium ions and phosphate ions are combined may be regarded as a magnesium phosphate material.

In addition, when the second cation is a cobalt ion, the second phosphate material may be cobalt (II) phosphate hydrate.

In addition, when the second cation is an iron ion, the second phosphate material may be iron (III) phosphate dihydrate, iron (III) phosphate tetrahydrate, or a material including any combination thereof.

In addition, when the second cation is a sodium ion, the second phosphate material may be sodium phosphate.

In addition, when the second cation is a potassium ion, the second phosphate material may be potassium phosphate tribasic.

In addition, when the second cation is a strontium ion, the second phosphate material may be strontium phosphate.

In addition, when the second cation is a barium ion, the second phosphate material may be barium phosphate.

However, the second phosphate material is not limited to the exemplified material. Any material in which the second cations and phosphate ions are combined and which can exist as combined in an aqueous solution, the material can be regarded as the second phosphate material.

Calcium ions may be supplied by a calcium ion feed material including at least one selected from among calcium hydroxide, calcium carbonate, calcium nitrate, and calcium acetate. Preferably, calcium ions may be supplied by calcium hydroxide.

For example, calcium ions may be supplied by mixing an aqueous solution in which solid calcium hydroxide is dissolved in water to contain calcium ions with phosphate ions, by mixing solid calcium hydroxide with an aqueous solution containing phosphate ions, or by mixing phosphate ions and calcium ions to coexist in a solution, but not limited thereto. Supplying calcium ions may include all cases in which phosphate ions and calcium ions are mixed to coexist in a solution.

The non-calcium cation may be an ionic form of at least one element selected from among Mg, Co, Sb, Fe, Mn, Y, Eu, Cd, Nd, Na, La, Sr, Pb, Ba, and K.

In addition, the non-calcium cation (the ionic form of an X atom) may be supplied by a cation feed material including at least one selected from X hydroxide, X carbonate, X nitrate and X acetate.

For example, when the non-calcium cation is a magnesium ion, the magnesium ion may be supplied by a magnesium feed material such as magnesium hydroxide, magnesium carbonate, magnesium nitrate, magnesium acetate, etc.

In this case, magnesium ions may be supplied by mixing an aqueous solution in which solid magnesium hydroxide is dissolved in water to contain magnesium ions with phosphate ions, by mixing solid magnesium hydroxide with an aqueous solution containing phosphate ions, or by mixing phosphate ions and magnesium ions to coexist in a solution, but not limited thereto. Supplying magnesium ions may include all cases in which phosphate ions and magnesium ions are mixed to coexist in a solution.

The non-calcium cations mixed to prepare the first phosphate crystals may serve to inhibit the formation and growth of the calcium phosphate crystals generated by the reaction between the calcium ions and the phosphate ions. For example, when the non-calcium cations to be mixed to prepare the first phosphate crystal are magnesium ions, when calcium ions and phosphate ions react to form calcium phosphate, the magnesium ions reduce the chance of collision between the calcium ions and the phosphate ions, thereby inhibiting the formation and growth of calcium phosphate. In other words, when magnesium ions are not mixed, since collision occurs only between calcium ions and phosphate ions, the chance of the reaction for the production of calcium phosphate may be high. However, when magnesium ions are mixed together, since phosphate ions may collide with magnesium ions as well as with calcium ions, the frequency of collisions between phosphate ions and calcium ions may be reduced compared to a case where magnesium ions are not mixed. Accordingly, the chance of the reaction to form calcium phosphate crystals is also reduced, so that the growth of calcium phosphate crystals may be suppressed. That is, magnesium ions may be involved in inhibiting the growth of calcium phosphate crystals.

Non-calcium cations to be mixed to prepare first phosphate crystals, and non-calcium cations to be mixed to prepare second phosphate crystals may be the same cations. For example, the non-calcium cations mixed to prepare first phosphate crystals and the non-calcium cations mixed to prepare second phosphate crystals may be all magnesium ions.

However, if certain non-calcium cations mixed to prepare the first phosphate crystals play a role of inhibiting the growth of first phosphate crystals, cations that can play the role may be mixed. Therefore, non-calcium cations mixed to prepare first phosphate crystals and non-calcium cations mixed to prepare second phosphate crystals may be different. For example, non-calcium cations mixed to prepare second phosphate crystals may be magnesium ions, and non-calcium cations mixed to prepare first phosphate crystals may be a non-calcium cation other than magnesium ion having similar physical property (for example, size of ions) and chemical property (for example, amount of charge) to the magnesium ion that may interfere with the growth of the first phosphate crystal.

The phosphate ion may include all forms of phosphate ion which can exist in an aqueous solution depending on the pH. Generally speaking, the phosphate ion may refer to $PO_4^{3-}$, but is not limited thereto, and may include any form of phosphoric acid that can exist in an aqueous solution. For example, phosphate ions ($PO_4^{3-}$), hydrogen phosphate ions ($HPO_4^{2-}$), dihydrogen phosphate ions ($H_2PO_4^{-}$), and phosphoric acid ($H_3PO_4$) are all regarded as phosphate ions.

The phosphate ions may be supplied phosphate ion feed material (or phosphate ion donor material) including at least one selected from phosphoric acid, diammonium hydrogen phosphate, ammonium phosphate, and phosphate. Preferably, the phosphate ions may be supplied by phosphoric acid. For example, a solid phosphate ion feed material (for example, diammonium hydrogen phosphate, ammonium phosphate, etc.) may be dissolved in water or an aqueous solution to obtain a solution containing phosphate ions, and the solution containing phosphate ions may be mixed. Alternatively, when water is present as a solvent in a phosphate ion donor material (for example, phosphoric acid), the phosphate ion donor material itself contains phosphate ions. In this case, the phosphate ion donor material may be mixed with calcium ions.

In addition, when phosphate ions are mixed with calcium ions or non-calcium cations, the phosphate ions may be mixed in a dropwise manner or a pouring manner. The pouring manner is different from dropwise manner and refers to a method in which substantially the entire volume of a solution to be added in a lump sum manner in a very short time. For example, in the conventional whitlockite preparation method, a solution containing phosphate ions was continuously mixed in a dropwise manner at a volume flow rate of 12.5 ml/min. On the other hand, in the whitlockite preparation method according to one embodiment of the present application, the solution containing phosphate ions may be mixed at once at a volume flow rate of 2 ml/sec (120 ml/min) to 130 ml/sec (7800 ml/min). However, even with the use of the pouring addition, the mixing time may increase from several seconds to several tens of seconds depending on the volume of the solution containing phosphate ions to be mixed.

In addition, the solution containing phosphate ions may be mixed over several times at predetermined time intervals. For example, when a solution containing the first phosphate crystals and the second phosphate crystals is aged, phosphate ions may be mixed. In this case, the mixing of phosphate ions for the aging may be performed at a predetermined time interval from the mixing of phosphate ions to prepare the first phosphate crystals or from the mixing of phosphate ions to prepare the second phosphate crystals. In this case, the predetermined time interval may be determined depending on the reaction time for forming the first phosphate crystals or the second phosphate crystals.

A description will be made with reference to FIG. 39. According to one embodiment of the present application, a whitlockite crystal preparation method includes: determining size of whitlockite crystals to be produced (S5100); and determining at least one temperature selected from a first temperature, a second temperature, and a third temperature, based on the determined size of the whitlockite crystals (S5200); wherein when the determined size of the whitlockite crystals is a first size, at least one of the first temperature, the second temperature, and the third temperature is determined as a third value, and when the determined size of the whitlockite crystals is a second size larger than the first size, at least one of the first temperature, the second temperature, and the third temperature is determined as a fourth value.

The method may further include: mixing calcium ion and phosphate ion at the first temperature to prepare a first phosphate crystal, wherein a first amount of non-calcium cation is also mixed (S5300);

mixing a phosphate ion and a second amount of non-calcium cation at the second temperature to prepare a second phosphate crystal (S5400); and aging a solution containing the first phosphate crystal and the second phosphate crystal at the third temperature (S5500).

In this case, the fourth value may be greater than the third value.

The whitlockite crystal preparation method may further include a process of mixing an oxidizing agent. For example, the oxidizing agent may be mixed in at least one process selected from the process S5300 of mixing calcium ions, phosphate ions, and the first amount of non-calcium cations at the first temperature to prepare the first phosphate crystals, the process S5400 of mixing the second amount of non-calcium cations and phosphate ions at the second temperature to prepare the second phosphate crystals, and the process S5500 of aging the solution containing the first phosphate crystals and the second phosphate crystals.

In addition, the mixing of the oxidizing agent may be performed prior to process S5300 of mixing calcium ions, phosphate ions, and the first amount of non-calcium cations at the first temperature to prepare the first phosphate crystals.

Alternatively, the mixing of the oxidizing agent may be performed prior to process S5400 of mixing phosphate ions and the second amount of non-calcium cations at the second temperature to prepare the second phosphate crystals.

The addition of the oxidizing agent may reduce the preparation time for whitlockite crystals. Preferably, hydrogen peroxide may be used to the oxidizing agent.

In addition, according to a preferred embodiment of the present application, in order to form whitlockite crystals and to control the particle size of the whitlockite crystals, at least one of the first temperature, the second temperature, and the third temperature is in the range of 60° C. or above and 100° C. or below. When the first to third temperatures are lower than 60° C., a material other than whitlockite may be formed.

The whitlockite preparation method may further include filtering, washing, oven drying, ball milling, sieving processes.

(2)-1 Experimental Example

In an experiment (hereinafter, referred to as Experiment 1) in connection with the spatial separation manner according to the present embodiment, calcium ions and phosphate ions were mixed in a first container. At this time, a first amount of magnesium ions was also mixed together in the first container. At this time, 6.85 g (about 0.0924 mol) of solid calcium hydroxide was dissolved in distilled water to prepare a solution containing calcium ions, and the solution containing calcium ions was mixed with 3.81 ml of an 85% phosphoric acid solution containing phosphate ions (107.19 ml of distilled water, i.e., 0.5M aqueous solution of phosphoric acid 111 ml). At this time, 0.95 g g of solid magnesium hydroxide was dissolved in 187.5 ml of distilled water and mixed with calcium ions. Thereafter, the reaction to form a calcium phosphate material was performed under stirring at Z° C. for 1 hour. Here, in this experiment, the amount of magnesium ions mixed with phosphate ions and calcium ions was fixed in order to observe how the particle size of whitlockite crystals changed with the reaction temperature or aging temperature as a variable parameter.

In a second container, magnesium ions and phosphate ions were mixed. At this time, 0.95 g g of solid magnesium hydroxide was dissolved in 62.5 ml of distilled water to prepare a solution containing magnesium ions, and the solution containing magnesium ions was mixed with 2.23 ml of an 85% phosphoric acid solution containing phosphate ions (62.77 ml distilled water, i.e., 65 ml of 0.5M aqueous solution of phosphoric acid). Thereafter, the reaction to form a magnesium phosphate material was performed under stirring at Z° C. for 1 hour.

Then, the mixed solution of the first container and the mixed solution of the second container were added into one mixed solution. Thus, a mixed solution containing the calcium phosphate material and the magnesium phosphate material was obtained.

Next, 2.54 ml of an 85% phosphoric acid solution containing phosphate ions (71.46 ml of distilled water, i.e., 74 ml of 0.5M aqueous phosphoric acid solution) was mixed with the mixed solution containing the calcium phosphate material and the magnesium phosphate material. Thereafter, aging of the mixed solution was performed at Z° C. for 23 hours under stirring.

At this time, in Experiment 1 in connection with the present embodiment, the experiment was conducted while changing the Z ° C. to 40° C., 50° C., 60° C., 70° C., 80° C., and 90° C.

In addition, when the solution containing phosphate ions was added, the solution was not added by dropwise addition but was added by pouring. That is, phosphoric acid in an amount corresponding to each was added three times through pouring manner.

After the mixed solution was aged for 23 hours, the mixed solution was filtered, and the residue was washed, oven dried, ball milled, and sieved to prepare a dried powder.

Figure 40:
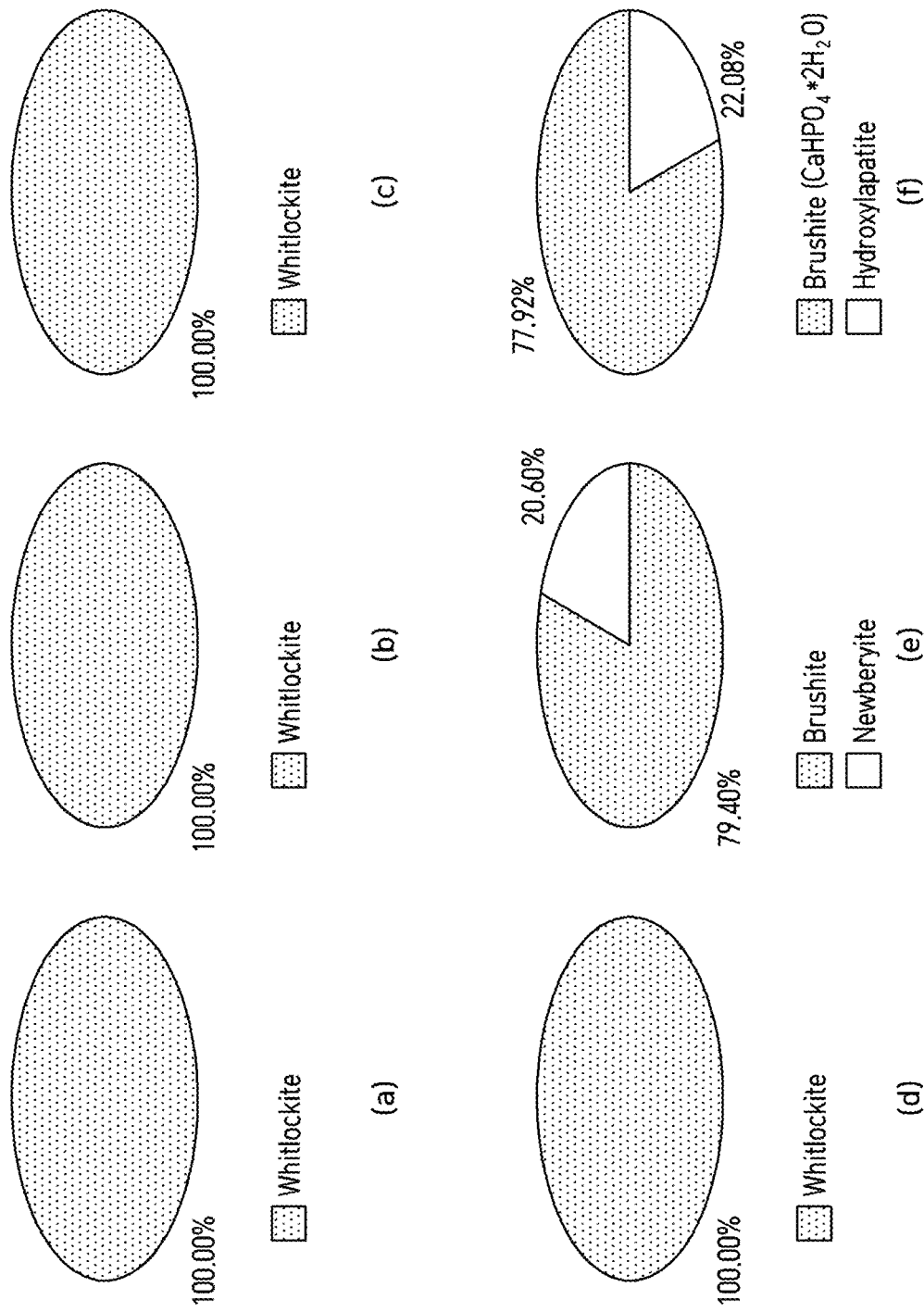
FIG. 40 is a circle graph showing XRD data of a resulting product prepared by the whitlockite preparation method according to temperature variables capable of controlling the particle size of whitlockite crystals, according to one embodiment disclosed in the present application.

Next, the synthesized powder was analyzed through SEM and XRD. Referring to FIG. 40, as in Experiment 1, when a predetermined amount of magnesium ions was added to the first container and the reaction and aging were carried out at a temperature of 60° C. or higher, it was confirmed that highly pure whitlockite was formed. In FIG. 40 showing experiment results, (a) represents XRD data for a case where the Z° C. is 90° C., (b) represents XRD data for a case where the Z° C. is 80° C., (c) represents XRD data for a case where the Z° C. is 70° C., (d) represents XRD data for a case where the Z° C. is 60° C., (e) represents data for a case where the Z° C. is 50° C., and (f) represents data for a case where the Z° C. is 40° C.

Figure 41:
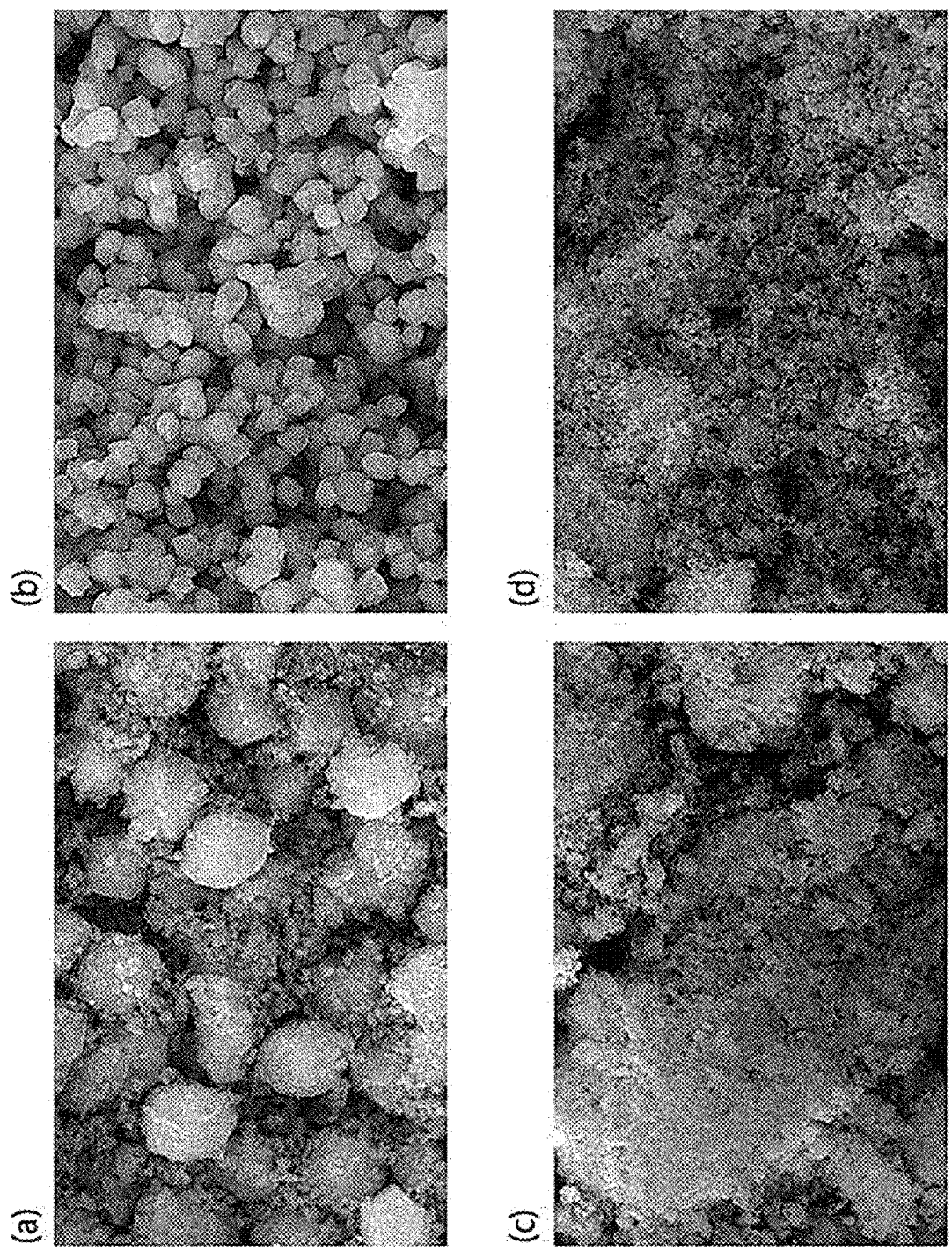
FIG. 41 is SEM data of a resulting product prepared by the whitlockite preparation method according to temperature variables capable of controlling the particle size of whitlockite crystals, according one embodiment disclosed in the present application.
Figure 42:
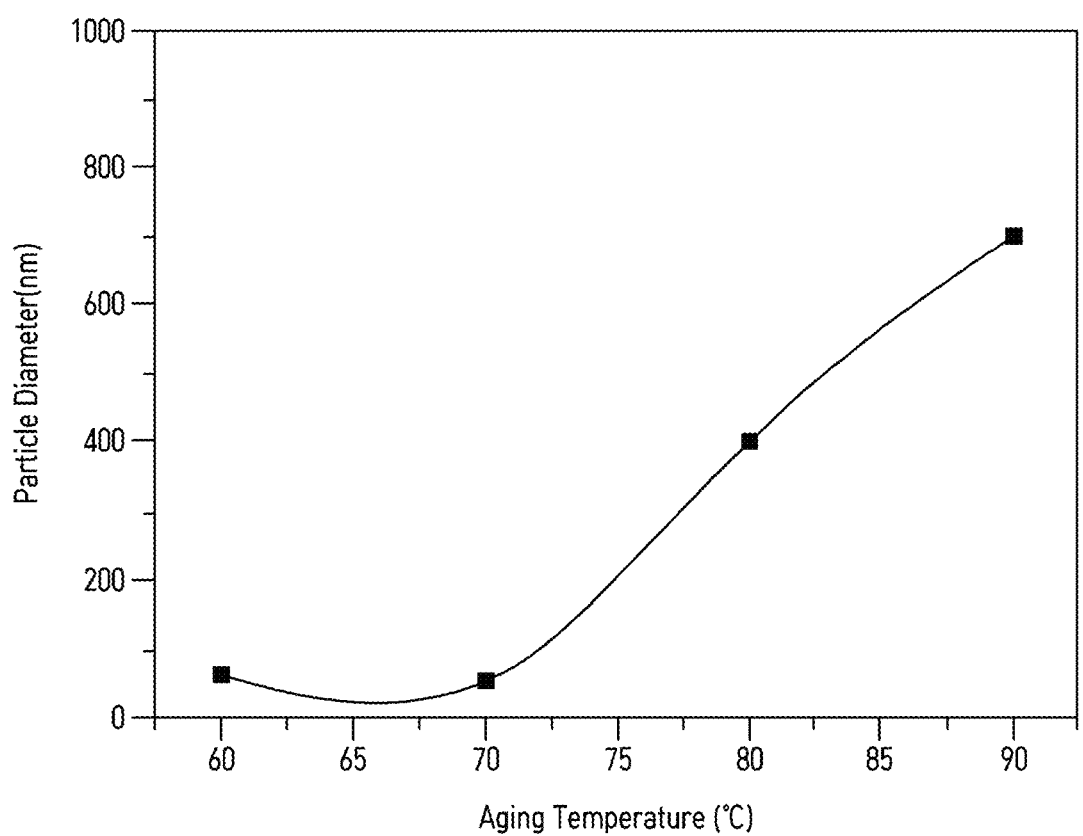
FIG. 42 is a graph showing an average particle size of whitlockite crystals prepared by the whitlockite preparation method according to temperature variables capable of controlling the particle size of whitlockite crystals, according to one embodiment disclosed in the present application.

In addition, referring to FIGS. 41 and 42, it was confirmed that as the reaction and aging temperature increased, the particle size of the whitlockite crystal gradually increased.

In FIG. 41 showing SEM data (10000-fold magnification), (a) represents SEM data when the Z° C. is 90° C., (b) represents SEM data when the Z° C. is 80° C., (c) represents SEM data when the Z° C. is 70° C., and (d) represents SEM data when the Z° C. is 60° C.

However, referring to (e) and (f) of FIG. 40, when the reaction and aging were carried out at 50° C. or below, it was confirmed that whitlockite was not prepared. Therefore, in order to control the particle size of whitlockite crystals using temperature as a variable parameter while fixing the amount of non-calcium cations mixed in the process of preparing the first phosphate crystals, it can be inferred that the reaction and aging have to be carried out at temperature in the range of above 50° C. and 100° C. or below.

It can be inferred that in order to prepare whitlockite crystals, the crystal structure must undergo a phase transformation in the aging stage after the calcium phosphate crystals grow a certain size or more. Therefore, it is reasonable to view that the size of the whitlockite crystal is related to the size of the calcium phosphate crystal that is prepared earlier. In addition, the process of producing calcium phosphate crystals may depend on temperature. This is because the calcium phosphate crystal reacts through collisions between calcium ions and phosphate ions, and the frequency of collisions between calcium ions and phosphate ions may have a positive correlation with temperature. In other words, it can be seen that temperature is one of the major factors in forming and growing calcium phosphate crystals. Judging from the experimental results, it seems that when the reaction temperature and the aging temperature 50° C. or below, a calcium phosphate material to turn into whitlockite through the change of crystalline structure is not formed, or calcium phosphate crystals having a sufficient size are not prepared. This is presumably because when the temperature is lowered, the collision frequency between calcium ions and phosphate ions is lowered, resulting in that calcium phosphate crystals having a sufficient size are not formed or a calcium phosphate materials that can turn into whitlockite are not formed.

However, in the temperature range of higher than 50° C. and 100° C. or below, it seems that calcium phosphate crystals having a sufficient size that can be converted into whitlockite crystals or a type of calcium phosphate convertible into whitlockite crystals are formed. It is assumed that, as the temperature increases, the collision frequency between calcium ions and phosphate ions may increase, and thus the threshold for sufficient conversion into whitlockite is exceeded. In addition, as the temperature rises, the collision frequency between calcium ions and phosphate ions increases, so that calcium phosphate crystals can be formed and grown better. Therefore, it is presumed that the size of the produced calcium phosphate crystals increases, and the size of whitlockite crystals increases while calcium phosphate crystals turn into the whitlockite crystals.

In the above, the configuration and characteristics of the present invention have been described with reference to the embodiments and drawings according to the present invention, but the present invention is not limited thereto. It will be apparent to those skilled in the art to which the present invention pertains that the embodiments can be diversely changed or modified within the spirit and scope of the present invention and such changes or modifications all fall within the scope of the appended claims.

What is claimed is:

1. A method for preparing a whitlockite crystal, the method comprising:
   a first process of adding a first solution containing phosphate ion to a container including a second solution containing calcium ion and magnesium ion, wherein the first solution containing phosphate ion is added to the container by pouring manner;
   a second process of adding, to the container, a third solution containing magnesium ion and a fourth solution containing phosphate ion, wherein the fourth solution containing phosphate ion is added to the container by pouring manner; and
   a third process of aging the solution in the container such that the whitlockite crystal is generated.

2. The method of claim 1, wherein the method further comprises adding an oxidizing agent,
   wherein the adding an oxidizing agent is performed before the first process, is performed after the third process, or is overlapped with at least a part of the first process to the third process on the time axis.

3. The method of claim 2, wherein the oxidizing agent is hydrogen peroxide.

4. The method of claim 1, wherein the first solution containing phosphate ion is added to the container by pouring manner with a volume flow rate of 2 ml/sec or more.

5. The method of claim 1, wherein the fourth solution containing phosphate ion is added to the container by pouring manner with a volume flow rate of 2 ml/sec or more.

6. The method of claim 1, wherein the third process comprises adding, to the container, a fifth solution containing phosphate ion by pouring manner.

7. The method of claim 6, wherein the fifth solution containing phosphate ion is added to the container by pouring manner with a volume flow rate of 2 ml/sec or more.

8. The method of claim 1, wherein the first solution containing phosphate ion is prepared by dissolving a first phosphate ion feed material in water, wherein the first phosphate ion feed material comprises one or more selected from phosphoric acid, diammonium hydrogen phosphate, ammonium phosphate, and phosphate.

9. The method of claim 1, wherein the fourth solution containing phosphate ion is prepared by dissolving a second phosphate ion feed material in water, wherein the second phosphate ion feed material comprises one or more selected from phosphoric acid, diammonium hydrogen phosphate, ammonium phosphate, and phosphate.

10. The method of claim 1, wherein the second solution containing calcium ion and magnesium ion is prepared by dissolving a first calcium ion feed material and first magnesium ion feed material in water,
   wherein the first calcium ion feed material comprises one or more selected from calcium hydroxide, calcium carbonate, calcium nitrate, and calcium acetate,
   wherein the first magnesium ion feed material comprises one or more selected from magnesium hydroxide, magnesium carbonate, magnesium nitrate, and magnesium acetate.

11. The method of claim 1, wherein the third solution containing magnesium ion is prepared by dissolving a second magnesium ion feed material in water, wherein the second magnesium ion feed material comprises one or more selected from magnesium hydroxide, magnesium carbonate, magnesium nitrate, and magnesium acetate.

12. The method of claim 1, wherein a molar ratio of calcium ion supplied in the first process to magnesium ion supplied in the first process (calcium ion/magnesium ion) is 3.5 to 14.2.

13. The method of claim 1, wherein a molar ratio of phosphate ion supplied in the first process to magnesium ion supplied in the first process (phosphate ion/magnesium ion) is 2.1 to 8.6.

14. The method of claim 1, wherein the method further comprises one or more processes selected from filtering, washing, drying, milling, and sieving.

15. The method of claim 1, wherein the first process, the second process, and the third process are performed at 50° C. to 100° C.

16. The method of claim 1, wherein the method further comprises:
   determining a size of the whitlockite crystal to be prepared; and
   determining an amount of magnesium ion supplied in the first process as a first amount, based on the determined size of the whitlockite crystal,
   wherein the determining a size of the whitlockite crystal to be prepared and the determining the first amount are performed before the first process,
   wherein when the determined size of the whitlockite crystal is a first size, the first amount is determined as a first value,
   wherein when the determined size of the whitlockite crystal is a second size larger than the first size, the first amount is determined as a second value lower than the first value.

* * * * *